United States Patent [19]
Adolphi et al.

[11] Patent Number: 6,020,951
[45] Date of Patent: Feb. 1, 2000

[54] HIGH SPEED PACKAGE PRINTER

[75] Inventors: E. John Adolphi, Eden Prairie; Gerald A. Jensen, Plymouth; Michael Breckenridge, Minneapolis; Todd Kuester, Prior Lake, all of Minn.; John Lawson, La Selva Beach, Calif.; Patrick J. Galloway, Sparks, Nev.

[73] Assignee: Lifetouch Portrait Studios, Inc., Eden Prairie, Minn.

[21] Appl. No.: 09/306,610

[22] Filed: May 6, 1999

Related U.S. Application Data

[62] Division of application No. 08/931,580, Sep. 16, 1997, Pat. No. 5,949,523.

[51] Int. Cl.⁷ .......................... G03B 27/48; G03B 27/52
[52] U.S. Cl. ................................. 355/50; 355/40
[58] Field of Search .................... 355/27–29, 40–43, 355/50, 55; 358/501, 506, 511; 353/31, 34, 33; 359/197, 201, 209, 210, 211

[56] References Cited

U.S. PATENT DOCUMENTS

| | | | |
|---|---|---|---|
| 4,113,370 | 9/1978 | Durbin | 353/122 |
| 4,566,784 | 1/1986 | Nitsch | 355/72 |
| 4,655,583 | 4/1987 | Kitai et al. | 355/29 |
| 4,737,825 | 4/1988 | Davis | 355/54 |
| 4,770,507 | 9/1988 | Arimoto et al. | 350/421 |
| 4,862,200 | 8/1989 | Hicks | 354/75 |
| 4,961,093 | 10/1990 | McDonald | 355/29 |
| 4,974,016 | 11/1990 | Fleckenstein et al. | 355/28 |
| 5,023,655 | 6/1991 | Hicks | 355/39 |
| 5,045,877 | 9/1991 | Lucht et al. | 355/71 |
| 5,107,296 | 4/1992 | Ozawa et al. | 355/28 |
| 5,126,785 | 6/1992 | Erich et al. | 355/28 |
| 5,159,385 | 10/1992 | Imamura | 355/28 |
| 5,162,843 | 11/1992 | Clapp | 355/46 |
| 5,181,066 | 1/1993 | Ozawa et al. | 355/29 |
| 5,220,378 | 6/1993 | Kirkpatrick et al. | 355/60 |
| 5,287,141 | 2/1994 | Yoshikawa | 355/40 |
| 5,298,939 | 3/1994 | Swanson et al. | 355/53 |
| 5,333,034 | 7/1994 | Gu et al. | 355/32 |
| 5,400,152 | 3/1995 | Manico et al. | 358/501 |
| 5,420,699 | 5/1995 | Yamanouchi et al. | 358/487 |
| 5,673,104 | 9/1997 | Rottner | 355/75 |
| 5,798,511 | 8/1998 | Terashita | 235/462 |

*Primary Examiner*—David M. Gray
*Assistant Examiner*—Hung Henry Nguyen
*Attorney, Agent, or Firm*—Nikolai, Mersereau & Dietz, P.A.

[57] ABSTRACT

An improved high speed package printer for producing a plurality of high quality photographs of varying size, shape, and style based on one or a plurality of different film negatives. The improved package printer of the present invention accomplishes the goal of increased throughput and speed through the use of an automatic paper-loading feature, ultrasonic proximity sensors for dynamically measuring paper-slack loops, off-center printing for eliminating the need to advance the paper for punching after each exposure, a rotational prism for creating 10"×13" photographs without physically rotating the film, a 13-UP lens deck including 12 wallet lenses and a single 5"×7" retro-focus lens for creating 12 wallet-sized photographs and one 5"×7" photograph from a single exposure, an automatic diffusion plate cleaner for eliminating the system down time associated with manual diffusion plate cleaning, an improved filtering arrangement for equalizing the amount of energy emitted from each lamp within a photographic lamphouse, and bi-directional film movement for producing a single composite containing a plurality of different images or poses. The high speed package printer of the present invention also boasts an improved film cleaning arrangement for increasing the quality of the prints, as well as penumbra masking for producing photographs having sharply delineated borders.

27 Claims, 41 Drawing Sheets

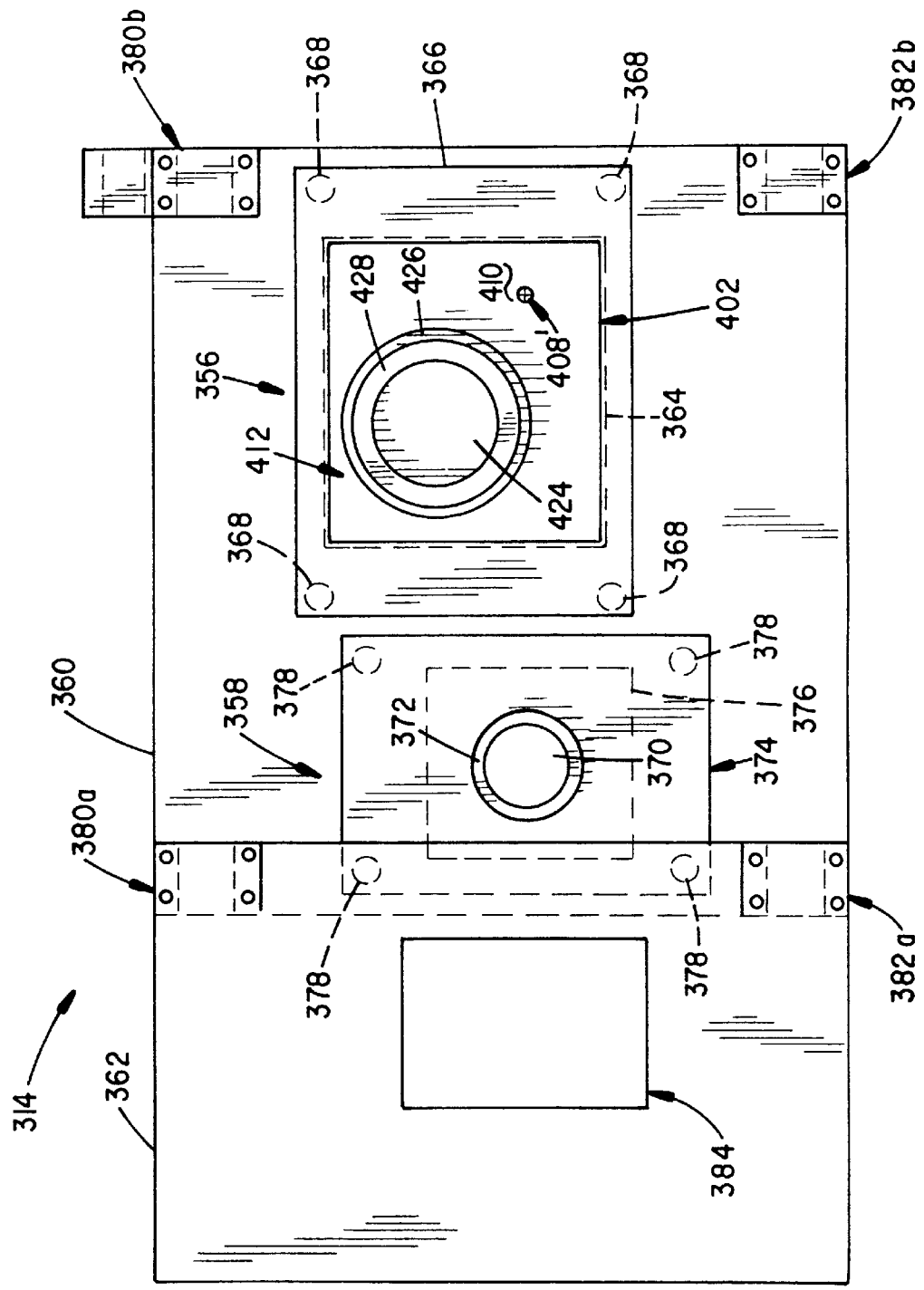

HIGH SPEED PACKAGE PRINTER

This is a Divisional of application Ser. No. 08/931,580, filed on Sep. 16, 1997 now U.S. Pat. No. 5,949,523.

BACKGROUND OF THE INVENTION

I. Field of the Invention

The present invention relates generally to a printer for selectively projecting photographic images onto a projection plane containing photographic paper. More particularly, the present invention relates to a high speed photographic package printer for producing a plurality of different sets or packages of photographs based on one or more negatives, wherein the improved package printer boasts an automatic paper-loading feature, dynamically controlled paper-slack loops, off-center printing, a rotational prism for creating 10"×13" photographs, a 13-UP lens assembly including 12 wallet lenses and a single 5"×7" retro-focus lens, an automatic diffusion plate cleaner, an improved dichroic lamp filtering arrangement, a focal plane shutter, bi-directional film movement, an improved film cleaner, and improved masking.

II. Discussion of the Prior Art

Photographic package printers have experienced proliferated use and widespread popularity due to their ability to generate custom made photographic packages consisting of selected photographs of varying size, shape, and style based on one or more negatives. Photographic package printers accomplish this by providing a lamphouse from which a beam of light is directed through photographic film onto a projection plane containing photographic paper for producing a print. In order to vary the shape and size of the particular prints, package printers are equipped with a plurality of movable lenses having varying magnification ratios so as to create a wide variety of exposures upon the photographic paper. By way of example and not limitation, package printers are commonly employed for processing the exposed photographic film from annual school photography sessions wherein each student within the school or class is photographed in any number of different poses using one or a plurality of different backdrops. The student may thereafter choose from among the various proofs generated during the photography session to order a custom package containing any number of different size or style photographs, such as wallet-size, 5"×7," 8"×10," and 10"×13" photographs. However, the package printers of the prior art suffer from several substantial drawbacks both in terms of the speed of operation and print quality.

With specific regard to the speed of operation, the prior art package printers have several time limiting features which collectively restrict the ability of the package printers to operate at high speeds. One such drawback is that the prior art package printers typically require considerable time and energy to load the paper into the paper deck for subsequent exposure. Although several attempts have been made to automate the paper loading process, these efforts fail to provide a reliable means for guiding the paper during the loading stage such that significant system down time may be experienced to rectify the situation and reload the paper. For example, U.S. Pat. No. 5,181,066 to Ozawa et al. discloses a paper transporting device for a photographic printer which utilizes retractable bridge members to support the paper during the loading stage, a first pair of drive rollers for drawing the paper into the printer, and a second pair of drive rollers for propelling the paper to a processing section of the printer. U.S. Pat. No. 5,107,296 to Ozawa et al. discloses the use of retractable bridge members for controlling the transportation of the paper between a paper supply cartridge and a processing section. U.S. Pat. No. 4,961,093 also employs retractable bridge members so as to facilitate the loading of paper from a paper supply magazine into exposure apparatus and further to a take-up magazine. U.S. Pat. No. 4,655,583 to Kitai entails maintaining the traveling path of the photographic paper from a supply cartridge to nipping rollers in a straight manner by adjusting the height of an inner frame via elevator means. U.S. Pat. No. 4,566,784 to Nitsch discloses an apparatus for threading a new roll of paper into a photographic copier, comprising a retractable flap which, when disposed in the operative (guiding) position parallel to the paper, forms a passageway for threading the new roll of paper into the photographic copier. However, although the improvements offered in these references provide benefits over manual paper loading, their teachings are nonetheless flawed in that they merely provide guidance along a single surface of the paper, thereby allowing the paper to buckle and become fouled up during the loading process.

Another time limiting feature of the prior art package printers relates to the paper slack loops associated with the drive motors used to load and advance the photographic paper. Paper slack loops are essentially reservoirs containing a length of photographic paper which allows the paper to be advanced quickly into and out of an exposure area within the paper deck by factoring out the inertia of the paper supply spool. U.S. Pat. No. 5,181,066 to Ozawa et al. discloses a pair of loop sensors associated with each paper slack loop for detecting when the particular loop has exceeded a predetermined threshold. U.S. Pat. No. 5,107,296 to Ozawa et al. discloses a loop sensor for detecting a predetermined length of a first loop. U.S. Pat. No. 4,961,093 to Hicks also discloses the use of a pair of sensors for detecting when each particular paper slack loop exceeds a predetermined length. U.S. Pat. No. 5,159,385 to Imamura discloses a photo-lab system having a plurality of loop sensors for controlling the length of the paper within the respective paper loop reservoirs. The paper slack loop sensing arrangements within the above-identified references, however, are flawed in that they are not capable of detecting the actual length of the paper within each respective paper loop reservoirs but rather are merely capable of determining whether the particular paper loops have exceeded a predetermined limit or range. This is disadvantageous in terms of responsiveness in that a lag time exists between the instance that the sensors detect that the paper has exceeded the predetermined threshold and the time that the drive motors are activated to advance the paper, thereby limiting the overall speed at which the package printer can operate.

Another drawback stems from the manner in which 10"×13" photographs are generated in prior art package printers. The traditional method for generating 10"×13" photographs in package printers is illustrated in U.S. Pat. No. 5,162,843 to Clapp, wherein the photographic negative is physically rotated within the film deck in order to project a 10"×13" image on the 10" wide paper. Although effective at producing the 10"×13" photographs, this technique is particularly disadvantageous in that the mechanical turrets employed to rotate the negative are extremely bulky and heavy. The attendant bulk of the mechanical turret consumes a substantial amount of valuable space within the package printer, while the exorbitant weight limits the speed at which the negative can be rotated and causes substantial vibrations within the package printer which require lengthy settling time. The settling time and rotation time are additive such that the overall amount of time required to generate a 10"×13" photograph is quite lengthy. Moreover, the mechanical turret can only support a limited amount of photographic film such that the film must be reloaded quite often. This increases the overall down time for the printer which, it will be appreciated, restricts the speed and throughput of these package printers. The mechanical turrets are also flawed in that the bearings are prone to wear out and become damaged through repeated rotation which, once again, leads to increased system down time for repair.

Another significant flaw in the prior art package printers is that they print on-center, that is, the negative is co-aligned with the approximate center of the photographic paper such that the image-bearing light projects in a directly vertical fashion from the negative to the approximate center of the photographic paper. U.S. Pat. No. 5,162,843 to Clapp, for example, discloses one such package printer which employs on-center printing. The main disadvantage of on-center printing is that it requires an extra step of advancing the photographic paper for the purpose of creating marking notches in the paper to indicate the end of each exposure and the end of each entire photographic session. Marking the paper in this fashion aids in the photograph development process in that the processing equipment can be equipped to interpret the various notches in order to automatically process, sort, and package the particular photographs within each photographic session. In order to properly mark each exposure and/or photographic session, the marking notches are preferably placed at or near the leading edge of each photographic exposure on the paper such that the processing components can accurately detect their occurrence. Typically, the marking notches are created through the use of one or more actuating cylinders disposed off-center to the negative. In that the printing is on-center, i.e. directly above the negative, the paper must be advanced after each exposure to accomplish the desired marking before advancing further to avail the next unexposed portion of paper. This is disadvantageous in that the paper must be stopped prior to performing the aforementioned marking process. It will be appreciated by those skilled in the art that the extra step of stopping to conduct punching activities consumes a substantial amount of valuable time.

Still other drawbacks with prior art package printers relate to the task of producing a plurality of differently sized photographs with a single exposure. More specifically, problems result due to the fact that this task is typically accomplished by situating a plurality of lenses having a variety of different magnification ratios on a single assembly within the lens deck. Each particular lens on the assembly has a corresponding focal point which requires the lens to be positioned a predetermined distance from the projection plane in order to produce the desired image on the photographic paper. Thus, each lens has a specific vertical height on the assembly which, in turn, causes the moment of inertia of the assembly to be far removed from the center of gravity of the assembly. This is disadvantageous in that removing the moment of inertia from the center of gravity causes the assembly to experience rocking during movement back and forth within the lens deck, thereby increasing the settling time between exposures. Still a further drawback with producing multiple images with a single exposure is that the ray traces from the various lenses tend to intersect if the number of lenses becomes too concentrated on the assembly. The intersection of ray traces is problematic in that it produces fouled or imperfect images on the photographic paper.

A still further drawback with the package printers of the prior art relates to the ability of the film to be translated during the operation of the package printer. To be more specific, the film within the package printers of the prior art are simply uni-directional, i.e. the film can only progress from the film supply spool to the film take-up spool. In this arrangement, then, the number of different composites which can be formed is very limited in that the various negatives cannot be switched back and forth into position over the lamp house. This effectively limits the range of possible composite photographs which can be accomplished with the package printers of the prior art. In order to overcome this deficiency, separate printers are specifically employed to create composite photographs using a plurality of different negatives. This is disadvantageous, however, in that the package printer and the composite printer will have different color emulsions and, therefore, resulting composites will not share the same color as the prints generated by the package printer. The need for a separate composite printer is also disadvantageous in terms of the time required to perform the custom printing and, moreover, the film and/or paper is subject to an increased risk of damage during the transportation to and from the composite printer.

Yet another drawback with the prior art package printers stems from the fact that the shutter assemblies are disposed above the focal plane. Positioning the shutter above the focal plane is problematic in that it requires a relatively large shutter opening and, therefore, a relatively large assembly to carry the shutter within the printer. The increased mass of the shutter assembly translates into decreased speed of operation in that there is more mass to move back and forth to effectuate a shutter operation. The increased mass of the shutter assembly also translates into increased settling time between shutter operations, thereby adversely affecting the reliability and operating speed of the package printer. Still another problem with positioning the shutter assembly above the focal plane is that interference may result between the shutter assembly and the lower lens assemblies within the lens deck.

Still another time limiting drawback with the package printers of the prior art pertains to the amount of energy consumed by the individual bulbs within the lamp house. To be more specific, the lamp house typically requires combining red, yellow, and green light in specific fashion to ensure for the proper exposure of the photographic paper. To accomplish this, the manufacturers of the lamp houses typically provide multiple (3 or 4) separate white light bulbs with each bulb equipped with a red, yellow, or green filter for creating the colored light. However, red is the predominant color required when creating the exposures on the photographic film and, as such, the underlying light bulb associated with the red filter is typically operated at a higher power than the light bulbs associated with the yellow and green filters. This presents a drawback in that each light bulb associated with a red filter will burn out at a higher frequency than the light bulbs used with the yellow and green filters due to the relatively large amount of power consumed by the red filtered light bulb, thereby increasing the amount of system down time when the burned out bulbs must be replaced.

Still other drawbacks exist in the prior art package printers with respect to print quality. First, the prior art package printers typically do not provide sufficient cleaning means for minimizing the amount of lint, dust, and other airborne contaminants from the surface of the film. For example, a typical film cleaning arrangement entails providing a pair of sticky rollers on the upstream or supply side of the photographic film in an effort to prepare the film for processing. However, such an arrangement is ineffective in eliminating all of the dust and related undesirables from the film so that the photographs may be marred or flawed. In the instance that such dust particles results on the film, it could translate into the ruination of an entire sitting which, as can be appreciated, results in lost profits due to wastefulness. At the very least, it will require manual touching up which, once again, adds to the overall time to create the photographs within each requested package.

Drawbacks also exist in the prior art package printers with regard to their ability to clean the diffusion plates used to equalize the light from the lamp house. For example, U.S. Pat. No. 5,181,066 to Ozawa et al. discloses a diffusion plate for diffusing and equalizing the light passing through the filter assembly of the light source wherein the diffusion plate must be cleaned manually between a predetermined number of sittings. This is flawed in that lint, dust, and other similar particles may come to rest on the diffusion plates such that spotted imperfections form on all the photographs being processed. This can be particularly damaging if the "floaters" are not discovered until after the processing of the exposed paper such that a large portion of the exposures must be repeated, consuming a substantial amount of system down time and resulting in large amounts of scrap and waste.

Yet another flaw in print quality resides in the masking used to crop the image bearing light beam to produce sharply delineated borders. U.S. Pat. No. 5,181,066 to Ozawa et al. discloses a variable mask including a length adjusting mask for adjusting the length of the exposure frame according to the print size, and a width adjusting mask for adjusting the width of the exposure frame according to the paper size and any border required in the print to be made. U.S. Pat. No. 5,287,141 to Yoshikawa also discloses a variable mask in an exposure room which masks the photographic paper in accordance with the particular print size. In similar fashion, U.S. Pat. No. 4,655,583 to Kitai discloses a trimming mask frame provided in conjunction with a press pan. However, these arrangements are incapable of adequately cropping the image bearing light beam to produce a well defined print border.

In light of the foregoing, therefore, a need exists for an improved high speed package printer which is capable of loading the photographic paper in an automatic fashion such that the paper will not be subject to buckling or become fouled in the paper transportation path. The improved high speed package printer should be capable of dynamically measuring the paper slack loops to ensure for the smooth and efficient operation of the paper drive motors. A need also exists for eliminating the need to advance the paper after each exposure to punch the paper at the leading edge of each exposure. The improved high speed package printer should also allow 10"×13" photographs to be taken without the need for a rotating turret and should be capable of generating 12 wallet sized photographs and a single 5"×7" photograph with a single exposure. The improved package printer should furthermore be capable of producing folio photographs comprising four different 4"×5" photographic images, as well as automatically removing all dust particles and "floaters" from the diffusion plate so as to improve print quality. The improved high speed package printer should also be equipped with an improved lamp house filtering arrangement which reduces the degree to which the light bulbs associated with the red filter bum out so as to minimize system down time. The improved high speed package printer should also have an improved film cleaning arrangement for minimizing the amount of dust and related which are able to settle on the film, thereby reducing the amount of scrap and the amount of manual touching up required to salvage the marred photographs. The package printer should furthermore have an improved negative cropping arrangement for producing a sharply delineated print border. Lastly, the improved high speed package printer should have bi-directional film movement so as to increase the range of possibilities with respect to the various photographs included within a particular composite photograph.

OBJECTS AND SUMMARY OF THE INVENTION

Accordingly, it is a primary object of the present invention to provide an improved package printer which is capable of operating at high speed.

It is another object of the present invention to provide an improved high speed package printer which is capable of loading the photographic paper in an automatic fashion without having the paper buckle or become fouled up during loading.

It is yet another object of the present invention to provide an improved high speed package printer capable of dynamically measuring the paper slack loops so that the paper drive motors can quickly and efficiency advance the paper within the paper deck.

It is another object of the present invention to provide an improved package printer which does not require the paper to be advanced after each exposure to punch the paper at the leading edge of each exposure.

It is still another object of the present invention to provide an improved high speed package printer having the ability to produce 10"×13" photographs without the need for a rotating turret and the ability to produce 12 wallet sized photographs and a single 5"×7" photograph with a single exposure.

It is another object of the present invention to provide an improved package printer capable of producing folio photographs comprising four different 4"×5" photographic images.

It is yet another object of the present invention to provide an improved package printer which is capable of automatically removing all dust particles and "floaters" from the diffusion plate, thereby reducing the need to repeat tainted sittings and reducing the overall amount of scrap and waste.

It is a further object of the present invention to provide an improved high speed package printer with an improved lamp house filtering arrangement for equalizing the power at which each light bulb is operated at so as to cause each bulb to bum out at approximately the same time, thereby allowing all the bulbs to be changed at the same time so as to minimize system down time.

It is still further object of the present invention to provide an improved film cleaning arrangement for minimizing the amount of dust and related which are able to settle on the film, thereby reducing the amount of scrap and the amount of manual touch-up required to salvage photographs marred by such impurities.

It is yet a further object of the present invention to provide an improved package printer having an improved negative cropping arrangement for producing a sharply delineated print border.

It is still further object of the present invention to provide an improved package printer having an improved shutter assembly which is below the focal plane so as to decrease the size of the shutter assembly and increase shutter speed and system reliability.

It is yet another object of the present invention to provide an improved high speed package printer having bi-directional film movement so as to increase the range of possibilities with respect to the various photographs included within a particular composite photograph.

In accordance with a broad aspect of the present invention, the foregoing objectives are attained by providing an improved photographic package printer, comprising a paper deck, a film assembly, light projection means, and a lens deck. The paper deck has a supply of photographic paper, an exposure aperture, and means for selectively positioning unexposed portions of the photographic paper over the exposure aperture. The film assembly has a supply of photographic film, a negative aperture, and bi-directional film transportation means for selectively positioning one of a plurality of film negatives within the negative aperture. The light projection means is disposed proximate to the film assembly for selectively projecting light through the film negative disposed within the negative aperture to produce image-bearing light projecting toward the exposure aperture of the paper deck. The lens deck is disposed in between the paper deck and the film assembly. The lens deck includes a plurality of selectively positionable projection assemblies for magnifying the image-bearing light and projecting magnified image-bearing light onto the photographic paper within the exposure aperture. The lens deck also includes selectively positionable masking means for selectively blocking out portions of the magnified image-bearing light. The plurality of selectively positionable projection assemblies include optical rotation means for optically rotating the image-bearing light ninety degrees to project a 10"×13" photographic image on the paper within the exposure aperture.

In accordance with a still further broad aspect of the present invention, the aforementioned objects are attained by providing a high speed photographic package printer, comprising a paper supply cartridge, a printing assembly, and a paper take-up cartridge. The paper supply cartridge has a supply of unexposed photographic paper. The printing assembly has a paper deck, a film deck, a lamp deck, and a lens deck. The paper deck is coupled to the paper supply cartridge for selectively positioning portions of the unexposed photographic paper within an exposure aperture. The film deck includes a plurality of photographic negatives and bi-directional film transportation means for selectively positioning one of the plurality of photographic negatives within a negative aperture. The lamp deck is disposed proximate the film deck for selectively projecting light through the negative aperture to produce image-bearing light projecting toward an approximate center of the exposure aperture. The lens deck is disposed between the film deck and the paper deck and has selectively positionable projection means for projecting magnified image-bearing light onto the unexposed photographic paper within the exposure aperture in an off-center fashion relative to the negative aperture and selectively positionable masking means for blocking out selected portions of the magnified image-bearing light. The paper take-up cartridge is coupled to the paper deck of the printing assembly for receiving exposed photographic paper from the exposure aperture. The off-center printing facilitates marking the photographic paper within the exposure aperture during exposure by the magnified image-bearing light and the bi-directional film transportation means cooperates with the selectively positionable masking means to produce composite photographs based on a plurality of different negatives.

In yet another broad aspect of the present invention, a method is set forth for providing a photographic package printer, comprising the steps of: (a) providing an improved paper deck having paper transportation means for selectively transporting photographic paper over an exposure aperture, means for automatically loading the photographic paper, and means for dynamically measuring a length of paper slack loops formed within the paper deck to facilitate advancing the paper; (b) providing an improved film deck having a supply of photographic film, bi-directional film transportation means for selectively transporting said photographic film back and forth over a negative aperture, and film cleaning means for automatically removing impurities from the film during transportation by the bi-directional film transportation means; (c) providing an improved lamp deck proximate the film deck for projecting light through the negative aperture to form image-bearing light, the lamp deck including a plurality of lamp assemblies cooperatively operable with a power supply and filter means for balancing the light such that the power supply can power each of the plurality of lamp assemblies at approximately the same level; and (d) providing an improved lens deck disposed between the film deck and the paper deck having a plurality of projection assemblies for selectively magnifying the image-bearing light to produce magnified image-bearing light which projects off-center from the negative aperture onto the photographic paper within the exposure aperture of the paper deck, masking means for selectively blocking out portions of the magnified image-bearing light, and motor means for selectively positioning the masking means and the plurality of projection assemblies to produce photographic packages including composite prints and 10"×13" prints.

In accordance with yet another broad aspect of the present invention, an improved paper deck is provided within a photographic package printer, comprising an exposure aperture, means for transporting photographic paper to and from the exposure aperture, and means for automatically loading the photographic paper within the paper deck. The means for automatically loading includes first means for selectively maintaining the photographic paper in a substantially straight paper path during transportation to and from the exposure aperture and second means for selectively maintaining the photographic paper in a substantially straight paper path during transportation over the exposure aperture. The first means for selectively maintaining includes upper paper guide means for guiding an upper surface of the photographic paper during transportation to and from the exposure aperture and lower paper guide means for selectively guiding a lower surface of the photographic paper during transportation to and from the exposure aperture. The second means for selectively maintaining includes upper paper guide means for guiding the upper surface of the photographic paper during transportation over the exposure aperture and lower paper guide means for selectively guiding the lower surface of the photographic paper during transportation over the exposure aperture.

In accordance with another broad aspect of the present invention, an apparatus is provided for improving the print quality of a photographic printer comprising diffusion means for equalizing light emitted from a light source, and means for automatically cleaning the diffusion means so as to periodically remove dust and other unwanted particles from the diffusion means.

In still another broad aspect of the present invention, a method is provided for automatically cleaning a diffusion plate of a photographic printer, comprising the steps of: (a) providing a brush member in association with the diffusion plate; and (b) selectively engaging the brush member and the diffusion plate so as to remove dust and other unwanted particles from the diffusion plate.

In accordance with yet another broad aspect of the present invention, a system is provided for improving the print quality of a photographic package printer, wherein the printer has a supply of photographic film and means for selectively advancing the photographic film over a light source. The system includes an electrostatic charging means provided for applying an electrostatic charge to the film, brush means for brushing a surface of the film, and vacuum means for creating an air suction force away from a surface of the film. The electrostatic charging means cooperates with the brush means and the vacuum means to remove dust and other particles from the film during the advancement of the film to the light source.

In accordance with a still farther broad aspect of the present invention, a film cleaning assembly is provided for use in a photographic package printer. The film cleaning assembly comprises vacuum means for creating an air current which draws dust and related impurities away from the photographic film within the photographic package printer during transportation to a light source, electrostatic charging means for applying an electrostatic charge to the photographic film, and brush means disposed in between the electrostatic charging means and the light source for removing dust and related impurities from the photographic film during transportation to the light source.

In accordance with yet anther broad aspect of the present invention, a method is disclosed for automatically cleaning a supply of photographic film during transportation within a photographic printer, comprising: (a) applying an electrostatic charge to the film during transportation to repel dust and other foreign impurities from top and bottom surfaces of the film; (b) brushing the photographic film during transportation to remove the dust and other foreign impurities therefrom; and (c) vacuuming the dust and other foreign impurities from the film during transportation.

In another important aspect of the present invention, an apparatus is provided for selectively cropping light passing through a photographic negative in a photographic printer, wherein the apparatus comprises means for selectively positioning one of a plurality of negative cropping apertures within the light projecting between a photographic light source and the photographic negative.

In yet a further broad aspect of the present invention, a system is provided for selectively forming light passing from a photographic light source to a photographic negative in a photographic printer. The system includes cropping means having a plurality of apertures formed therein. The cropping means are slidably disposed between the photographic light source and the photographic negative. Also provided are translation means coupled to the cropping means for selectively translating the cropping means within the light passing from the photographic light source to the photographic negative. The translation means can be selectively operated to position one of the plurality of apertures of the cropping means within the light passing from the photographic light source to the photographic negative to produce a photograph having a predetermined border configuration.

In yet another important aspect of the present invention, a method is provided for selectively cropping light within a photographic printer to provide photographs having a plurality of different border configurations, comprising the steps of: (a) providing cropping means having a plurality of apertures formed therein; (b) positioning the cropping means in between a photographic light source and a photographic negative within the photographic printer; and (c) selectively translating the cropping means so as to position one of the plurality of apertures within light projecting from the photographic light source to the photographic negative.

In still a further broad aspect of the present invention, an apparatus is provided for optically rotating image-bearing light within a photographic printer approximately ninety degrees for projection onto photographic paper. The apparatus comprises first prism means, second prism means, third prism means, and magnification means. The first prism means is positioned to receive the image-bearing light from a photographic negative, the second prism means is positioned to receive the image-bearing light from the first prism means, and the third prism means is positioned to receive the image-bearing light from the second prism means. The first, second, and third prism means cooperate to optically rotate the image-bearing light approximately ninety degrees while maintaining the proper orientation of the image-bearing light as it projects upwardly from the photographic negative. The magnification means are provided for magnifying the rotated image-bearing light from the first, second, and third prism means to produce a photographic image on the photographic paper having a predetermined size.

In yet another important aspect of the present invention, a rotational prism assembly is provided for use in a photographic printer comprising a first prism member, a second prism member, and a third prism member. The first prism member has a light inlet surface, a light outlet surface disposed generally perpendicular to the light inlet surface, and an angular surface extending between the light inlet surface and the light outlet surface. The second prism member has a light inlet surface disposed generally parallel to the light outlet surface of the first prism member, a light outlet surface disposed generally perpendicular to the light inlet surface of the second prism member, and an angular surface extending between the light inlet and light outlet surfaces of the second prism member. The third prism member has a light inlet surface disposed generally parallel to the light outlet surface of the second prism member, a light outlet surface disposed generally perpendicular to the light inlet surface of the third prism member, and an angular surface extending between the light inlet and light outlet surfaces of the third prism member. The first, second, and third prism members cooperate to optically rotate image-bearing light projecting from a photographic negative approximately ninety degrees so as to produce a photographic image on photographic paper which is rotated approximately ninety degrees from the photographic negative while in the same orientation of as on the photographic negative.

In another broad aspect of the present invention, a method is provided for optically rotating image-bearing light within a photographic printer, comprising the steps of: (a) providing first prism means, second prism means, and third prism means for optically rotating the image-bearing light from a photographic negative approximately ninety degrees; (b) providing magnification means associated with the first, second, and third prism means for magnifying the image-bearing light to produce a photographic image on photographic paper having a predetermined size; and (c) positioning the first prism means within said image-bearing light such that the first prism means cooperates with the second and third prism means to optically rotate the image-bearing light approximately ninety degrees prior to projection on the photographic paper.

In still a further important aspect of the present invention, an improved lens assembly is provided for use in a photographic printer. The lens assembly comprises a first plurality of lenses, a second plurality of lenses, lens means, and transportation means. The first plurality of lenses are provided for producing wallet sized photographic images on photographic paper within an exposure aperture of the photographic printer. The second plurality of lenses are provided for producing sub-wallet sized photographic images of the photographic paper within the exposure aperture of the photographic printer. The lens means is provided for producing a photographic image approximately 5"×7" in size on the photographic paper within the exposure aperture of the photographic printer. The transportation means is provided for selectively transporting the first and second plurality of lenses and the lens means within the photographic printer. The transportation means can be selectively employed to position the first and second plurality of lenses and the lens means within image-bearing light projecting from a photographic negative to produce a plurality of wallet sized photographic images, a plurality of sub-wallet sized photographic images, and a 5"×7" photographic image on the photographic paper within the exposure aperture of the photographic printer with a single exposure of the photographic negative.

In still a further broad aspect of the present invention, in a photographic package printer, an improved lens assembly is provided comprising a 5"×7" lens assembly, a plurality of wallet lenses, a plurality of sub-wallet lenses, and selectively positionable support means. The plurality of wallet lenses are disposed adjacent to the 5"×7" lens assembly. The plurality of sub-wallet lenses are disposed adjacent to the 5"×7" lens assembly. The selectively positionable support means are provided for selectively positioning the 5"×7" lens assembly, the plurality of wallet lenses, and the plurality of sub-wallet lenses within image-bearing light projecting from a photographic negative to produce a 5"×7" photograph, a plurality of wallet sized photographs, and a plurality of sub-wallet sized photographs with a single exposure of the photographic negative.

In yet another broad aspect of the present invention, a system is provided for producing composite photographs within a photographic package printer. The system comprises composite lens means, means for selectively positioning the composite lens means, selectively positionable masking means, and bi-directional film transportation means. The composite lens means is provided for magnifying image-bearing light from a photographic negative to produce a plurality of magnified image-bearing light beams projecting toward photographic paper within an exposure aperture. The means for selectively positioning is provided for selectively positioning the composite lens means within the image-bearing light to produce the plurality of magnified image-bearing light beams. The selectively positionable masking means are disposed between the composite lens means and the photographic paper within the exposure aperture for selectively blocking out at least one of the plurality of magnified image-bearing light beams extending from the composite lens means. The bi-directional film transportation means are provided for selectively positioning one of a plurality of photographic negatives within a negative aperture to produce the image-bearing light. The bi-directional film transportation means cooperates with the masking means and the composite lens means to produce a composite photograph on the photographic paper within the exposure aperture comprising a plurality of individual photographic images where at least two of the plurality of individual photographic images are based on different photographic negatives.

In still another broad aspect of the present invention, a system is provided for equalizing the operation level of each of a plurality of additive light bulbs within a photographic lamphouse. The system comprises filtering means associated with each of the plurality of additive light bulbs for balancing the color of the light being emitted from each of the plurality of additive light bulbs such that each of the plurality of additive light bulbs may be powered at the same approximate level.

These and further objects and advantages of the present invention will be readily apparent to those skilled in the art from a review of the following detailed description of the preferred embodiment in conjunction with the accompanying drawings and appended claims.

BRIEF DESCRIPTION OF THE DRAWINGS

FIG. 19A is a top elevational view of a first projection assembly 314 within the lens deck 52 having a rotational prism assembly 356 for producing 10"×13" photographs and a lens unit 358 for producing 8"×10" photographs;

DETAILED DESCRIPTION OF THE PREFERRED EMBODIMENTS

Figure 1:
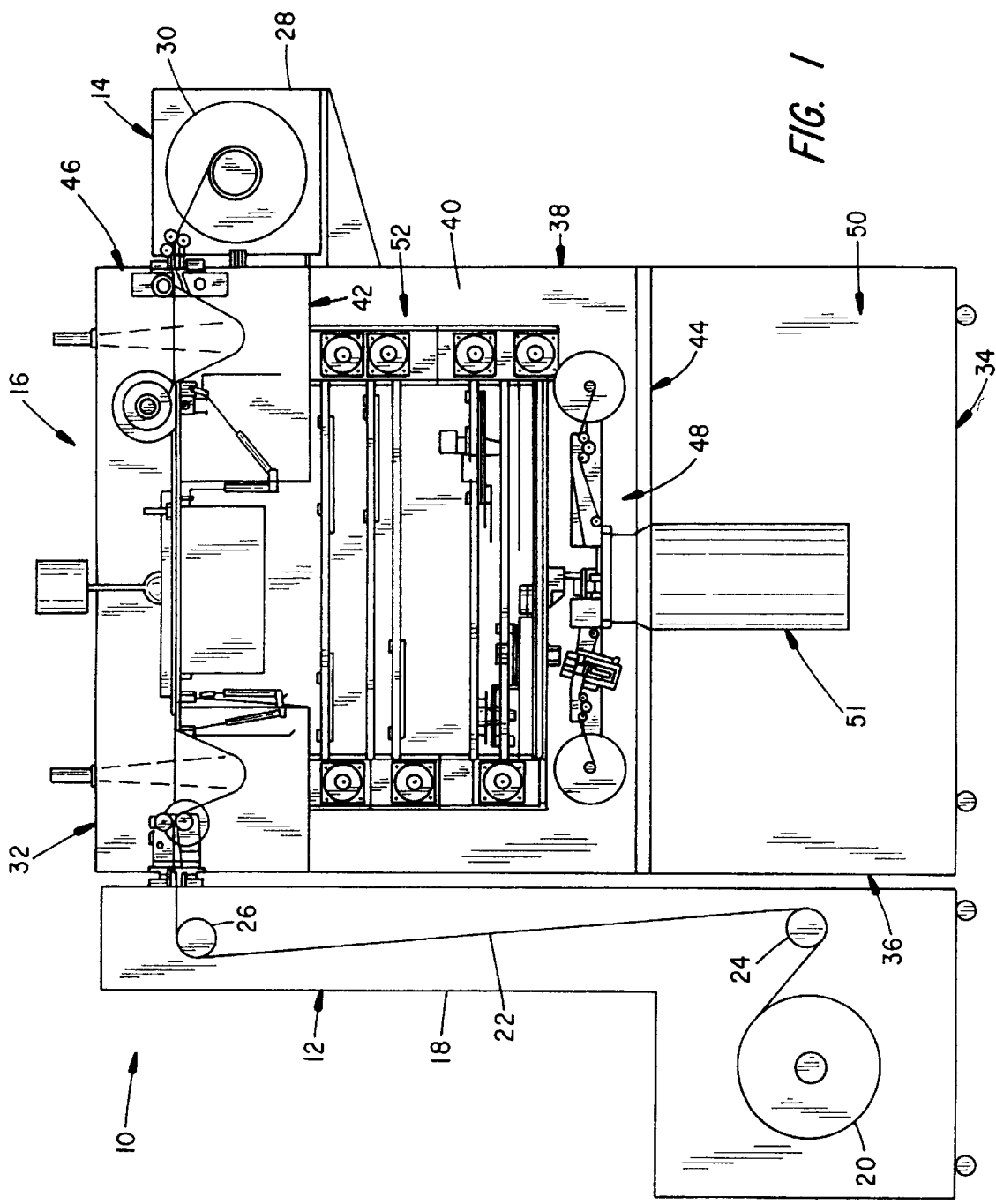
FIG. 1 is a side view of a high speed package printer 10 of the present invention with the covers removed to display the working parts.

FIG. 1 illustrates a high speed package printer 10 constructed in accordance with a preferred embodiment of the present invention with the front covers removed to display the working parts. The improved package printer 10 includes a paper supply cartridge 12, a paper take-up cartridge 14, and a high speed printing assembly 16 disposed therebetween. The paper supply cartridge 12 comprises a housing member 18 having a motor-driven supply spool 20 with a length of unexposed photographic paper 22 wound thereon, a first roller 24 for directing the paper 22 up to the top of supply cartridge 12, and a second roller 26 for directing the paper 22 outwardly toward the printing assembly 16. The paper 22 is approximately 10 inches wide and the supply spool 20 is capable of holding a length of up to 4,000 feet thereof. The paper take-up cartridge 14 comprises a housing member 28 having a motor-driven take-up spool 30 for receiving approximately 500 feet of paper 22 after it has been exposed within the printing assembly 16. As will be discussed in detail below, the paper supply cartridge 12 and the paper take-up cartridge 14 are detachably mounted to the printing assembly 16 in light-tight fashion such that the paper passing within the printing assembly 16 and, moreover, such that ambient light cannot invade the interior of either cartridge when disconnected from the printing assembly 16. Structurally, the printing assembly 16 includes a rigid housing having a top wall member 32, a bottom wall member 34, first side wall 36, a second side wall 38, a rear wall 40, an upper partition 42, and a lower partition 44. In terms of function, the printing assembly 16 includes a paper deck 46 disposed between the paper supply cartridge 12 and the paper take-up cartridge 14 containing various components for controlling the transportation and exposure of the paper 22 during operation, a film deck 48 disposed proximate the lower partition 44 for controlling the transportation and positioning of photographic film, a lamp deck 50 having a lamphouse 51 for passing light upward through the film deck 48 so as to produce image bearing light, and a lens deck 52 disposed between the film deck 48 and the paper deck 46 having a plurality of selectively positionable lenses for magnifying the image bearing light as it passes from the film deck 48 to the paper deck 46.

By way of overview, the paper deck 46 includes an improved exposure assembly for accurately maintaining the paper 22 in a predetermined projection plane to ensure proper focus, an improved paper-slack loop sensing arrangement for providing high speed paper advancing between the supply cartridge 12 and the take-up cartridge 14, and an improved paper loading feature for automatically feeding photographic paper 22 from the supply cartridge 12 to the take-up cartridge 14 at start-up. The improvements within the lens deck 52 include a rotational prism for generating 10"×13" photographs without physically rotating the film, off-center printing for allowing the paper 22 to be punched during the exposure period to decrease paper waste and decrease the amount of time between exposures, penumbra masking for producing photographs with sharply defined borders, composite masking for producing composite photographs comprising a plurality of different photographic images, and a 5"×7" retro-focus lens for producing a 13UP photograph comprising 9 wallet-size photographs, 3 sub-wallet size photographs, and a single 5"×7" photograph with a single exposure. The film deck 48 boasts a self-cleaning diffusion plate arrangement for automatically cleaning the diffusion plate after each sitting, an improved film cleaning assembly for ensuring that all potential contaminants are removed from the film prior to exposure, and a plurality of selectively positionable cropper masks disposed between the film and the diffusion plate for defining sharp borders on the image bearing-light which progresses upwardly from the film deck 48. The lamphouse 51 of the lamp deck 50 has an improved dichroic filtering arrangement for equalizing the level at which each of the additive light bulbs are powered such that all the light bulbs will have a substantially equal life and can therefore be replaced at the same time.

Paper Deck

Figure 2:
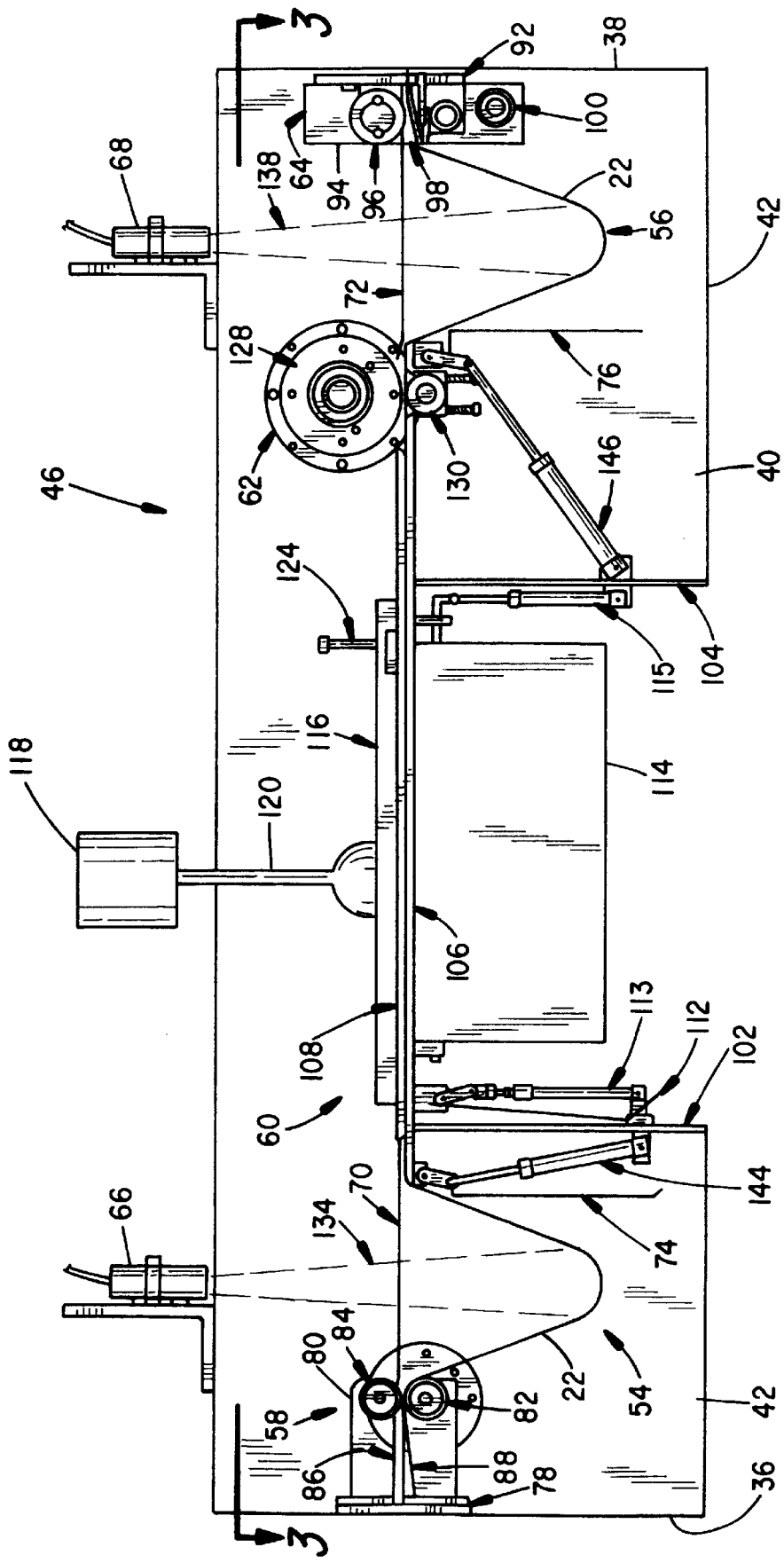
FIG. 2 is an enlarged side view of the paper deck 46 during normal operation.
Figure 3:
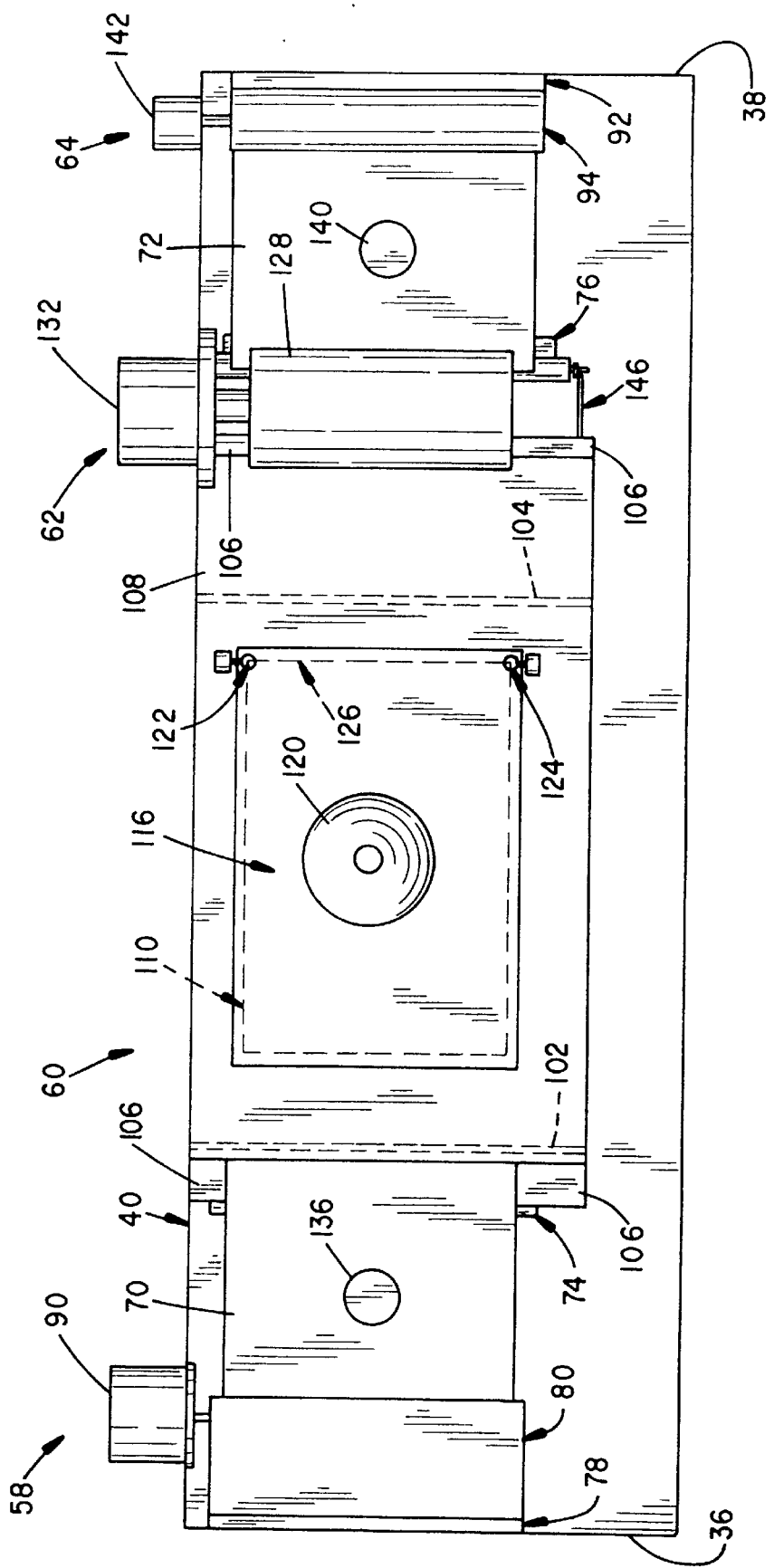
FIG. 3 is a top view of the paper deck 46 as shown in FIG. 2.

With reference to FIGS. 2 and 3, the paper deck 46 is shown during the normal operating mode with the paper 22 forming a first paper slack loop 54 and a second paper slack loop 56. The paper deck 46 includes a first paper drive unit 58, an exposure assembly 60, a second paper drive unit 62, a third paper drive unit 64, first and second ultrasonic proximity sensors 66, 68, first and second upper paper guide members 70, 72, and selectively actuable first and second bridge members 74, 76. The first paper slack loop 54 is formed between the first paper drive unit 58 and one end of the exposure assembly 60, while the second paper slack loop 56 is formed between the second paper drive unit 62 and the third paper drive unit 64. The first paper drive unit 58 is disposed along the first side wall 36 and includes a wall mount 78, an outer covering 80 which encloses a driver roller 82, a pinch roller 84, and opposed paper feed members 86, 88 which direct inwardly traveling paper between the pinch roller 84 and the drive roller 82. A motor 90 is provided to selectively rotate the drive roller 82 to advance paper inwardly toward the exposure assembly 60. The third paper drive unit 64 is constructed in much the same fashion as the first paper drive unit 58 so as to prohibit ambient light from penetrating into the interior of the paper deck 46 during operation. The third paper drive unit 64 includes a wall mount 92 and a cover member 94 which encloses a drive roller 96, an angled paper feed member 98, and a cutting assembly 100 for automatically cutting the paper 22 when the paper take-up cartridge 14 is to be detached and sent out for processing with the exposed paper 22 disposed therewithin. This automatic paper cutting feature is advantageous in that it eliminates the need to open up the paper deck 46 and/or the paper take-up cartridge 14 to manually cut the paper 22, thereby reducing any unwanted exposure to ambient light.

The exposure assembly 60 includes first and second side walls 102, 104 which extend vertically from the upper partition 92 and horizontally from the back wall member 40, a lower guide plate 106 fixedly attached to the upper edge of the first and second side walls 102, 104, and an upper guide plate 108 disposed in juxtaposed and spaced relationship with the lower guide plate 106 so as to define a paper path therebetween. The lower guide plate 106 has a curved first edge facing the first paper drive unit 58, an angled second edge facing the second paper drive unit 62, and an exposure aperture 110 within which an unexposed length of photographic paper 22 is positioned to receive image-bearing light from the lens deck 52 for the purposes of generating photographs. In a preferred embodiment of the present invention, the exposure aperture 110 is approximately 13 inches in length and 10 inches wide. A hinged mask member 112 is provided in association with a first actuating cylinder 113 for selectively reducing the length of the exposure aperture 110 during operation. A door member 114 is provided in association with a second actuating cylinder 115 to selectively close off the exposure aperture 110 for facilitating the improved paper loading feature of the present invention. The exposure assembly 60 also includes a vacuum platen 116 disposed over the exposure aperture 110 of the lower guide plate 106 for drawing the paper 22 into flush position against the upper guide plate 108 during each exposure period so as to maintain the paper 22 in a consistent projection plane. This is particularly advantageous in that it causes the paper 22 to lie absolutely flat against the upper guide plate 108 so as to eliminate any bends or kinks in the paper 22 which can cause the resulting photographs to be out of focus. To accomplish this suction force, the upper guide plate 108 is provided with a plurality of air holes and the vacuum platen 116 is connected to a vacuum pump 118 via a hose member 120.

The vacuum platen 116 also includes a pair of apertures (not shown) through which a first and a second paper punching actuator 122, 124 may be selectively operated to create notches along the either side of the paper 22 proximate the leading edge 126 of the exposure aperture 110. More specifically, the first paper punching actuator 122 punches a notch along one side of the paper 22 for the purpose of marking the end of each exposure, while the second paper punching actuator 124 punches a notch along the opposite side of the paper 22 for the purpose of marking the end of each photographic session. As will be discussed in greater detail below, the lens assemblies of the lens deck 52 provide for off-center printing such that the first and second hole punching actuators 122, 124 can perform the desired marking while the paper 22 is being exposed by the image bearing light from the lens deck 52. This is advantageous over the prior art package printers which print on-center with the negative in that such on-center printing systems require a separate advancing step after each exposure in order to position the edge of the photograph with the hole punching actuators which are located at the leading edge of the exposure aperture. By performing the marking and the exposures simultaneously, the present invention is able to eliminate the extra advancing step found in the prior art so as to decrease the amount of time between each exposure, thereby increasing the overall speed of the improved printer 10.

The second paper drive unit 62 is the primary driving force when advancing an unexposed portion of the paper 22 into position above the exposure aperture 110 of the exposure assembly 60. The second paper drive unit 62 includes a drive roller 128, an optically encoded pinch roller 130, and a motor 132 for rotating the drive roller 128. In order to maximize the speed at which the paper 22 may be advanced within the paper deck 46, the second paper drive unit 62 is communicatively linked with the vacuum pump 118 so as to turn off the suction force to the vacuum platen 116 in between exposures such that the paper 22 may be advanced without any hindrance from the vacuum platen 116. Moreover, in an important aspect of the present invention, the speed of the paper advance is sharply increased by employing the first and second ultrasonic proximity sensors 66, 68 to form the first and second paper slack loops 54, 56, respectively. As noted above, the first and second paper slack loops 54, 56 each serve as a buffer or reservoir of paper 22 such that the exposed paper 22 within the exposure aperture 110 may be quickly advanced and replaced with a fresh, unexposed portion of paper 22 without being limited by the speed at which the paper supply spool 20 within the paper supply cartridge 12 can pay out the paper 22. In that the exposure aperture 110 is approximately 13 inches in length, the first and second paper slack loops 54, 56 must be maintained at approximately 13 inches so as to rapidly replace the exposed photographic paper 22 within the exposure aperture 110 with a fresh and unexposed portion of paper 22 to prepare for the next set of exposures. To accomplish this, the first proximity sensor 66 is positioned mid-way between the first paper drive unit 58 and the curved first edge of the lower guide plate 106 so as to direct an ultrasonic beam 134 downward through an aperture 136 formed in the first upper paper guide member 70 and into the first paper slack loop 54, while the second proximity sensor 68 is positioned in between the second paper drive unit 62 and the third paper drive unit 64 so as to direct an ultrasonic beam 138 through an aperture 140 formed within the second upper paper guide member 72 and into the second paper slack loop 56. In this arrangement, the improved high speed package printer 10 of the present invention is capable of advancing the paper 22 the required distance of 13 inches in approximately 0.25 seconds.

In addition to providing high speed paper advancing, the first and second ultrasonic proximity sensors 66, 68 also decrease the amount of time required to reform the paper slack loops 54, 56 following each advance, thereby allowing a greater number of paper advances to be performed within a given period of time. More specifically, the ability to quickly reform the first and second paper slack loops 54, 56 stems from the fact that the first and second proximity sensors 66, 68 dynamically measure the length of the respective paper slack loops 54, 56. The first proximity sensor 66 is communicatively linked to the drive motor 90 of the first paper drive unit 58 in a feedback arrangement such that the speed of the drive roller 82 will be increased or decreased dynamically depending on the actual length of the first paper slack loop 54 so as to quickly return the first paper slack loop 54 to a length of approximately 13 inches. In similar fashion, the second proximity sensor 68 is connected to a motor 142 of the third paper drive unit 64 in a feedback arrangement such that the speed of the drive roller 96 will be dynamically changed depending on the contemporaneous paper slack loop length measured during the paper advancing stage so as to quickly reform the second paper slack loop 56 having a length of 13 inches. By dynamically measuring the paper slack loops with ultrasonic sound waves, the first and second proximity sensors 66, 68 of the present invention are much more responsive than the various paper slack loop sensing arrangements discussed supra and are therefore capable of increasing the overall speed of the improved high speed printer 10 of the present invention.

Figure 4:
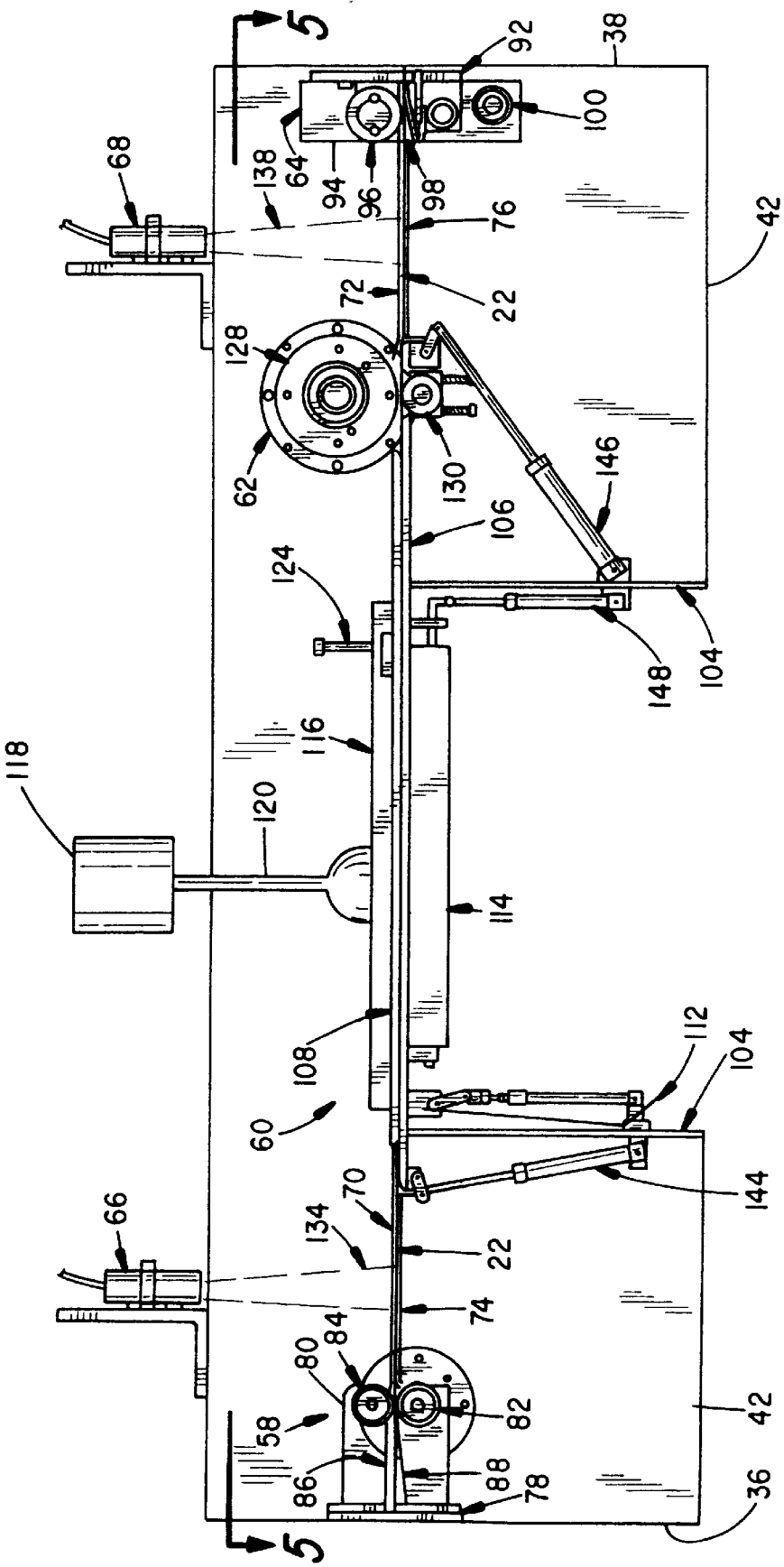
FIG. 4 is an enlarged side view of the paper deck 46 illustrating an automatic paper loading feature of the present invention.
Figure 5:
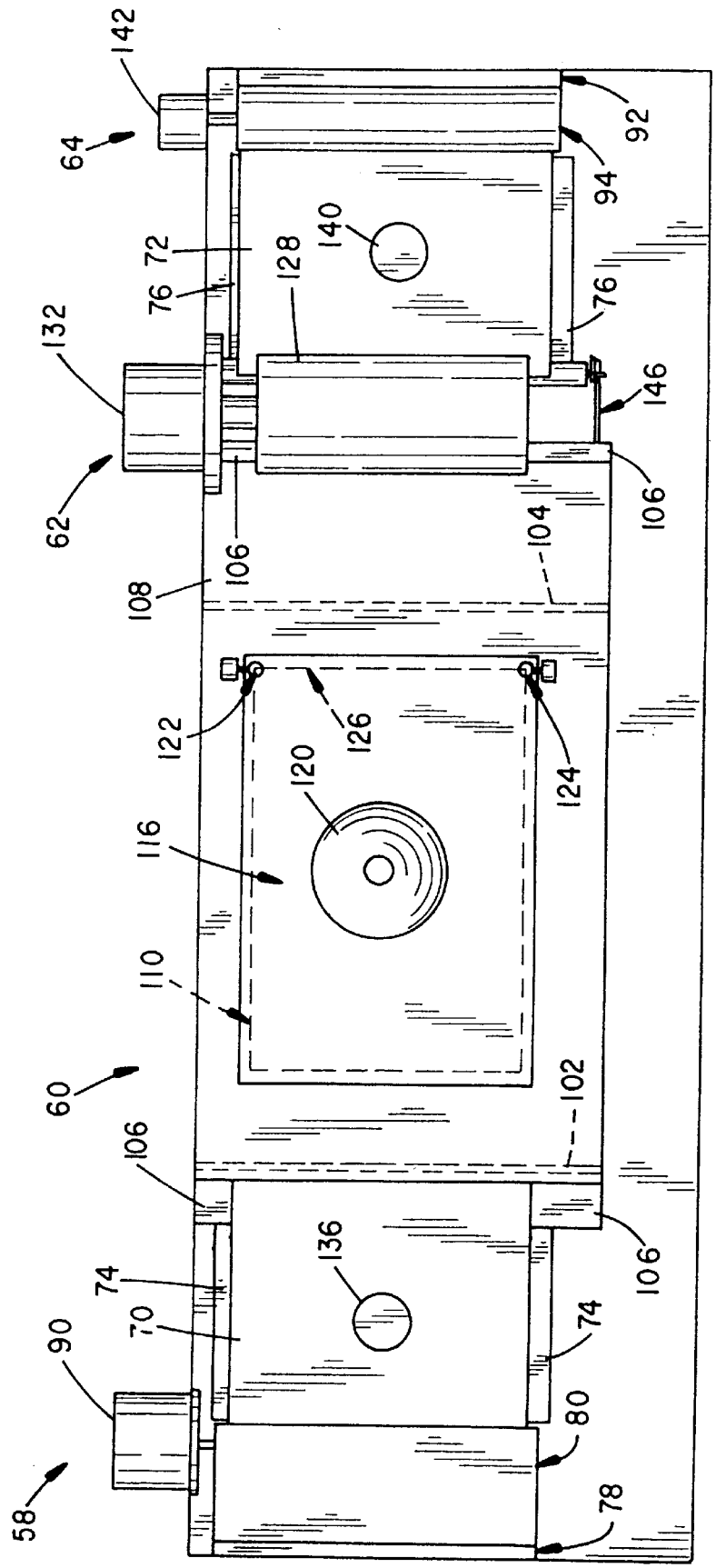
FIG. 5 is a top view of the paper deck 46 as shown in FIG. 4.

With collective reference to FIGS. 4 and 5, the automatic paper loading feature of the present invention will now be discussed. In general, the ability to automatically load paper 22 into the paper deck 46 is accomplished by providing a substantially continuous and straight paper path which extends from a paper inlet port within the first paper drive unit 58 to a paper inlet port in the paper take-up cartridge 14 such that the paper 22 can be driven quickly into and through the paper deck 46 without bunching up or fouling in the process. In order to create such a straight paper path, the first and second bridge members 74, 76, as well as the door member 114, are moved into the generally horizontal positions shown. The selective positioning of the first and second bridge members 74, 76 is accomplished through the use of a third and a fourth actuating cylinder 144, 146, respectively, while the selective positioning of the door member 114 is accomplished via the second actuating cylinder 115. In this arrangement, then, the paper 22 is initially fed into and through the paper inlet port of the paper deck 46 such that the leading edge of the paper 22 is guided by the opposing paper feed members 86, 88 so as to arrive at the junction point between the drive roller 82 and the pinch roller 84 of the first paper drive unit 58. Upon activation the drive roller 82 of the first paper drive unit 58 will force the paper 22 through the paper path formed between the first upper paper guide member 70 and the first selectively actuable bridge member 74.

The first upper paper guide member 70 extends up to the approximate edge of the upper guide plate 108 and the first bridge member 74 extends up to the first curved edge of the lower guide plate 106 such that the paper continues to progress in an unimpeded fashion in the paper path defined between the upper and lower guide plates 108, 106. The door member 114 has a raised portion having approximately the same dimensions as the exposure aperture 110 so as to effectively fill in the exposure aperture 110 when the door member 114 is disposed in the horizontal position shown, thereby eliminating any friction points where the paper 22 can snag. The door member 114 may also be equipped with rib members having angled end portions so as to minimize the amount of contact between the paper 22 and the exposure assembly 60. In any event, the paper 22, under the initial driving force of the motor 90 within the first paper drive unit 58, continues to the end of the paper path defined between upper and lower guide plates 108, 106 such that the leading edge of the paper 22 lodges between the drive roller 128 and the pinch roller 130 of the second paper drive unit 62. The motor 132 of the second paper drive unit 62 will thereafter add to the initial driving force provided by the motor 90 of the first paper drive unit 58 so as to propel the paper 22 through a paper path defined between the second upper paper guide member 72 and the second bridge member 76 and into contact with the drive roller 96 within the third paper drive unit 64.

Figure 6:
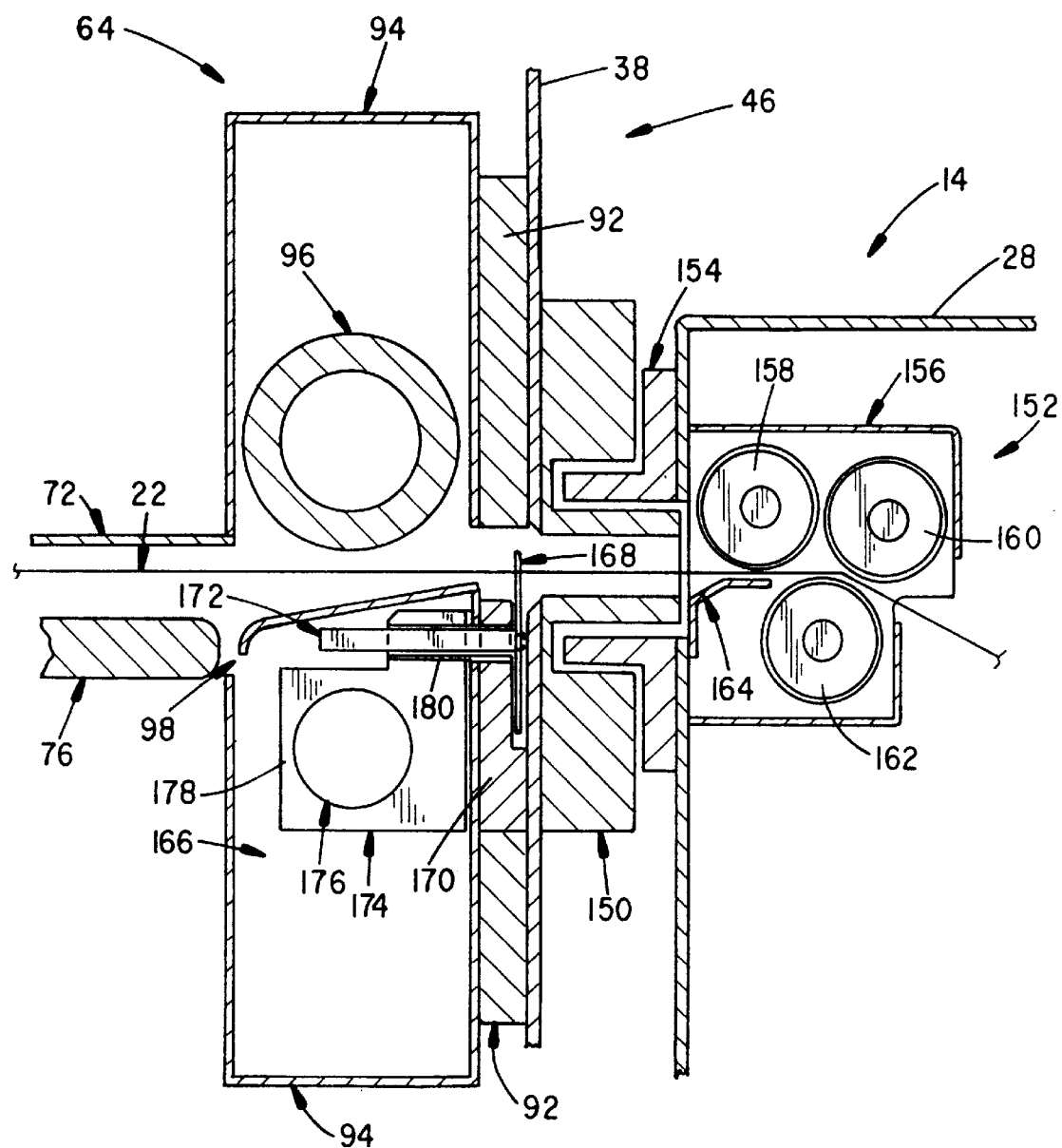
FIG. 6 is an enlarged view illustrating the light-tight coupling between the paper deck 46 and the paper take-up cartridge 14.

FIG. 6 is an enlarged view illustrating the connection between the paper deck 46 and the paper take-up cartridge 14 shown generally in FIG. 1 to further explain the automatic paper loading feature of the present invention, as well as the light-tight junction between the paper take-up cartridge 14 and the printing assembly 16. As can be seen, the second upper paper guide member 72 is connected to the outer edge of the cover member 94 and the second bridge member 76 extends up to the approximate edge of the paper guiding member 98 such that the paper 22 will simply progress into contact with the drive roller 96 of the third paper drive unit 64. This engagement will thereafter propel the paper 22 through the third paper drive unit 64, the wall mount 92, the second side wall 38, and a first coupling member 150 before passing into and through a roller assembly 152 within the take-up cartridge 14. A second coupling member 154 is attached to the exterior surface of the housing member 28 of the take-up cartridge 14 so as to mutually engage with the first coupling member 150. The roller assembly 152 includes a cover member 156 having a first roller 158, a second roller 160, a third roller 162, and an angled guide member 164. The angled guide member 164 serves to force the leading edge of the paper 22 into contact with the first roller 158. The first roller 158 cooperates with the second and third rollers 160, 162 to accept the paper 22 into the interior of the paper take-up cartridge 14. The cover of the paper take-up cartridge 14 may thereafter be opened up so as to connect the paper 22 to the take-up spool 30. Following this, the cover is replaced so as to enclose the interior of the paper take-up cartridge 14 such that printing operations may ensue immediately thereafter.

With continued reference to FIG. 6, as the printing operations are conducted within the printing assembly 16, the take-up spool 30 within the paper take-up cartridge 14 will eventually reach its capacity such that the exposed photographic paper 22 disposed therein must be sent out for processing. In this instance, the automatic cutting feature of the present invention should be employed to a sever the paper 22 such that the paper take-up cartridge 14 may be detached from the printing assembly 16. To accomplish this, a rotating knife assembly 166 is provided including a circular blade member 168, a blade containment block 170 extending between the second side wall 38 and the cover member 94, a shaft member 172 extending between the circular blade member 168 and a motor assembly 174. The motor assembly 174 includes a motor 176, a block 178 having a shaft translation aperture 180, and a plurality of gears and/or belts (not shown) for rotating the shaft member 172 and translating the shaft member 172 back and forth within the shaft translation aperture 180. The blade containment block 170 and the shaft translation aperture 180 are both sufficiently greater than the 10 inch width of the paper 22 such that the shaft member 172 may be translated along the entire length of the shaft translation aperture 180 while rotating the circular blade member 168 to thereby sever the paper 22. As noted above, the roller assembly 152 of the paper take-up cartridge 14 provides a light-tight seal such that it may be removed from the printing assembly 16 without having ambient light infiltrate and damage the exposed photographic paper 22 within the take-up cartridge 14. The rotating knife assembly 166 further assists in this regard by allowing the paper 22 to be severed in an automatic fashion without the need to open the paper deck 46 and/or the paper take-up cartridge 14, thereby ensuring that the sensitive photographic paper 22 within the paper take-up cartridge 14 and the paper deck 46 are protected from ambient light during transportation for developing. Furthermore, the automatic cutting feature is performed in quick fashion without the need for manual cutting by a worker which saves time and operating costs.

Film Deck

Figure 7:
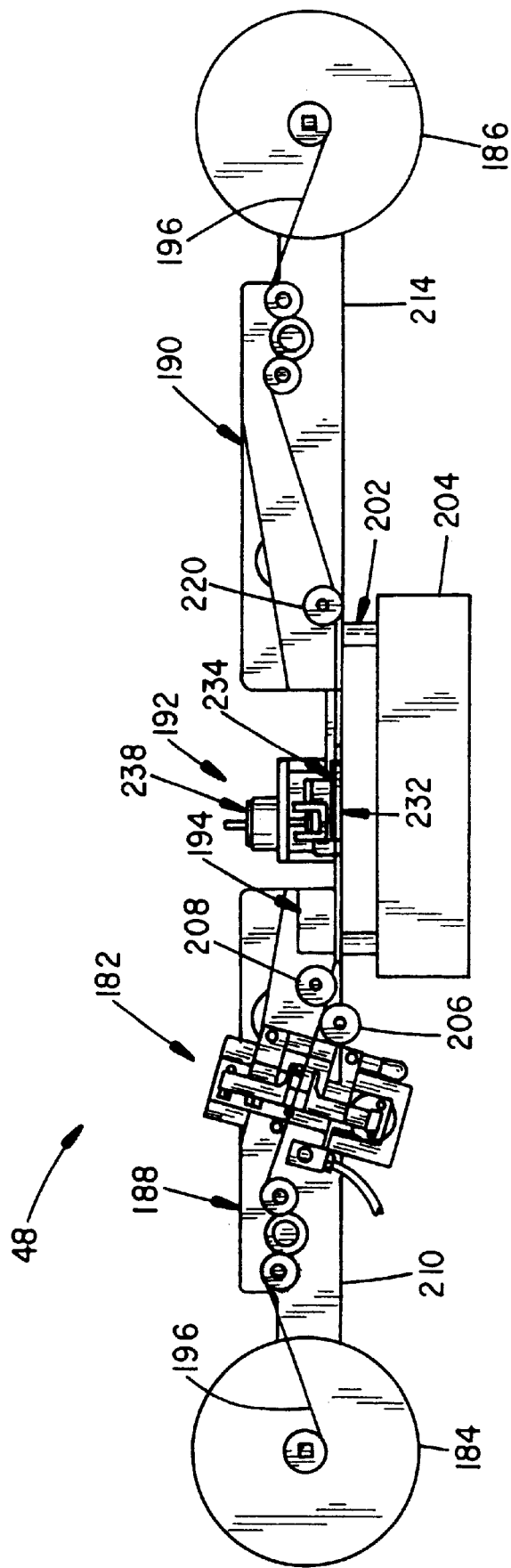
FIG. 7 is an enlarged side view of the film deck 48 of the present invention.
Figure 8:
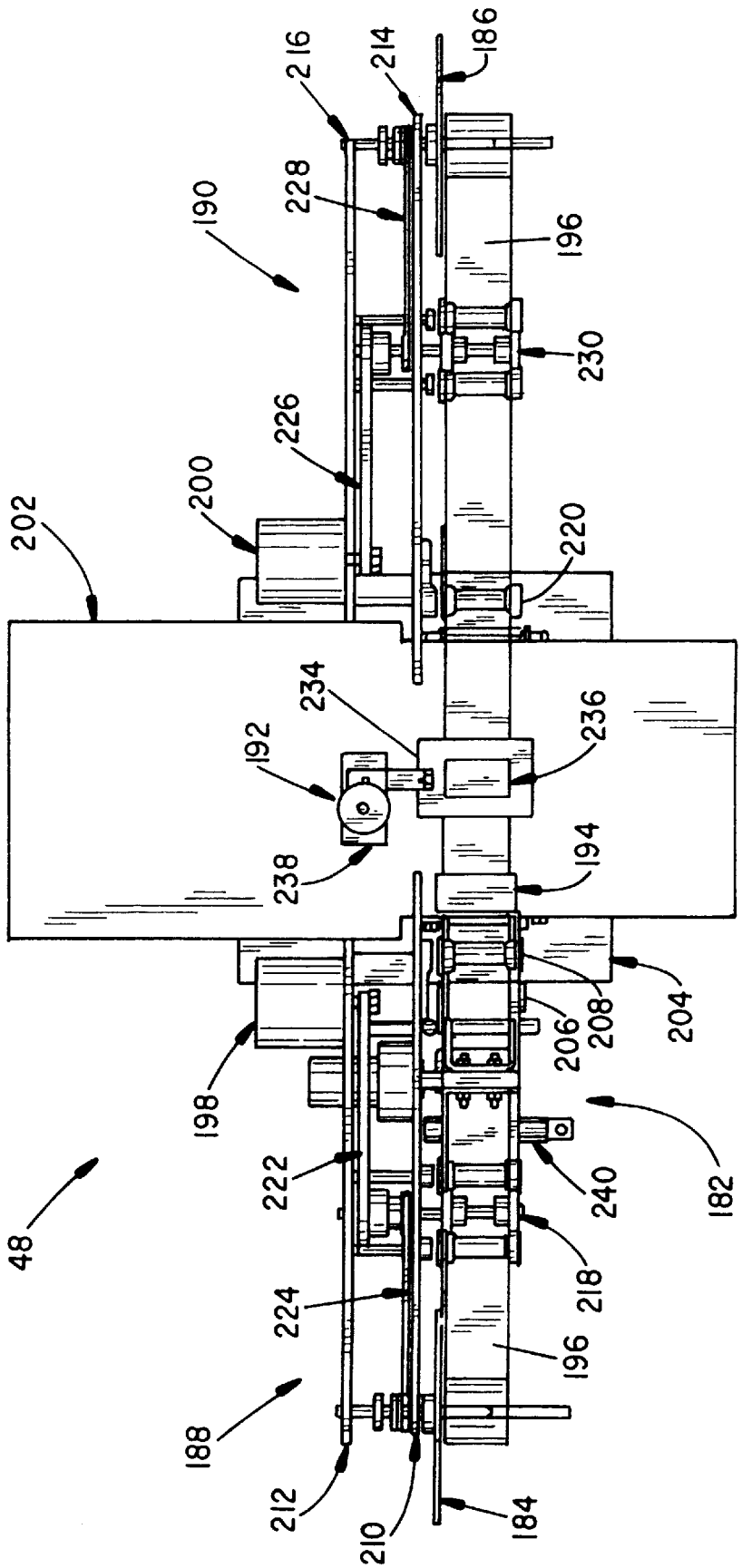
FIG. 8 is a top view of the film deck 48 as shown in FIG. 7.

With reference now to FIGS. 7 and 8, illustrated in detail is the film deck 48 constructed in accordance with a preferred embodiment of the present invention. As noted above, the film deck 48 offers several significant advantages over the prior art so as to increase the overall speed of operation and print quality. Namely, the film deck 48 provides bi-directional film movement for producing composite prints, an improved film cleaning arrangement for removing any impurities from the film prior to exposure, an improved cropping arrangement in between a diffusion plate and the film for sharply defining the borders of the image bearing light which progresses from the film deck 48 toward the lens deck 52, and a diffusion plate cleaning arrangement for automatically cleaning the diffusion plate after a predetermined number of exposures. The film deck 48 accomplishes these features by providing a film supply spool 184 disposed at the end of a first arm member 188, a film take-up spool 186 disposed at the end of a second arm member 190, a negative holder assembly 192 disposed in between the first and second arm members 188, 190, a film cleaning assembly 182 disposed along the first arm member 188, a negative cropping assembly (not shown) disposed within a cover member 202, a diffusion plate cleaning assembly (not shown) disposed within a cover member 204, and a bar code reader 194 disposed proximate the negative holder 192. Each negative of the film 196 contains bar code information which indicates what types of photographs the customer has ordered for that particular negative. The bar code reader 194 scans the bar code information into a microprocessor-based controller (not shown) which then controls the system so as to produce a custom-made package of preselected photographs.

The first arm member 188 includes a front support wall 210 and a rear support wall 212 disposed in parallel relationship and extending laterally away from the cover member 202. The second arm member 190 is constructed in identical fashion as the first arm member 188, including a front support wall 214 and a rear support wall 216. A pair of bi-directional motors, namely a first motor 198 and second motor 200, are fixed to the rear support walls 212, 216, respectively, and communicatively linked to the microprocessor-based controller (not shown) for selectively driving the film 198 in the forward and reverse directions depending upon what types of photographs are desired. The first motor 198 is coupled to the film supply spool 184 via a first belt 222 and a second belt 224 which cooperate with a drive roller 218 to transfer the driving force of the first motor 198 to the supply spool 184. The second motor 200 is coupled to the film take-up spool 186 via a first belt 226 and a second belt 228 which cooperate with a drive roller 230 to transfer the driving force of the second motor 200 to the take-up spool 186. A first sticky roller 206 and a second sticky roller 208 are provided in between the film cleaning assembly 182 and the negative holder 192 for removing dust and similar impurities from the top and bottom surfaces of the film 196, respectively, as the film 196 travels in the forward direction, i.e. from the supply spool 184 to the take-up spool 186. In similar fashion, a third sticky roller 220 is provided in between the film take-up spool 186 and the negative holder assembly 192 for removing impurities from the top surface of the film 196 as it travels in the reverse direction, i.e. from the take-up spool 186 to the supply spool 184.

The negative holder assembly 192 includes a fixed lower plate member 232 having a projection aperture (not shown) formed therethrough, a moveable upper plate member 234 having a projection aperture 236 formed therethrough, and a lever mechanism 238 for selectively maneuvering the upper plate member 234 into one of an open state and a closed state. In the open state, the lever mechanism 238 raises the upper plate member 234 away from the lower plate member 232 such that the film 196 may be freely advanced or reversed until a predetermined negative is centered over the projection aperture (not shown) of the lower plate member 232. Once this occurs, the lever mechanism 238 positions the upper plate member 234 in the closed state by lowering the upper plate member 234 into flush contact with the lower plate member 232 so as to sandwich the predetermined negative of the film 196 therebetween. This aligns the projection apertures 236 of the upper and lower plate members 234, 232 and maintains the predetermined negative in a fixed vertical position such that the light from the lamp deck 50 can pass through the predetermined negative within the film 196 to form image-bearing light which thereafter projects upwards to the lens deck assembly 52. Once the predetermined negative is no longer needed, the upper plate member 234 is raised via the lever mechanism 238 such that the film 196 may be selectively advanced or reversed to place a new predetermined negative in position within the negative holder 192.

In an important aspect of the present invention, this bi-directional film movement enables the package printer 10 to generate composite photographs based on a plurality of individual photographic negatives. As will be described in greater detail below, this is accomplished by providing a composite lens assembly having a plurality of different lenses, selectively advancing and/or reversing the film 196 over the lamp house 50 to sequentially project a plurality of different image-bearing light beams upward to the composite lens assembly, and selectively masking the magnified image-bearing light produced by the composite lens assembly such that only one photographic image is created on the paper 22 within the exposure aperture 110 for each negative selected to form the composite photograph. This is a marked improvement over the prior art package printers in that it enables the package printer 10 to produce an entire photographic package, including both composite and individual photographs, in immediate succession without the need to employ a separate composite printer, thereby saving substantial amounts of processing time when composite photographs are desired. Eliminating the need to transfer the film to a separate composite printer also reduces the risk of damaging the film and ensures that the composite photographs will share the same color balance as the individual photographs, thereby increasing the overall print quality of the photographic package.

Figure 9A:
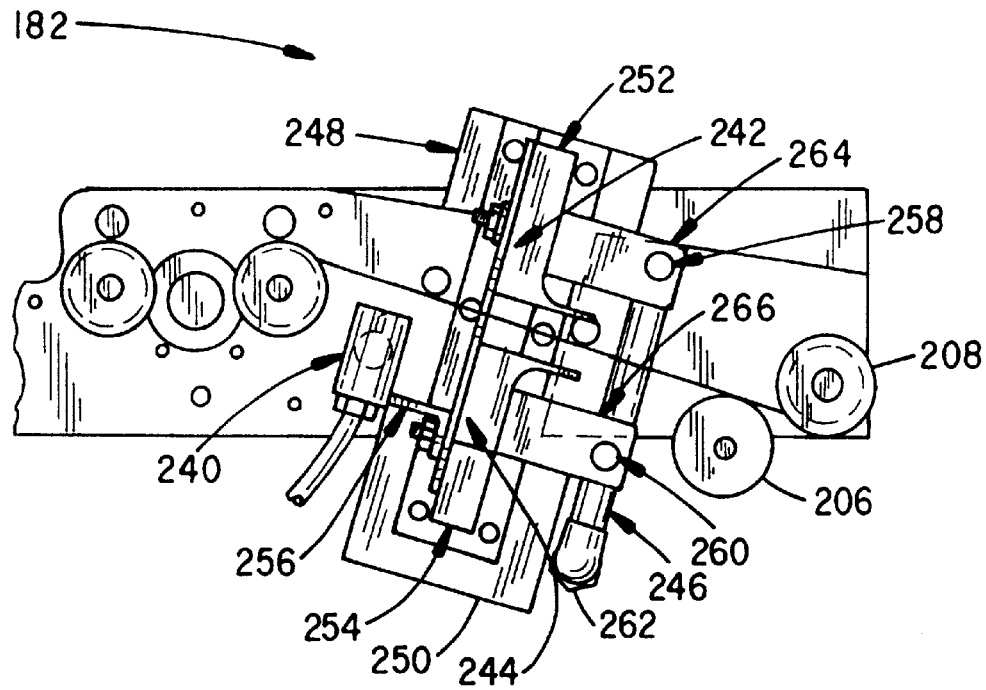
FIG. 9A is an enlarged side view of the automatic film cleaning assembly 182 of the present invention.
Figure 9B:
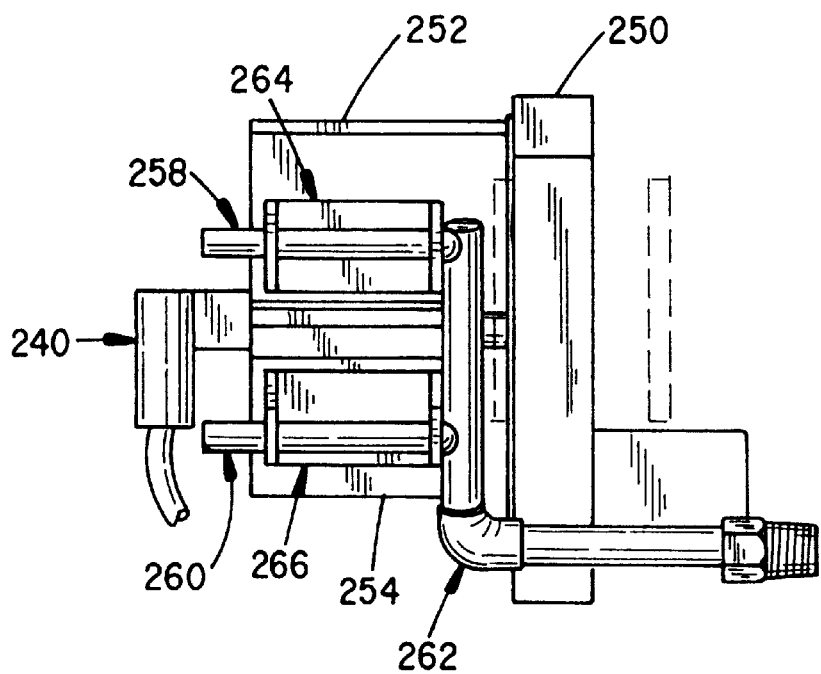
FIG. 9B is an end view of the automatic film cleaning assembly 182 as shown in FIG. 9A.
Figure 9C:
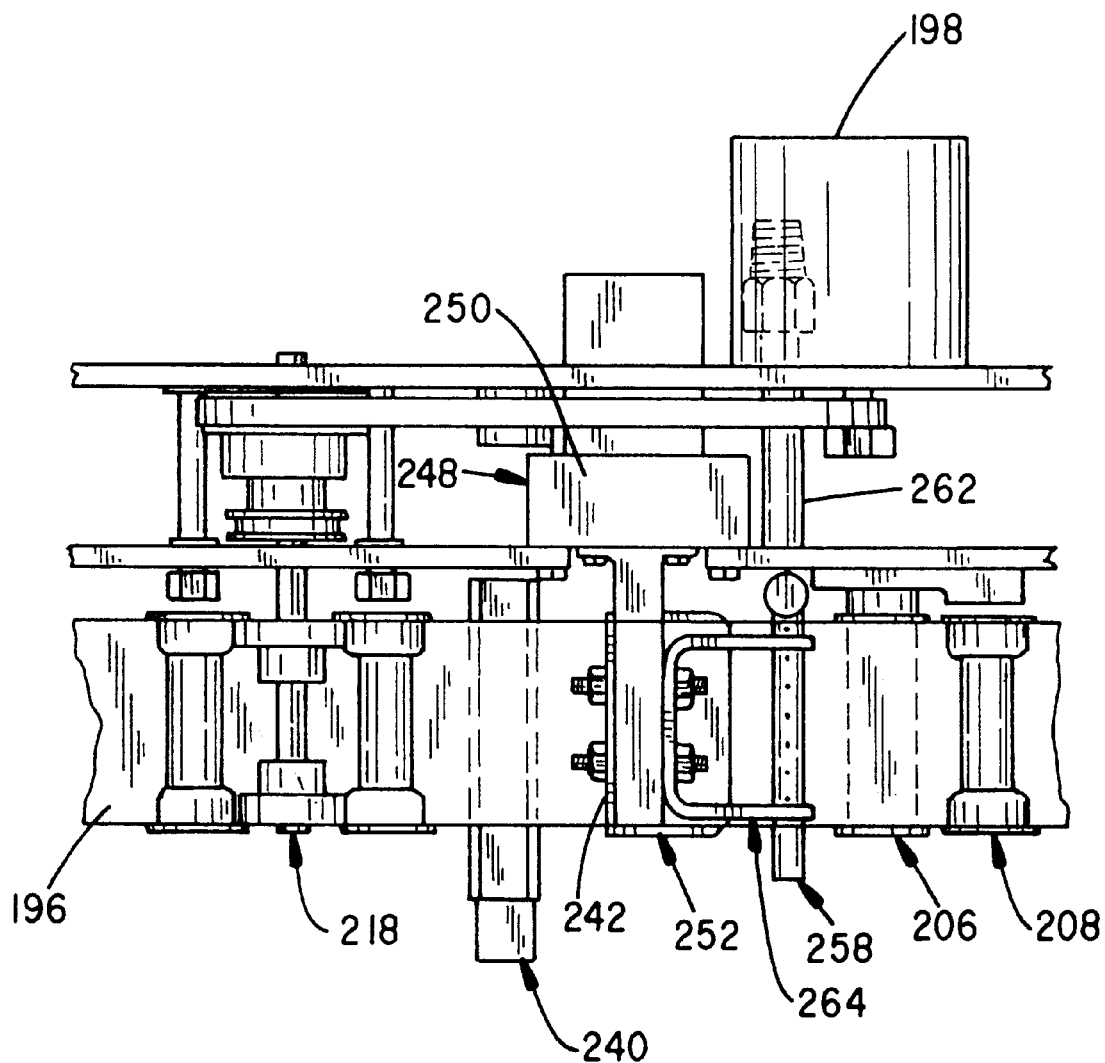
FIG. 9C is a top view of the automatic film cleaning assembly 182 as shown in 9A.

With reference to FIGS. 9A–9C, the automatic film cleaning assembly 182 of the present invention includes an electrostatic charging device 240, an upper brush member 242, a lower brush member 244, and a vacuum assembly 246 which collectively remove dust particles and similar impurities from the film 196 so as to reduce the incidence of blurring imperfections on the resulting photographic prints. In a preferred embodiment, a mounting assembly, indicated generally at 248, is provided to properly position the electrostatic charging device 240, the upper brush member 242, the lower brush member 244, and the vacuum assembly 246 relative to the film 196 to ensure for the adequate removal of impurities from the film 196. The mounting assembly 248 includes a base portion 250, an upper mounting member 252, and a lower mounting member 254. The upper and lower mounting members 252, 254 extend perpendicularly from an outwardly facing surface of the base portion 250 and are disposed in spaced relation so as to allow the film 196 to pass therebetween.

The electrostatic charging device 240 is positioned in close proximity to the lower surface of the film 196 through the use of a brace member 256 so as to apply an electrostatic charge to the film 196, as well as any dust and other impurities disposed on the top or bottom surface of the film 196. This serves to repel the dust and other unwanted impurities away from the top and bottom surfaces of the film 196. By establishing such an electrostatically charged condition, the present invention advantageously "loosens" the unwanted impurities from the film 196 such that they may be readily removed from the film 196 via the upper and lower brush members 242, 244, the vacuum assembly 246, or other dust-removing means such as an air jet or sticky rollers. In a preferred embodiment, the electrostatic charging device 240 is a model 4004707 produced by SIMCO. However, it is to be understood that any number of different types of electrostatic charging devices may be employed in the aforementioned fashion without departing from the scope of the present invention. Moreover, it is fully anticipated that the electrostatic charging device 240 may be disposed proximate the bottom and/or top surface of the film 196 without departing from the scope of the present invention.

The upper brush member 242 and lower brush member 244 are positioned on the mounting assembly 248 such that their opposing ends collectively sandwich and contact the top and bottom surfaces, respectively, of the film 196 as it passes through the cleaning assembly 182. The upper and lower brush members 242, 244 are detachably mounted to the upper and lower mounting members 252, 254, respectively, via any number of readily available attachment means, including but not limited to bolts, Velcro (TM), adhesives, or grooves formed within the upper and lower mounting members 252, 254 for slidably receiving the upper and lower brush members 242, 244, respectively. In a preferred embodiment, the individual brush members 242, 244 comprise carbon filament brushes. However, those skilled in the art will appreciate that any number of different types of brushes may be employed in this fashion without departing from the scope of the present invention.

In its broadest sense, the vacuum assembly 246 of the present invention comprises an upper vacuum member and a lower vacuum member 260 disposed in close proximity to the upper and lower surfaces of the film 196, respectively, so as to exact a collective suction force which draws dust and related impurities away from the film 196. In a preferred embodiment, the upper and lower vacuum members 258, 260 are hollow in construction and connected to a vacuum pump (not shown) via an L-shaped tube member 262. More specifically, the upper and lower vacuum members 258, 260 each have a plurality of apertures which face the upper and lower surface of the film 196, respectively, such that a suction airflow will be established into the upper and lower vacuum members 258, 260 when the vacuum pump (not shown) is operated. In a preferred embodiment, the first and second vacuum members 258, 260 extend perpendicularly from the tube member 262 at fixed locations along the length thereof and are coupled to the upper and lower mounting members 252, 254, respectively, via an upper bracket member 264 and a lower bracket member 266. The amount of suction force generated within the upper and lower vacuum members 258, 260 may be controlled by selectively adjusting the operating speed of the vacuum pump (not shown) and/or by selectively adjusting the position of the upper and lower vacuum members 258, 260 relative to the film 196.

Taken collectively, then, the electrostatic charging device 240, the upper and lower brush members 242, 244, and the vacuum assembly 246 augment the film cleaning ability of the first, second, and third sticky rollers 206, 208, 220 such that the improved film cleaning assembly 182 of the present invention greatly reduces the amount of dust and related impurities on the top and bottom surfaces of the film 196. This results in several significant advantages over the prior art technique of merely employing sticky rollers to remove these unwanted impurities. First, by reducing the amount of dust and similar impurities on the film 196, the film cleaning assembly 182 of the present invention lowers the frequency at which dust-related imperfections occur on the resulting photographic prints such that the need to manually touch up the prints is practically eliminated. This is advantageous in that it saves valuable processing time and improves the overall print quality. The film cleaning assembly 182 of the present invention is also advantageous in that it performs its dust removing functions before the film reaches the first, second, and third sticky rollers 206, 208, 220, thereby decreasing the amount of dust and related articles which will accrue on the first, second, and third sticky rollers 206, 208, 220 within a given period of time. This has the overall effect of reducing the frequency at which these sticky rollers need to be cleaned or replaced, thereby reducing the amount of system down time devoted to such cleaning or replacement activities.

Figure 10:
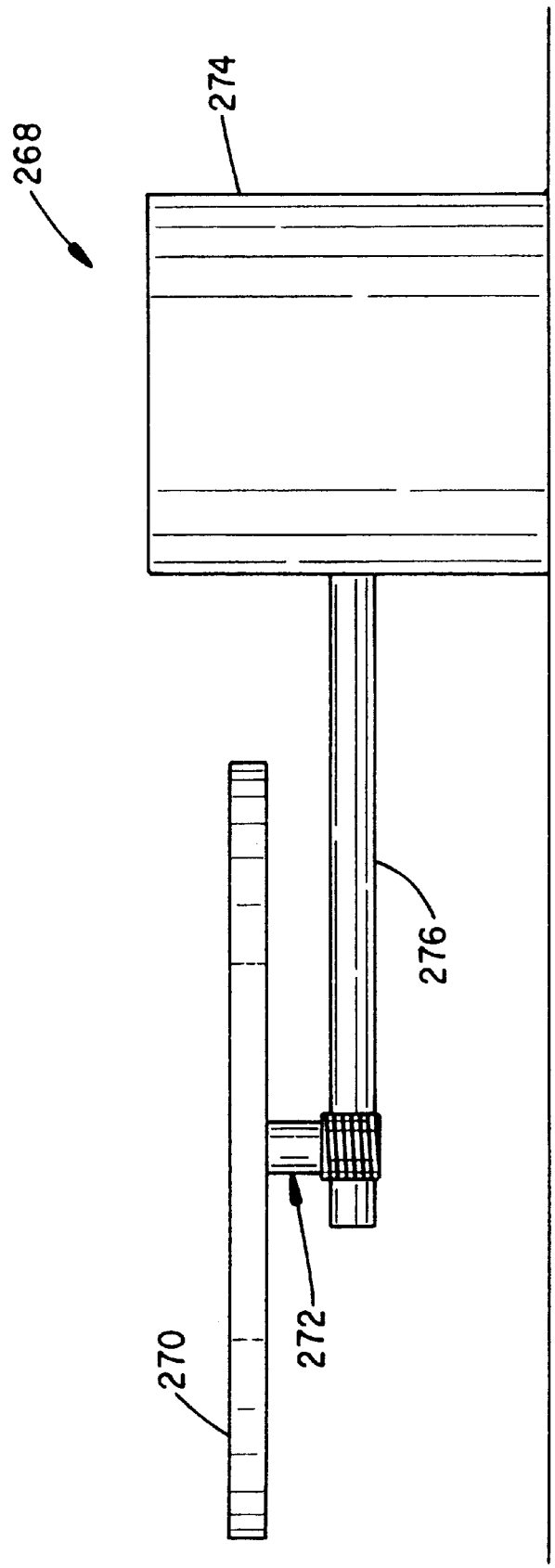
FIG. 10 is an enlarged side view of the improved negative cropping assembly 268 of the present invention.
Figure 11:
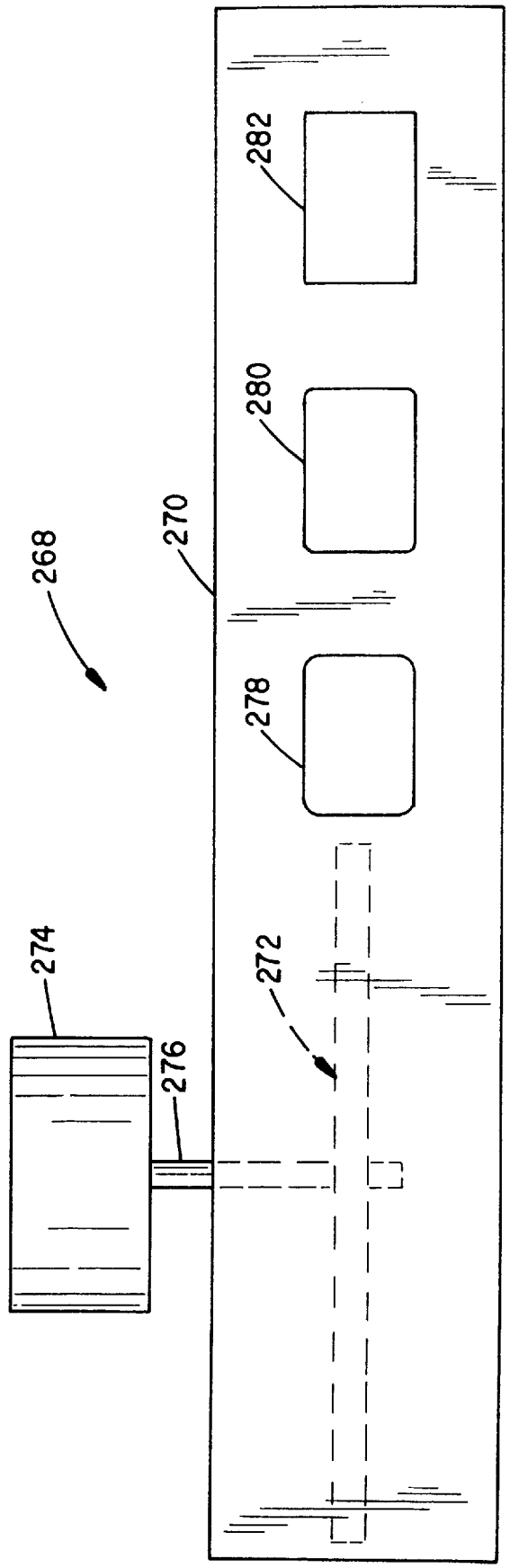
FIG. 11 is a top view of the improved negative cropping assembly 268 as shown in FIG. 10.

FIGS. 10 and 11 illustrate yet another important feature of the present invention, namely an improved negative cropping assembly 268 for selectively defining the borders of the image bearing light which passes upwardly from the film deck 48. The negative cropping assembly 268 is disposed within the cover member 202 shown in FIGS. 7 and 8 and includes an elongated cropper member 270, an elongated gear engagement member 272 extending along the underside of the cropper member 270, and a motor 274 having a rotatable gear arm 276 extending therefrom. The cropper member 270 is generally planar and includes a first cropping aperture 278 having substantially rounded corner portions, a second cropping aperture 280 having slightly rounded corner portions, and a third cropping aperture 282 having square corner portions. In an important aspect of the present invention, the cropper member 270 is slidably disposed in between the lower plate member 232 of the negative holder assembly 192 and a diffusion plate (not shown) disposed within the cover member 202. The gear engagement member 272 cooperates with the gear arm 276 of the motor 274 such that the cropper member 270 may be selectively positioned within the cover member 202 to align one of the first, second, and third cropping apertures 278, 280, 282 directly underneath the negative aperture 236 of the negative holder assembly 192. In so doing, the light which passes upwardly through the diffusion plate (not shown) will be shaped by one of the first, second, and third cropping apertures 278, 280, 282 prior to passing through the film 196. Importantly, the improved negative cropping assembly 268 of the present invention is capable of translating the cropper member 270 within the cover member 202 at high speeds such that the various cropping apertures may be quickly interchanged depending upon the type of border is desired on each particular photographic print. It is to be understood that the corners of the first, second, and third cropping apertures 278–282 may be configured in any of a variety of ornate shapes, including but not limited to stars.

Figure 12:
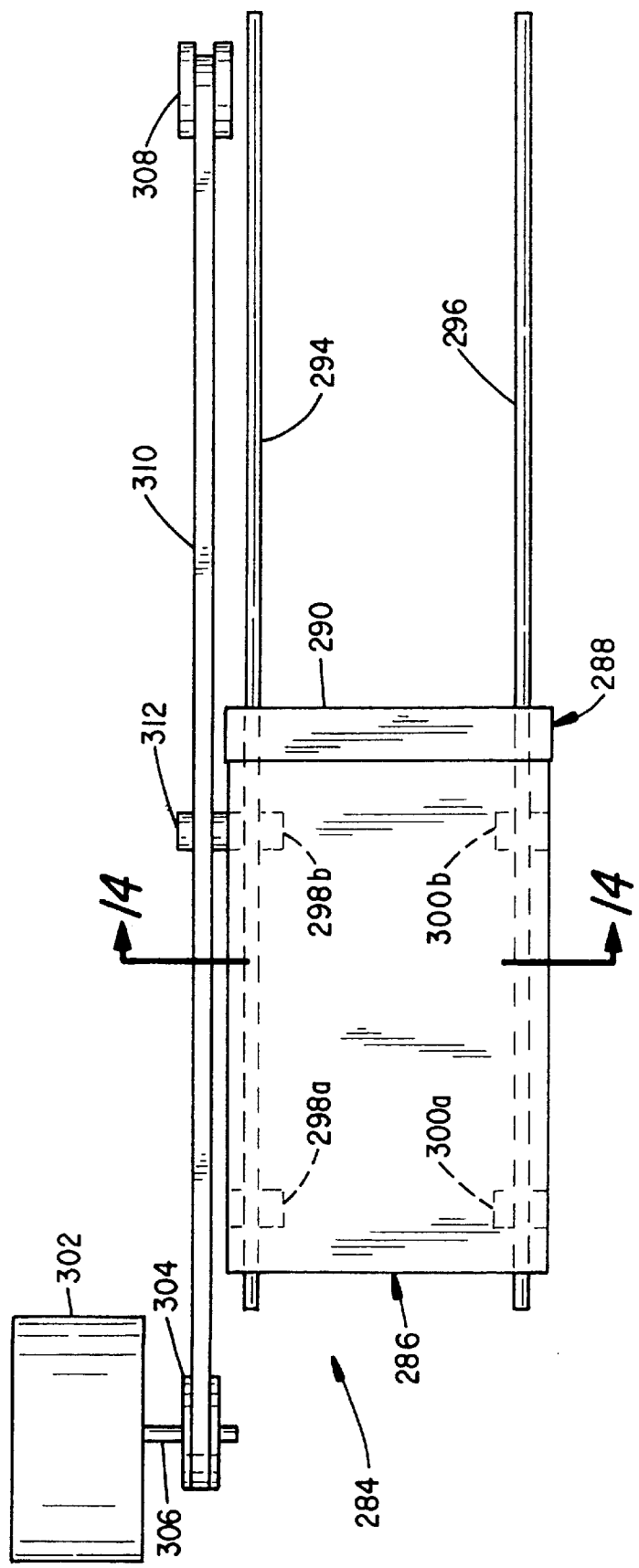
FIG. 12 is an enlarged top view of the diffusion plate cleaning assembly 284 of a first preferred embodiment of the present invention during normal operation.
Figure 13:
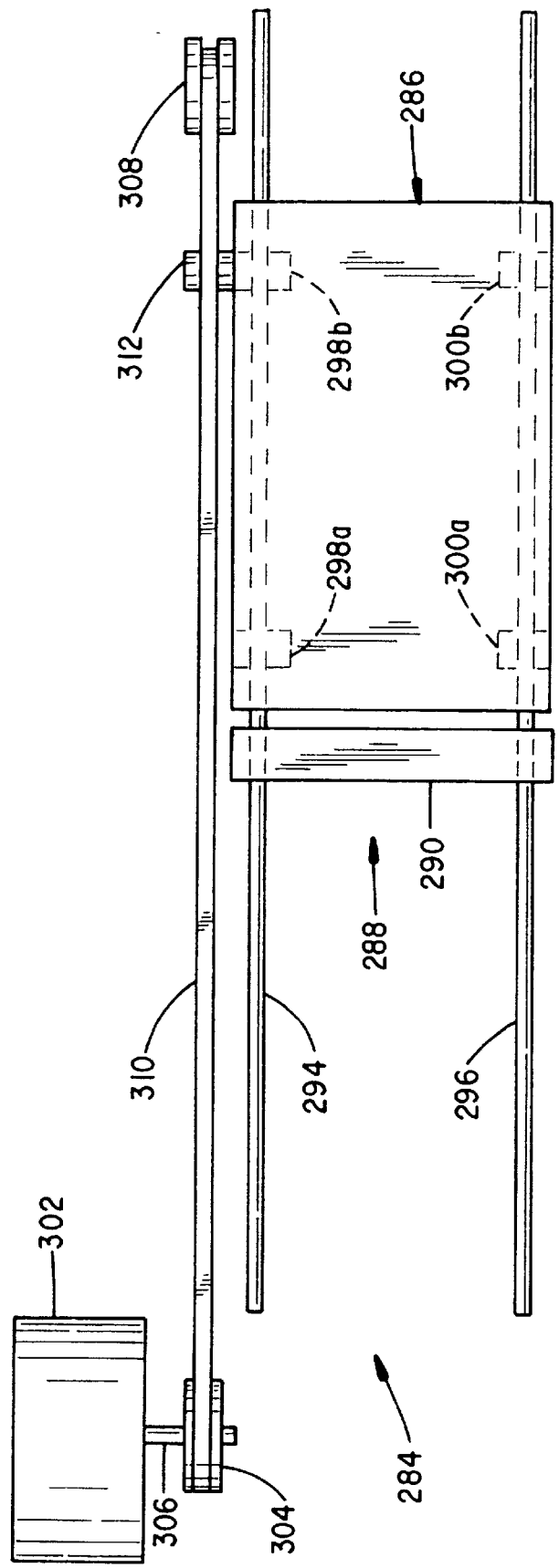
FIG. 13 is an enlarge top view of the diffusion plate cleaning assembly 284 shown in FIG. 12 during a cleaning operation.
Figure 14:
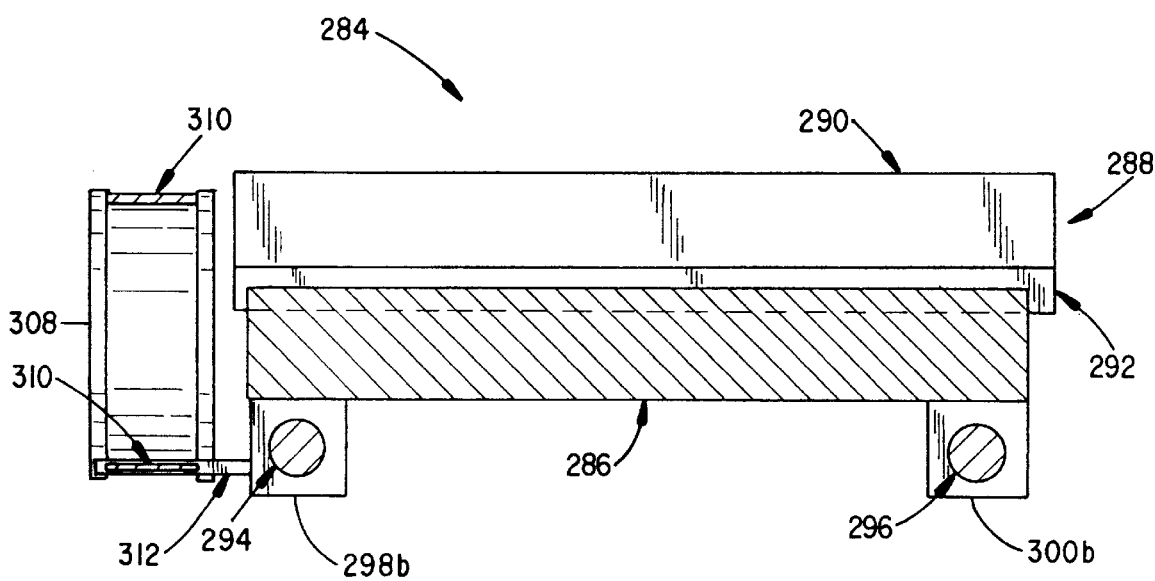
FIG. 14 is a cross sectional view of the diffusion plate cleaning assembly 284 shown in FIG. 12 taken along lines 14—14.

With reference to FIGS. 12–14, illustrated is a diffusion plate cleaning assembly 284 constructed in accordance with a preferred embodiment of the present invention. The diffusion plate cleaning assembly 284 resides within the cover member 204 shown in FIGS. 7 and 8 and includes a diffusion plate 286, a cleaning member 288, and means for selectively passing the diffusion plate 286 under the cleaning member 288 to remove dust and other unwanted particles from the top surface of the diffusion plate 286. The diffusion plate 286 is common in the art and serves to equalize the light which is emitted upwards from the lamp deck 50 before it passes through the negative positioned within the negative holder assembly 192. The cleaning member 288 is disposed in fixed position and includes a rigid upper member 290 and a brush member 292 extending downwardly therefrom. In the preferred embodiment shown, the means for automatically passing the diffusion plate 286 under the cleaning member 288 comprises a first side rail 294 disposed parallel to a second side rail 296, a first pair of slide members 298*a*, 298*b* fixed to one edge of the diffusion plate 286 for sliding longitudinally along the first side rail 294, a second pair of slide members 300*a*, 300*b* fixed to the diffusion plate 286 for sliding longitudinally along the second side rail 296, and coupling means for coupling the diffusion plate 286 to a motor 302 for selectively translating the diffusion plate 286 back and forth along the first and second side rails 294, 296. By way of example and not limitation, the coupling means may comprise a first gear member 304 connected a shaft 306 of the motor 302, a second gear member 308 disposed in co-aligned fashion with the first gear member 304, a belt member 310 extending between the first and second gear members 304, 308, and a clamping arm 312 extending from the first slide member 298*b* for connecting the diffusion plate 286 to the belt member 310.

FIG. 12 illustrates the diffusion plate cleaning assembly 284 during normal operation, that is, during the exposure of each photographic negative, while FIG. 13 illustrates the diffusion plate cleaning assembly 284 during the cleaning operation. The diffusion plate cleaning assembly 284 is arranged such that the diffusion plate 286 will be positioned directly in between the lamp deck 50 and the improved negative cropping assembly 268 during the period of normal operation as shown in FIG. 12. This, once again, serves to equalize the light projecting upwardly from the lamp deck 50 so as to ensure proper color balance in the resulting photographic prints. After a predetermined number of exposures have been undertaken, or once each sitting is finished, the diffusion plate 286 will be translated into the position shown in FIG. 13 so as to draw the top surface of the diffusion plate 286 into contact with the brush member 292, thereby removing any debris or particles that may have settled on the diffusion plate 286 during operation. In the preferred embodiment, the motor 302 is capable of translating the diffusion plate 286 back and forth past the brush member 292 in approximately 0.25 seconds.

Figure 15:
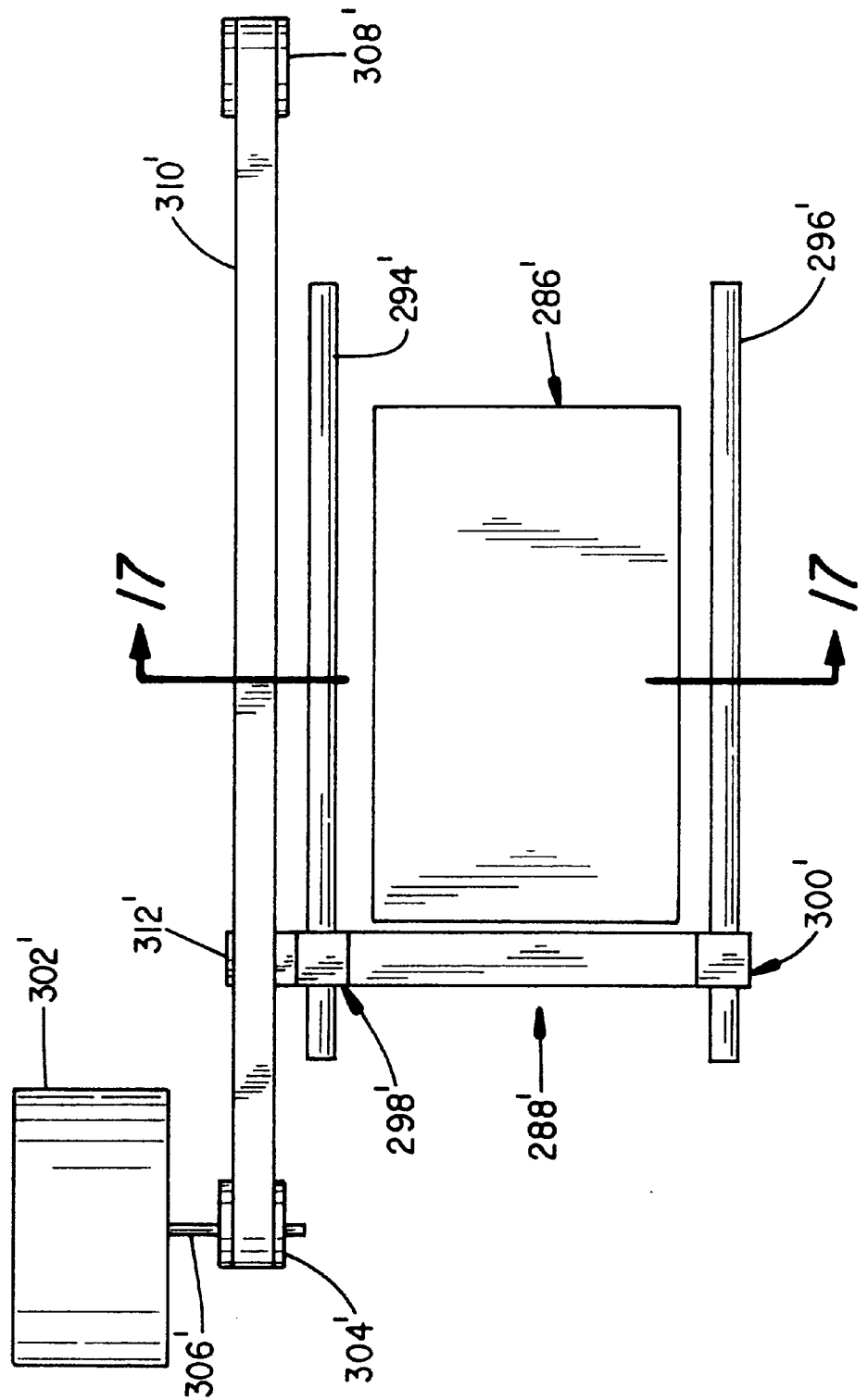
FIG. 15 is an enlarged top view of a diffusion plate cleaning assembly 284' of a second preferred embodiment of the present invention during normal operation.
Figure 16:
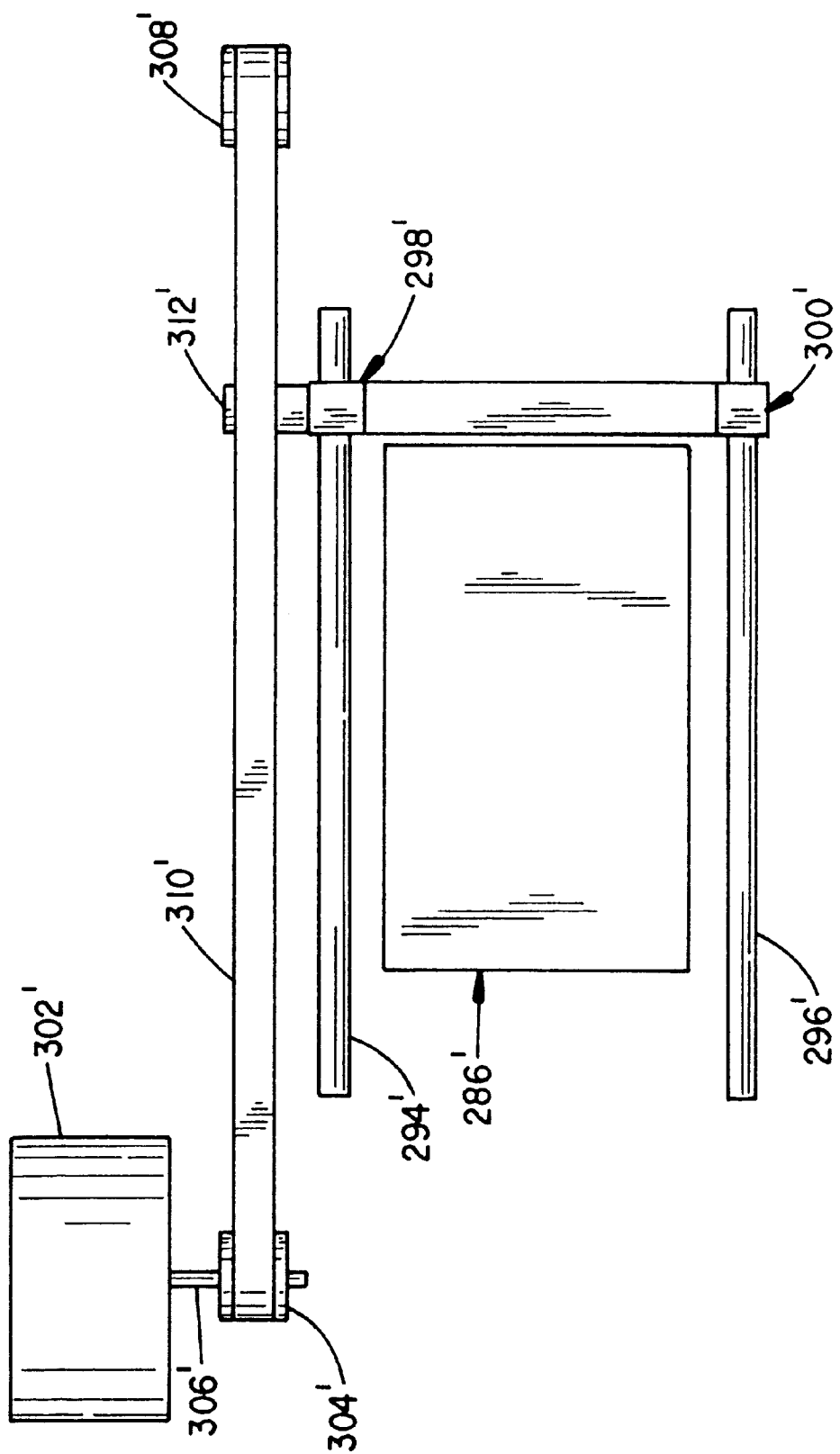
FIG. 16 is an enlarged top view of the diffusion plate cleaning assembly 284' shown in FIG. 15 following a cleaning operation.
Figure 17:
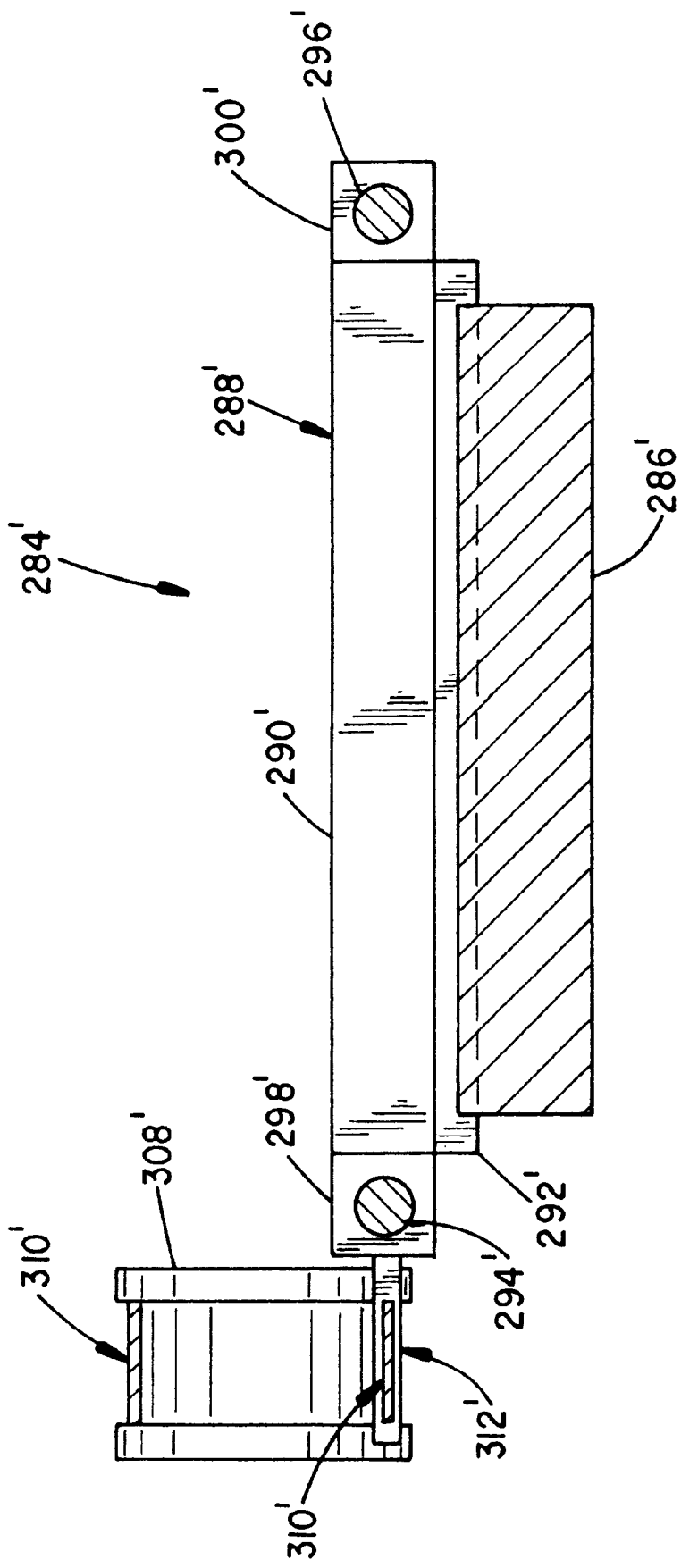
FIG. 17 is a cross sectional view of the diffusion plate cleaning assembly 284' shown in FIG. 15 taken along lines 17—17.

FIGS. 15–17 illustrate a diffusion plate cleaning assembly 284' in accordance with a second preferred embodiment of the present invention. In contrast to the first preferred embodiment shown in FIGS. 12–14, a diffusion plate 286' is disposed in a fixed position directly above the lamp deck (not shown), while a cleaning member 288' is equipped with translation means for automatically passing the cleaning member 288' over the top surface of the diffusion plate 286' to thereby selectively clean the diffusion plate 286'. In order to selectively pass the brush member 292' across the diffusion plate 286', the translation means comprises a first side rail 294' disposed parallel to a second side rail 296', a first slide member 298' fixed to one edge of the cleaning member 288' for sliding longitudinally along the first side rail 294', a second slide member 300' fixed to the cleaning member 288' for sliding longitudinally along the second side rail 296', and coupling means for coupling the cleaning member 288' to a motor 302' for selectively translating the cleaning member 288' back and forth along the first and second side rails 294', 296'. As with the embodiment shown in FIGS. 12–14, the coupling means may comprise a first gear member 304' connected a shaft 306' of the motor 302', a second gear member 308' disposed in co-aligned fashion with the first gear member 304', a belt member 310' extending between the first and second gear members 304', 308', and a clamping arm 312' extending from the first slide member 298*b*' for connecting the cleaning member 288' to the belt member 310'.

The cleaning member 288' may be selectively moved across the diffusion plate 286' such that the brush member 292' sweeps away any unwanted particles from the diffusion plate 286', thereby minimizing the likelihood that dust or "floaters" will foul up or impede the light as it progresses through the diffusion plate 286'. As noted above, this sweeping action is employed after a predetermined number of exposures have been completed, i.e. in between sittings, such that any dust which may have settled on the diffusion plate 286' during the previous sitting may be removed prior to performing the exposures which comprise the next sitting. This is particularly advantageous in that, to the extent dust and related particles accrue on the diffusion plate 286', the resulting defects on the photographic prints will be isolated to the prints of a single sitting rather than to the prints of several individual sittings. The end result is a drastic reduction in the amount of waste which stems from dust settling on the diffusion plate 286' which, it will be appreciated, reduces expense and improves overall print quality.

In an important aspect of the present invention, the diffusion plate cleaning assemblies 284, 284' accomplish the aforementioned cleaning function in a quick and expedient fashion such that the diffusion plates 286, 286' may be cleaned while the film 196 is being advanced between exposures so as to increase the overall speed of operation. For example, in the preferred embodiment illustrated in FIGS. 12–14, the diffusion plate cleaning assembly 284 is capable of translating the diffusion plate 286 back and forth under the cleaning member 288 in approximately 0.25 seconds. In similar fashion, the alternate diffusion plate cleaning assembly 284' shown in FIGS. 15–17 is capable of moving the cleaning member 288' back and forth across the top surface of the diffusion plate 286' in approximately 0.25 seconds. As noted above, the present invention provides the ability to advance the paper 196 at a rate of 13 inches/0.25 seconds such that an unexposed portion of paper 196 may be positioned within the exposure assembly 60 in preparation for a subsequent set of exposures. In an important aspect of the present invention, the motors 302, 302' are controlled such that the entire cleaning operation will be performed while the paper 196 is being advanced, thereby eliminating the prior art need to halt operations to manually clean the diffusion plate. Moreover, it is also possible to configure the diffusion plate cleaning assembly 284' in FIGS. 15–17 such that the cleaning member 288' will pass only once over the diffusion plate 286' in between sittings (i.e. from FIG. 15 to FIG. 16), thereby performing the cleaning function in even less time than described above. Considering all of the above-enumerated features, the diffusion plate cleaning assemblies 284, 284' of the present invention minimize the time require to clean the diffusion plate 286, 286' and, by performing the cleaning on a periodic basis, improves the overall print quality.

Lens Deck

Figure 18:
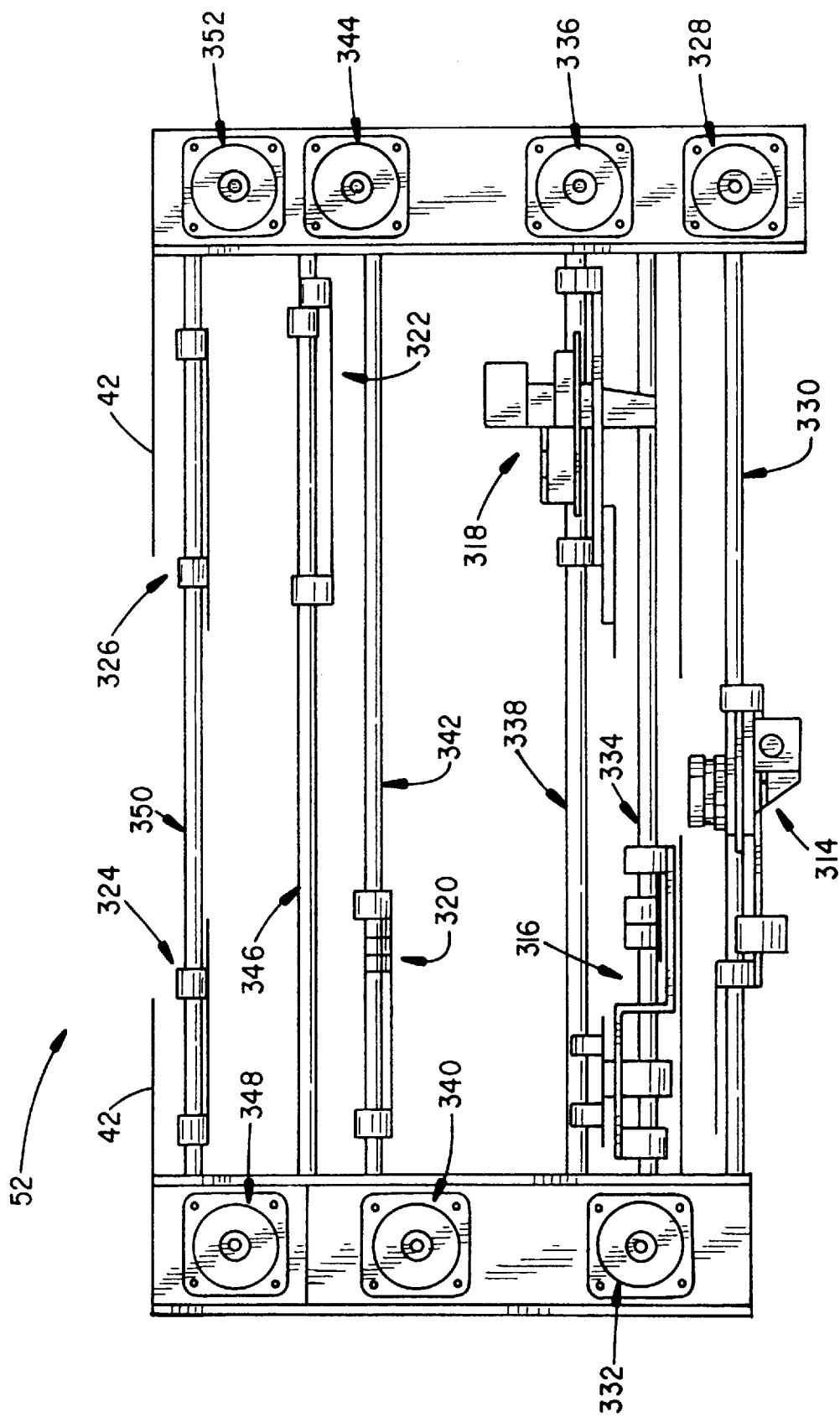
FIG. 18 is an enlarged side view of the lens deck 52 provided in accordance with a preferred embodiment of the present invention.

With reference to FIG. 18, illustrated in detail is the lens deck 52 of the present invention. The lens deck 52 includes a first projection assembly 314, a second projection assembly 316, a third projection assembly 318, a fourth projection assembly 320, a fifth projection assembly 322, a first masking assembly 324, and a second masking assembly 326, all of which are slidably displaceable along corresponding side rails via a plurality of individual motor assemblies. More specifically, a first motor 328 is employed to selectively translate the first projection assembly 314 along a first pair of side rails 330, a second motor 332 is used to selectively translate the second projection assembly 316 along a second pair of side rails 334, a third motor 336 is employed to selectively translate the third projection assembly 318 along a third pair of side rails 338, a fourth motor 340 is configured to selectively translate the fourth projection assembly 320 along a fourth pair of side rails 342, and a fifth motor 344 is used to selectively translate the fifth projection assembly 322 along a fifth pair of side rails 346. A sixth motor 348 and a seventh motor 352 are further provided for selectively translating the first and second masking assemblies 324, 326 along a sixth pair of side rails 350. As will be discussed in greater detail below, the aforementioned projection assemblies 314–322 include several distinct lens types such that a variety of different photographic exposures may be formed on the photographic paper 22 by selectively positioning the projection assemblies 314–322 in the image-bearing light being projected from the film deck 48. The projection assemblies 314–322 are also equipped with various masking members which, in cooperation with the first and second masking assemblies 324, 326, produce sharply defined borders on each photo exposure by positioning a particular masking member within the shadow or penumbra area generated along the edges of the image bearing light as it projects upward towards the paper 22.

Figure 19B:
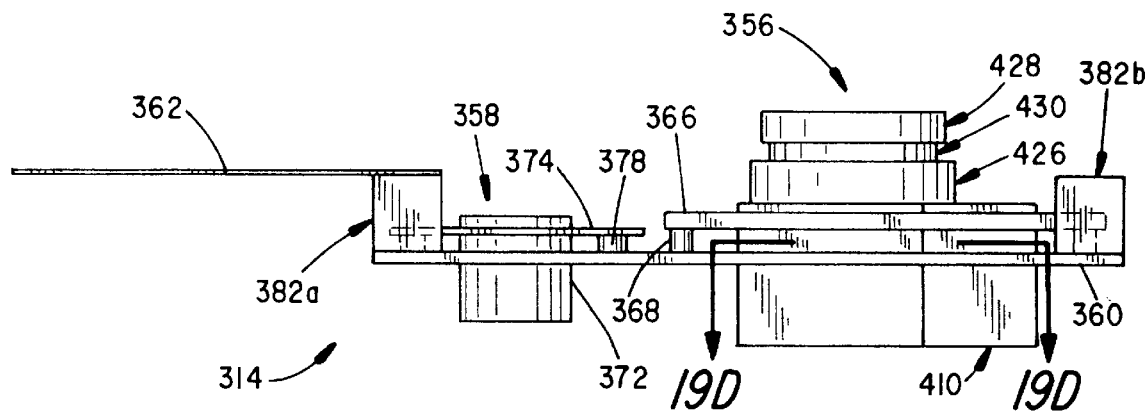
FIG. 19B is a side view of the first projection assembly 314 shown in FIG. 19A.
Figure 19C:
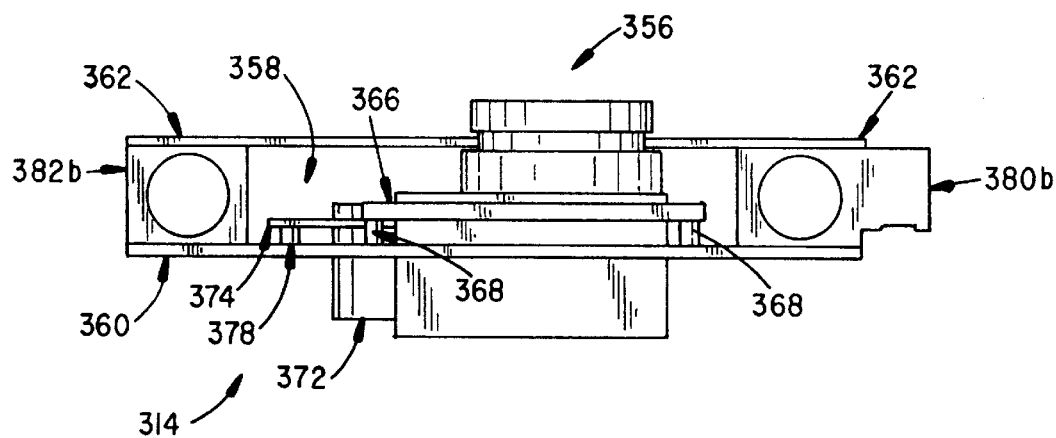
FIG. 19C is a front view of the first projection assembly 314 shown in FIG. 19A.
Figure 19D:
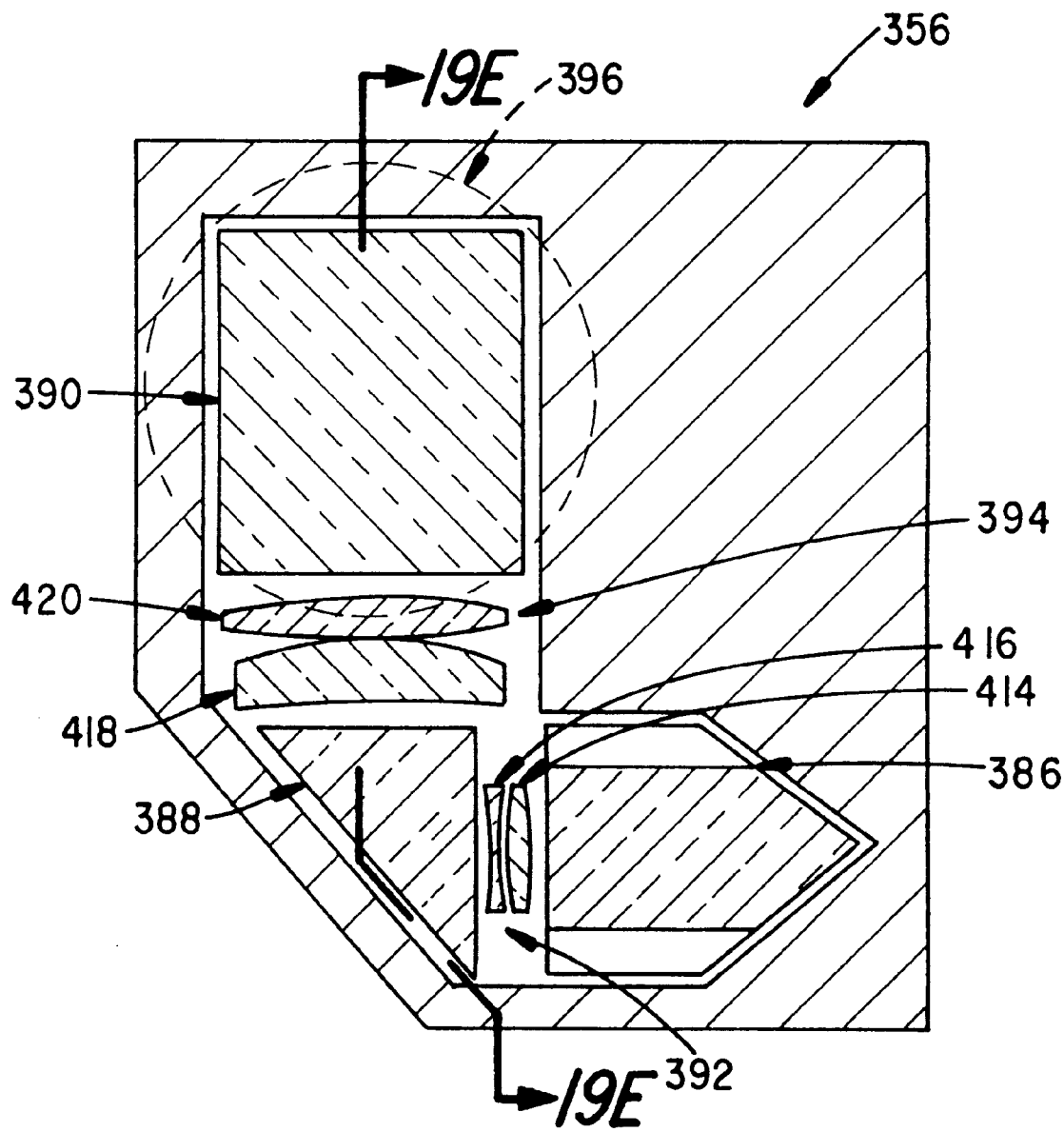
FIG. 19D is a cross-sectional view of the rotational prism assembly 356 taken along lines 19D—19D in FIG. 19B.
Figure 19E:
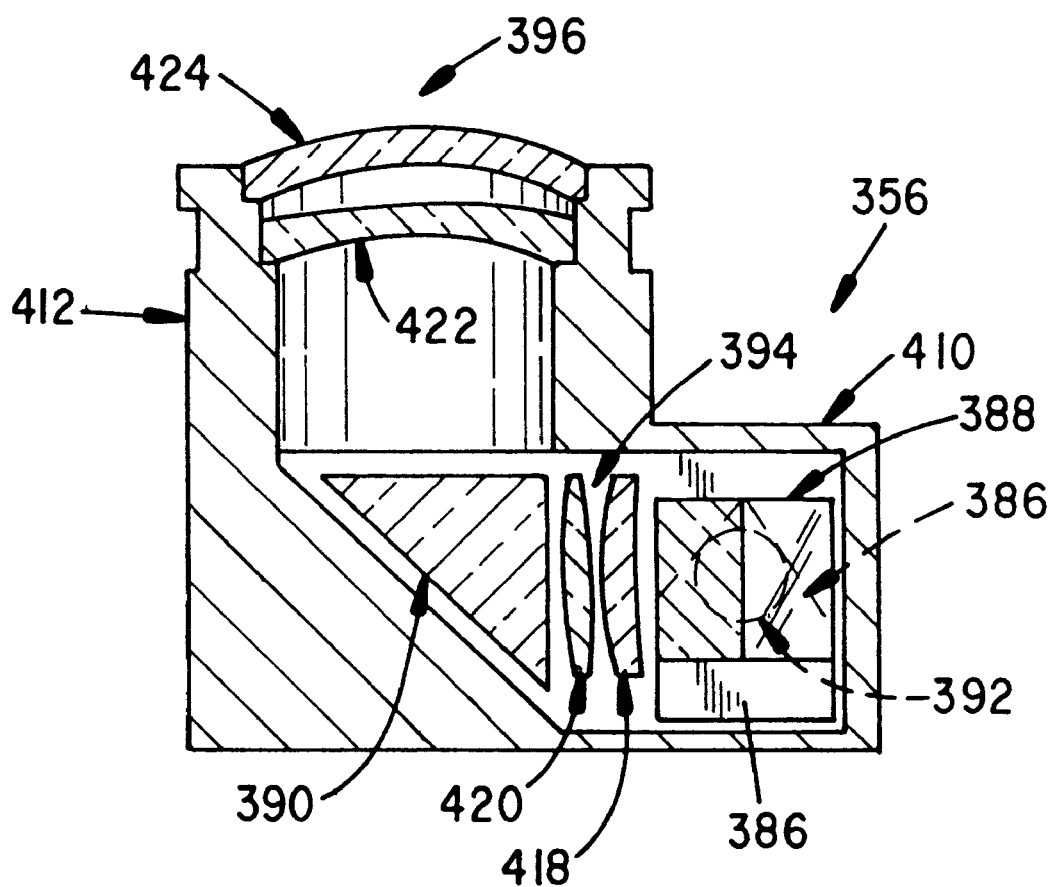
FIG. 19E is a cross-sectional view of the rotational prism assembly 356 taken along lines 19E—19E in FIG. 19D.

Referring to FIGS. 19A–19C, the first projection assembly 314 includes a rotational prism assembly 356 for producing 10"×13" photographs, an 8"×10" lens assembly 358 for producing 8"×10" photographs, a carriage member 360 for supporting the 8"×10" lens assembly 358 and rotational prism assembly 356, and a mask member 362 for reducing reflections within the lens deck 52. The rotational prism assembly 356 includes a housing member 402 fixedly attached to a support plate 366 which, in turn, is fixedly attached to the carriage member 360 via a plurality of stand-off members 368. The housing member 402 extends downwardly through a prism aperture 364 formed in the carriage member 360 and, as will be discussed in greater detail below, includes a plurality of interiorly disposed prism and lens members for rotating the image-bearing light which projects upwardly from the film 196 by ninety (90) degrees to produce 10"×13" photographs on the paper 22 within the exposure aperture 110. The 8"×10" lens assembly 358 includes an 8"×10" lens unit 370 centrally disposed within a tubular housing member 372. The tubular housing member 372 is fixedly attached to a support plate 374 and extends downwardly through a lens aperture 376 formed in the carriage member 360. The support plate 374, in turn, is fixedly attached to the carriage member 360 through the use of a plurality of stand-off members 378. The carriage member 360 is further equipped with a plurality of slide members 380a, 380b for slidably receiving the first pair of side rails 330 shown in FIG. 18. The mask member 362 is fixedly attached to the slide members 380a, 380b and includes an aperture 384 which allows image-bearing light to project upwards for magnification by the second, third, fourth, and fifth projection assemblies 316–322. By restricting the projection of the image-bearing light in this fashion, the mask member 362 serves to reduce the incidence of reflections within the lens deck 52 when using the second, third, fourth, and fifth projection assemblies 316–322, thereby improving print quality.

Figure 20:
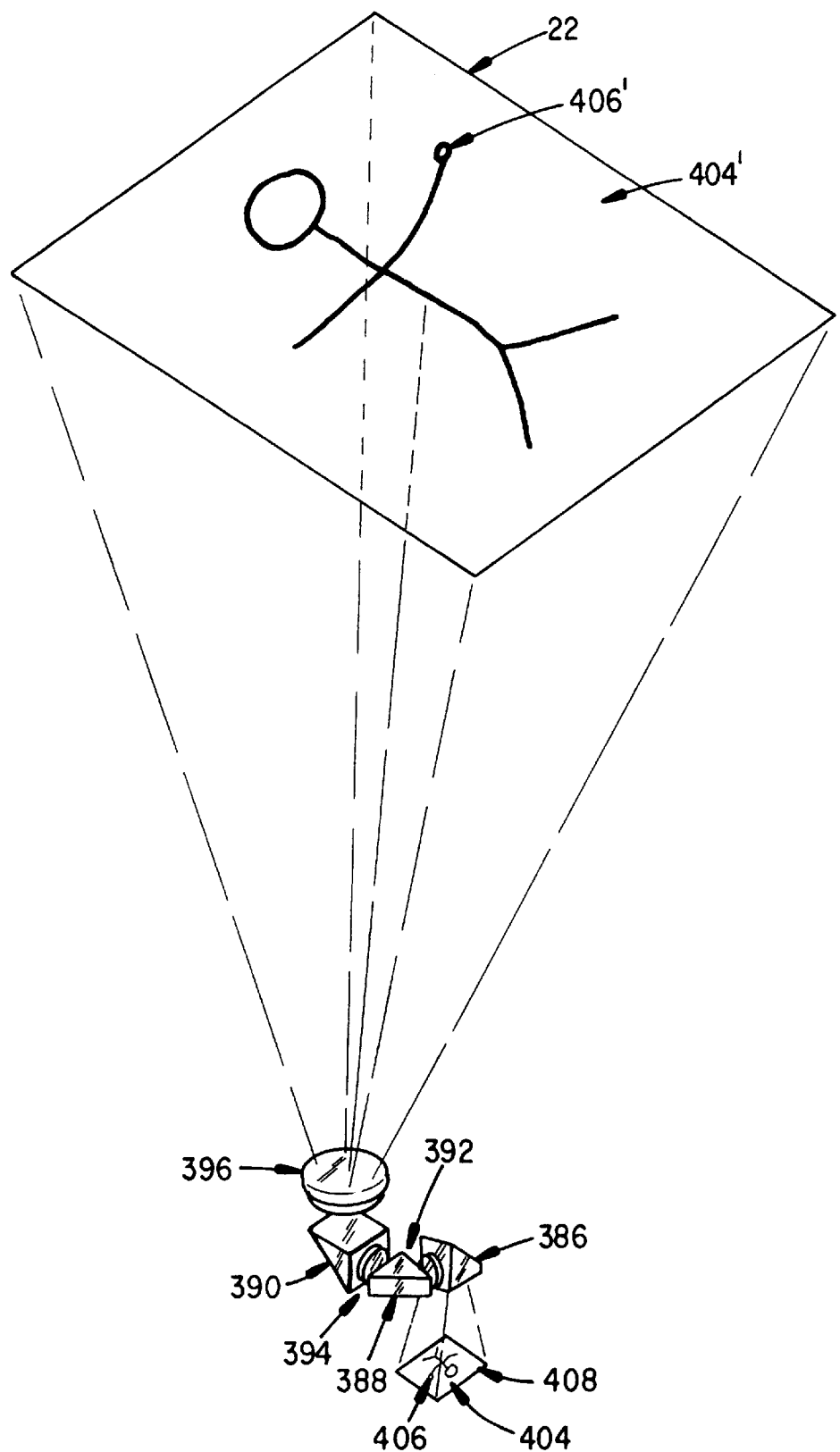
FIG. 20 is a perspective view of the various prism assemblies and lens assemblies within the rotational prism assembly 356 shown generally in FIGS. 19A–19E.

FIG. 20 illustrates the 90 degree image rotation accomplished by the rotational prism assembly 356 of the present invention. To aid in the understanding of the rotational prism assembly 356, the housing member 402 is not shown so as to expose the optical components employed to accomplish the aforementioned image rotation. Specifically, the rotational prism assembly 356 includes a first prism member 386, a second prism member 388, a third prism member 390, a first lens assembly 392, a second lens assembly 394, and a third lens assembly 396. The first lens assembly 392 is positioned between the first and second prism members 386, 388. The second lens assembly 394 is positioned between the second and third prism members 388, 390. The third lens assembly 396 is juxtaposed in close proximity to the top surface of the third prism member 390. In operation, the rotational prism assembly 356 is positioned within the lens deck 52 such that the first prism member 386 is positioned directly above a negative 408 within the film 196. The first and second lens assemblies 392, 394 cooperate with the first, second, and third prism members 386–390 to rotate the image bearing light from the film 196 approximately ninety (90) degrees. The third lens assembly 396 is configured to magnify the rotated image-bearing light such that a 10"×13" photographic print may be generated on the paper 22 within the exposure aperture 110 of the paper deck 46.

Through the foregoing arrangement, then, the rotational prism assembly 356 of the present invention rotates the image-bearing light which projects upwardly from the negative 408 such that the resulting image 404' on the paper 22 is approximately 90 degrees out of phase from the image 404 on the negative 408. The main advantage of rotating the image-bearing light in this fashion is that it allows 10"×13" photographs to be generated on the photographic paper 22, which is typically 10" wide, without having to physically rotate the film 196. In most instances, the negatives of the film 196 are situated such that the longitudinal axis of the photo subjects are perpendicular to the longitudinal axis of the film 196. In that the image-bearing light is projected upwards in the same orientation as it resides on the negative, this light must be rotated ninety (90) degrees before projecting onto the paper 22 in order to form a 10"×13" photograph. In the past, this rotation was accomplished through the use of mechanical means, namely a turret or turntable for physically rotating the film 196. This technique, however, is costly in terms of the time required to rotate the film 196, the time required to dampen out the rotation-induced vibrations, and the space required to carry out film rotation.

In yet another important aspect, the rotational prism assembly 356 of the present invention accomplishes the aforementioned image-rotation without reversing or inverting the image 404 on the negative 408 such that the orientation of both images 404, 404' are in accord with one another. This feature is best illustrated with reference to the images 404, 404' on the negative 408 and paper 22, respectively. The stick-man image 404 on the negative 408 is provided with an object 406 at the end of his right arm. Importantly, the rotational prism assembly 356 effectuates image rotation such that the resulting image 404' is projected onto the paper 22 with the object 406' similarly disposed at the end of his right arm. This is a particularly advantageous distinction over the prior art image rotation arrangements which employ mirrors because such mirror arrangements tend to invert or reverse the orientation of the image between the negative and the paper.

With reference again to FIGS. 19A–19E, the housing member 372 of the rotational prism assembly 356 includes a base portion 410 integrally connected to a tubular portion 412. The base portion 410 forms the housing for the first, second, and third prism members 386, 388, 390, as well as the first and second lens assemblies 392, 394, while the tubular portion 412 serves as the housing for the third lens assembly 396. In a preferred embodiment, the first lens assembly 392 includes a first lens member 414 and a second lens member 416, the second lens assembly 394 includes a first lens member 418 and a second lens member 420, and the third lens assembly 396 includes a first lens member 422 and a second lens member 424. The tubular portion 412 includes a lower tubular section 426 fixed to the base portion 410, an upper tubular section 428, and a middle tubular section 430 extending therebetween. The first and second lens members 422, 424 of the third lens assembly 396 are preferably housed within the upper tubular section 428. The first prism member 386 is positioned directly above the center of the negative (denoted as reference numeral 408' in FIG. 19A), the third prism member 390 is centered below the lower tubular section 426, and the second prism member 388 is positioned angularly between the first and third prism members 386, 390. Arranged in this fashion, the rotational prism assembly 356 accomplishes the desired ninety (90) degree image rotation in a fully optical fashion, thereby eliminating the need to employ the bulky and slow mechanical turret systems. As noted above, this effectively reduces the space required, and also reduces the settling time in that there is no need to wait for vibrations to die out as was the case with a rotating turret. Moreover, the rotational prism assembly 356 of the present invention does not use any mirrors to accomplish the image rotation, thereby ensuring that the resulting photographic image is in the same orientation as it resides on the negative.

Figure 21A:
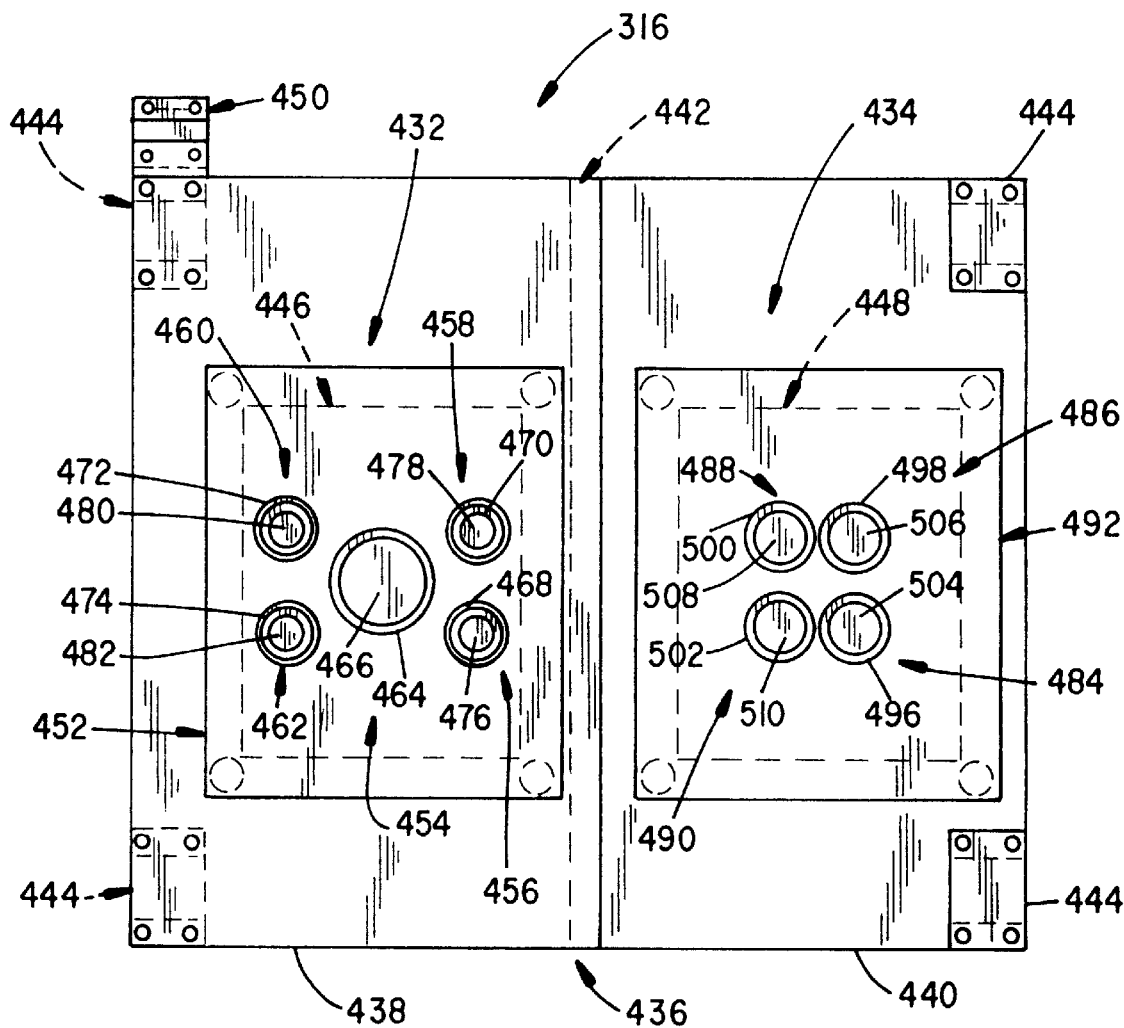
FIG. 21A is a top elevational view of a second projection assembly 316 within the lens deck 52 including a quint lens assembly 432 for producing composite photographs having five different photographic images and a quad lens assembly 434 for producing composite photographs having four different photographic images.
Figure 21B:
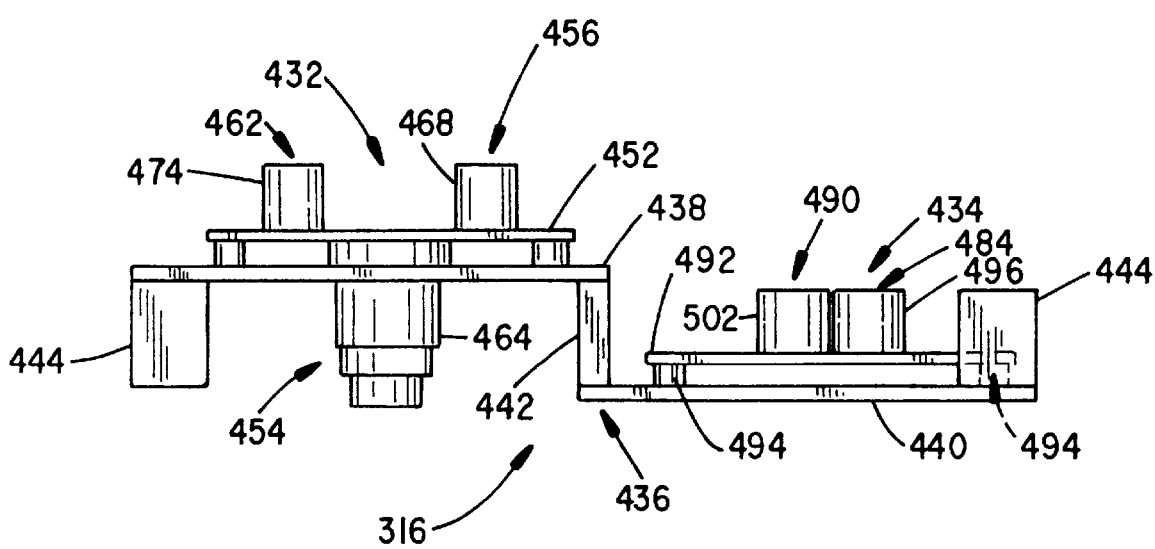
FIG. 21B is a side view of the second projection assembly 316 shown in FIG. 21A.

Referring now to FIGS. 21A and 21B, the second projection assembly 316 includes a quint lens assembly 432 and a quad lens assembly 434 fixedly attached to a carrier assembly 436. As will be explained in greater detail below, the carrier assembly 436 is slidably disposed within the lens deck 52 such that the quint lens assembly 432 and the quad lens assembly 434 may be selectively positioned within the image-bearing light being projected upwardly from the film deck 48. The quint lens assembly 432 is equipped with five separate lens units and the quad lens assembly 434 is equipped with four separate lens units such that, when either is positioned within the image-bearing light, each lens unit will project a magnified image-bearing light beam upwardly towards the paper 22 within the exposure aperture 110. In an important aspect of the present invention, a plurality of masking members are provided in between the second projection assembly 316 and the paper 22 for selectively blocking out one or more of the magnified image-bearing light beams so as to restrict the number of magnified image-bearing light beams which project onto the paper 22 at any given time. Through this masking feature, in cooperation with the bi-directional film movement described above, the quint lens assembly 432 and quad lens assembly 434 are capable of generating a plurality of different photographic images on the paper 22 exposed within the exposure aperture 110. Moreover, as will be set forth in greater detail below, the present invention can produce these composite photographs in quick succession so as to save time and, hence, cost.

With regard to structure, the carrier assembly 436 includes an upper carrier member 438, a lower carrier member 440, a vertical wall member 442 extending therebetween, and a plurality of slide members 444. The upper carrier member 438 is generally rectangular and planar in shape and includes a quint lens aperture 446 for allowing image-bearing light to project upwardly into the various lens units of the quint lens assembly 432 for magnification. The lower carrier member 440 is similarly generally rectangular and planar in shape and includes a quad lens aperture 448 for allowing image-bearing light to project upwardly into the various lenses of the quad lens assembly 434 for magnification. The vertical wall member 442 is attached in perpendicular fashion to adjacent edges of the upper and lower carrier members 438, 440 such that the upper and lower carrier members 438, 440 are disposed in a generally parallel and spaced relationship with one another. The plurality of slide members 444 are fixedly attached to the outer corners of the upper and lower carrier members 438, 440 so as to slidably receive the second pair of side rails 334 shown in FIG. 18. An attachment member 450 forms a portion of one of the slide members 444 for the purpose of coupling the second motor 332 to the second projection assembly 316.

The quint lens assembly 432 includes a generally planar lens support member 452 having a first lens unit 454, a second lens unit 456, a third lens unit 458, a fourth lens unit 460, and a fifth lens unit 462 fixedly attached thereto. The first lens unit 454 includes a tubular housing member 464 extending downwardly from the approximate center of the lens support member 452. The first lens unit 454 also includes an internally disposed lens assembly 466 having a predetermined magnification ratio which, as will be described below, is capable of producing a centrally located, relatively large photographic image on the paper 22 within the exposure aperture 110. In the preferred embodiment shown, the second, third, fourth, and fifth lens units 456–462 are identical in construction and arranged in a generally rectangular configuration about the first lens unit 454. The second, third, fourth, and fifth lens units 456–462 include tubular housing members 468, 470, 472, 474 and internally disposed lens assemblies 476, 478, 480, 482, respectively. Each of the second, third, fourth, and fifth lens assemblies 476–482 have an identical predetermined magnification ratio which, in a preferred embodiment, is generally less than the magnification ratio of the first lens assembly 466. Arranged in the foregoing fashion, the second, third, fourth, and fifth lens units 456–462 are capable of producing four identically sized, relatively small photographic images in a rectangular arrangement about the centrally located, relatively large photographic image generated by the first lens unit 454.

In a preferred embodiment, the size of the photographic image generated by the first lens unit 454 is approximately 4.6"×6.5", while the size of each photographic image generated by the second, third, fourth, and fifth lens units 456–462 is approximately 2.75"×3.75". The longitudinal axis of each photographic image is perpendicular to the longitudinal axis of the paper 22 such that the resulting composite has all five photographic images disposed in a symmetrical arrangement on a single 10"×13" swath of paper 22. In an important aspect of the present invention, the centrally located, relatively large photographic image is produced by configuring the lens assembly 466 within the first lens unit 454 in a retro-focus arrangement. More specifically, the lens assembly 466 includes an internally disposed mirror arrangement for increasing the overall distance which the magnified image-bearing light must travel before projecting onto the paper 22. This, of course, has the effect of increasing the size of the resulting photographic image on the paper 22. The principal advantage of such an arrangement is that the first lens unit 454 may be positioned physically closer to the paper 22 and still produce the centrally located photographic image in the desired size of 4.6"×6.5". Without the benefit of such a retro-focus arrangement, the first lens unit 454 would have to extend well below the position shown in FIG. 21B in order to produce the centrally located photographic image in the desired size. As will be appreciated with reference to FIG. 18, the retro-focus arrangement of the lens assembly 466 therefore allows the first lens unit 454 to be positioned higher within the lens deck 52 so as to establish an ample amount of vertical clearance between the first and second projection assemblies 314, 316. This, of course, eliminates the threat of collision between the first and second projection assemblies 314, 316 and provides for a more compact arrangement of the components within the lens deck 52.

Importantly, this retro-focus arrangement also brings the first lens unit 454 closer to the paper 22 such that the second, third, fourth, and fifth lens units 456–462 are not blocked by the first lens unit 454 such that they can effectively receive the image-bearing light without interference.

The quad lens assembly 434 includes a first lens unit 484, a second lens unit 486, a third lens unit 488, and a fourth lens unit 490, all of which are fixedly attached to a generally planar lens support member 492. A plurality of stand-off members 494 are provided for fixedly attaching the lens support member 492 to the lower carrier member 440 such that the first, second, third, and fourth lens units 484–490 are disposed above the quad lens aperture 448 formed in the lower carrier member 440. In the preferred embodiment, the first, second, third, and fourth lens units 484–490 are identical in construction and comprise tubular housing members 496, 498, 500, 502 having internally disposed lens assemblies 504, 506, 508, 510, respectively. The housing members 496–502 are disposed in a generally square arrangement on the lens support member 492 and extend upwardly therefrom. Each lens assembly 504–508 has an identical magnification ratio which, in a preferred embodiment, is capable of generating a photographic image approximately 3.5"×5" in size on the paper 22 within the exposure aperture 110. More specifically, the first, second, third, and fourth lens units 484–490 are configured such that the longitudinal axis of each 3.5"×5" photographic image is perpendicular to the longitudinal axis of the paper 22. As will be set forth in greater detail below, the resulting composite comprises an upper right photographic image formed by the first lens unit 484, a lower right photographic image formed by the second lens unit 486 and disposed immediately below the upper right photographic image, a lower left photographic image formed by the third lens unit 488 and disposed immediately adjacent to the lower right photographic image, and an upper left photographic image formed by the fourth lens unit 490 and disposed immediately above the lower left photographic image and immediately adjacent the upper right photographic image. If so desired, the remaining unexposed portion of the paper 22 within the exposure aperture 110 (to the left of the photographic images) may be utilized by simply advancing the paper 22 and generating two more photographic images immediately adjacent to the upper and lower left photographic images.

Figure 22A:
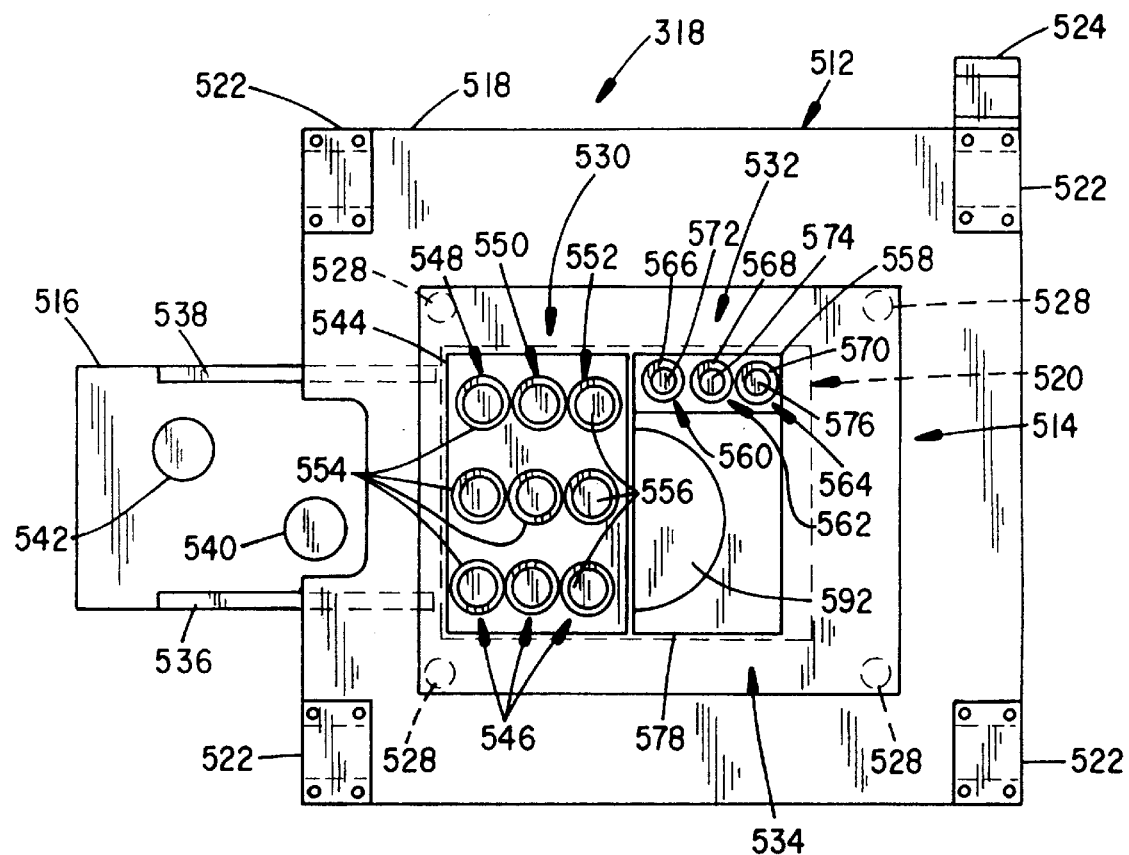
FIG. 22A is a top elevational view of a third projection assembly 318 within the lens deck 52 having a 13UP lens assembly 514 for generating a 5"×7" photograph, nine wallet size photographs, and three sub-wallet size photographs with the exposure of a single negative.
Figure 22B:
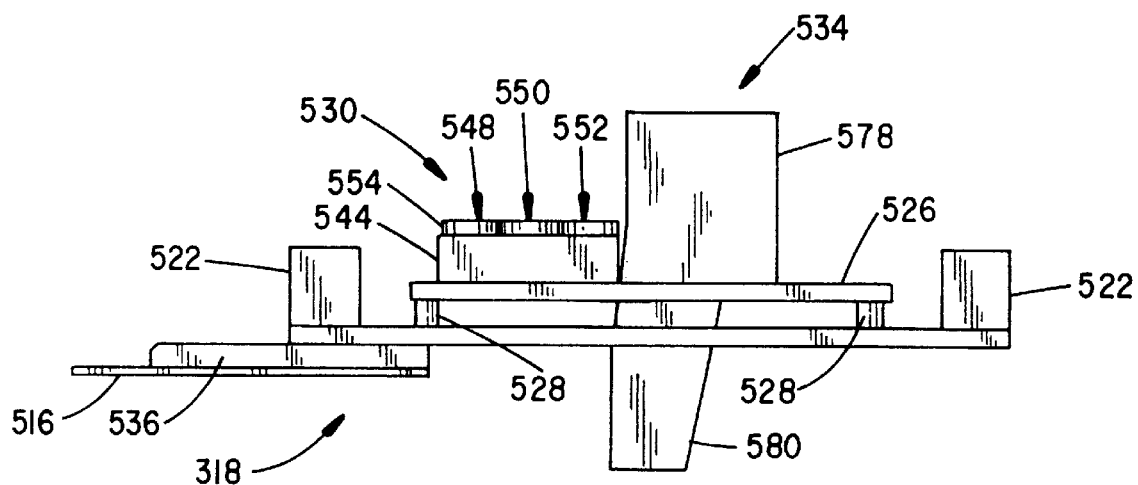
FIG. 22B is a side elevational view of the third projection assembly 318 shown in FIG. 22A.
Figure 22C:
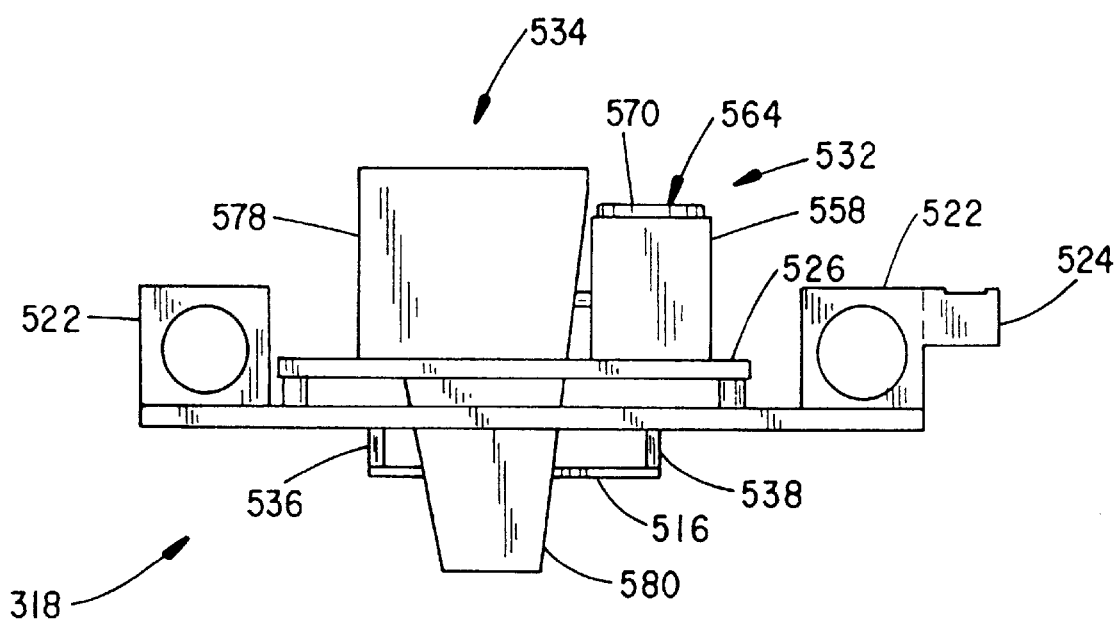
FIG. 22C is a front elevational view of the third projection assembly 318 shown in FIG. 22A.

FIGS. 22A–22C illustrate the third projection assembly 318 constructed in accordance with yet another important aspect of the present invention. The third projection assembly 318 includes a carrier assembly 512, a 13UP lens assembly 514, and a masking member 516. The carrier assembly 512 comprises a generally planar carrier member 518 having a 13UP lens aperture 520 formed therethrough and a plurality of slide members 522 extending upwardly from each corner. The 13UP lens aperture 520 is provided to allow the image-bearing light to pass upwardly from the film deck 48 into the 13UP lens assembly 514 for magnification. The slide members 522 are provided for slidably receiving the third pair of side rails 338 set forth in FIG. 18, and the third motor 336 is coupled to an attachment member 524 such that the third projection assembly 318 may be selectively translated within the lens deck 52. The 13UP lens assembly 514 includes a generally planar lens support member 526 fixedly attached to the carrier member 518 via a plurality of stand-off members 528, a wallet lens module 530, a sub-wallet lens module 532, and a 5"×7" lens module 534. As will be explained in greater detail below, the wallet lens module 530, the sub-wallet lens module 532, and the 5"×7" lens module 534 are arranged so as to simultaneously generate nine wallet size photo-graphs, three sub-wallet size photographs, and a single 5"×7" photograph, respectively, on the paper 22 within the exposure aperture 110 with the exposure of a single negative. The masking member 516 is connected to the carriage member 518 via opposing arm members 536, 538 and includes a first quad lens masking aperture 540 and a second quad lens masking aperture 542. As will be explained in greater detail below, the first and second quad lens masking apertures 540, 542 cooperate with the first and second masking assemblies 324, 326 shown in FIG. 18 to selectively mask out one or more of the magnified image-bearing light beams from the quad lens assembly 434. In conjunction with the bi-directional film movement described above, this masking feature provides the ability to generate a folio photograph comprising several different 3.5"×5" photographic images on the paper 22 while maintaining the third projection assembly 318 in a fixed position within the lens deck 52.

The wallet lens module 530 includes a base member 544 and nine identically constructed lens units 546. More specifically, the nine lens units 546 are disposed on the base member 544 so as to form a first column 548, a second column 550, and a third column 552. The first column 548 is provided along one longitudinal edge of the base member 544. The second column 550 is provided parallel to the first column 548 in the approximate center of the base member 544. The third column 552 is provided along the other longitudinal edge of the base member 544 parallel to the second column 550. Each of the nine lens units 546 includes a tubular housing member 554 and an internally disposed lens assembly 556. In a preferred embodiment, each lens assembly 556 is configured to produce a wallet sized photograph approximately 2.2"×3.1" on the paper 22. As will be illustrated and described in greater detail below, the parallel arrangement of the first, second, and third columns 548, 550, 552 causes the nine lens units 546 to generate three parallel columns of three wallet size photographs on the paper 22 such that the longitudinal axis of each photograph is perpendicular to the longitudinal axis of the paper 22 within the exposure aperture 110. Specifically, a first column of three wallet size photographs will be generated along the trailing edge of the paper 22 within the exposure aperture 110, while a second and a third column of three wallet sized photographs will be generated parallel to and in a slightly spaced relation to the first column of three wallet size photographs.

The sub-wallet lens module 532 is constructed in similar fashion as the wallet lens module 530 and includes a base portion 558 and a row of three identically constructed lens units. More specifically, a first lens unit 560 is provided proximate one lateral edge of the base portion 558, a second lens unit 562 is provided in the approximate center of the base portion 558 immediately adjacent to the first lens unit 560, and a third lens unit 564 is provided proximate the other lateral edge of the base member 558 immediately adjacent to the second lens unit 562. Each lens unit 560–564 includes a tubular housing member 566, 568, 570 and an internally disposed lens assembly 572, 574, 576, respectively. In a preferred embodiment, each lens assembly 572, 574, 576 is capable of generating a sub-wallet photograph having an approximate size of 1"×2.1" on the paper 22. In the foregoing arrangement, the first, second, and third lens units 560, 562, 564 will generate three sub-wallet photographs as a row extending between the leading edge of the paper 22 within the exposure aperture 110 and the third column of wallet photographs generated by the third column 552 of the wallet lens module 530.

The 5"×7" lens module 534 includes an upper housing member 578, a lower housing member 580, and, as will be described hereinafter, an internally disposed lens assembly for generating a 5"×7" photographic image adjacent and parallel to the row of three sub-wallet photographs proximate the leading edge 126 of the paper 22 within the exposure aperture 110. In order to position the 5"×7" photographic image in this specific area of the exposure aperture 110, it is necessary to project the magnified image-bearing light off-center with respect to the negative 408 within the film aperture 236. With combined reference to FIG. 23, this is accomplished by configuring the lens assembly to include a first lens member 582, a second lens member 584, a third lens member 586, a fourth lens member 588, a fifth lens member 590, and a sixth lens member 592. The first and second lens members 582, 584 are disc-shaped and disposed proximate the bottom edge of the lower housing member 580, while the third and fourth lens members 586, 588 are disc-shaped and disposed within the lower housing member 580 proximate the junction with the upper housing member 578. The fifth and sixth lens members 590, 592 are in the form of a half disc and are disposed within the upper housing member 578. More specifically, the sixth lens member 592 is located at the approximate top of the upper housing member 578, while the fifth lens member 590 is disposed a predetermined distance below the sixth lens member 592 within the upper housing member 578.

In an important aspect of the present invention, the 5"×7" lens module 534 is positioned within the lens deck 52 such that the first and second lens members 582, 584 are off-center with respect to the negative 408 within the film aperture 236. In this arrangement, then, the image-bearing light rays (shown in solid lines at 594) pass angularly upwards from the negative 408 and into the first and second lens members 582, 584. The angular projection of the image-bearing light into the first and second lens members 582, 584, in turn, causes the image-bearing light rays 594 to continue projecting angularly through the third, fourth, fifth, and sixth lens members 586–592 and further into the desired position proximate the leading edge 126 of the exposure aperture 110. This is advantageous in that it provides the ability to generate 13 individual photographic images (9 wallets, 3 sub-wallets, and one 5"×7") on the paper 22 within the exposure aperture 110 with the exposure of a single negative. Moreover, this is advantageous in that the fifth and sixth lens members 590, 592 may be formed in the half disc shape, thereby reducing the amount of space consumed by the 5"×7" lens module 534. To further explain, the off-center positioning of the 5"×7" lens module 534 causes the entire image-bearing light rays 594 to extend angularly to the right of center after passing through the first, second, third, and fourth lens members 582–588. Thus, the fifth and sixth lens members 590, 592 need only comprise the right half of an ordinarily disc-shaped lens, as opposed to a full disc shape as shown in phantom at 590', 592'. If the 5"×7" lens module 534 were disposed directly above the negative 408 within the film aperture 236, the resulting image-bearing light rays (shown in dashed lines at 596) would project upwardly in a straight fashion and therefore require that the fifth and sixth lens members 590, 592 be fully formed to include each left half 590', 592'.

Figure 24A:
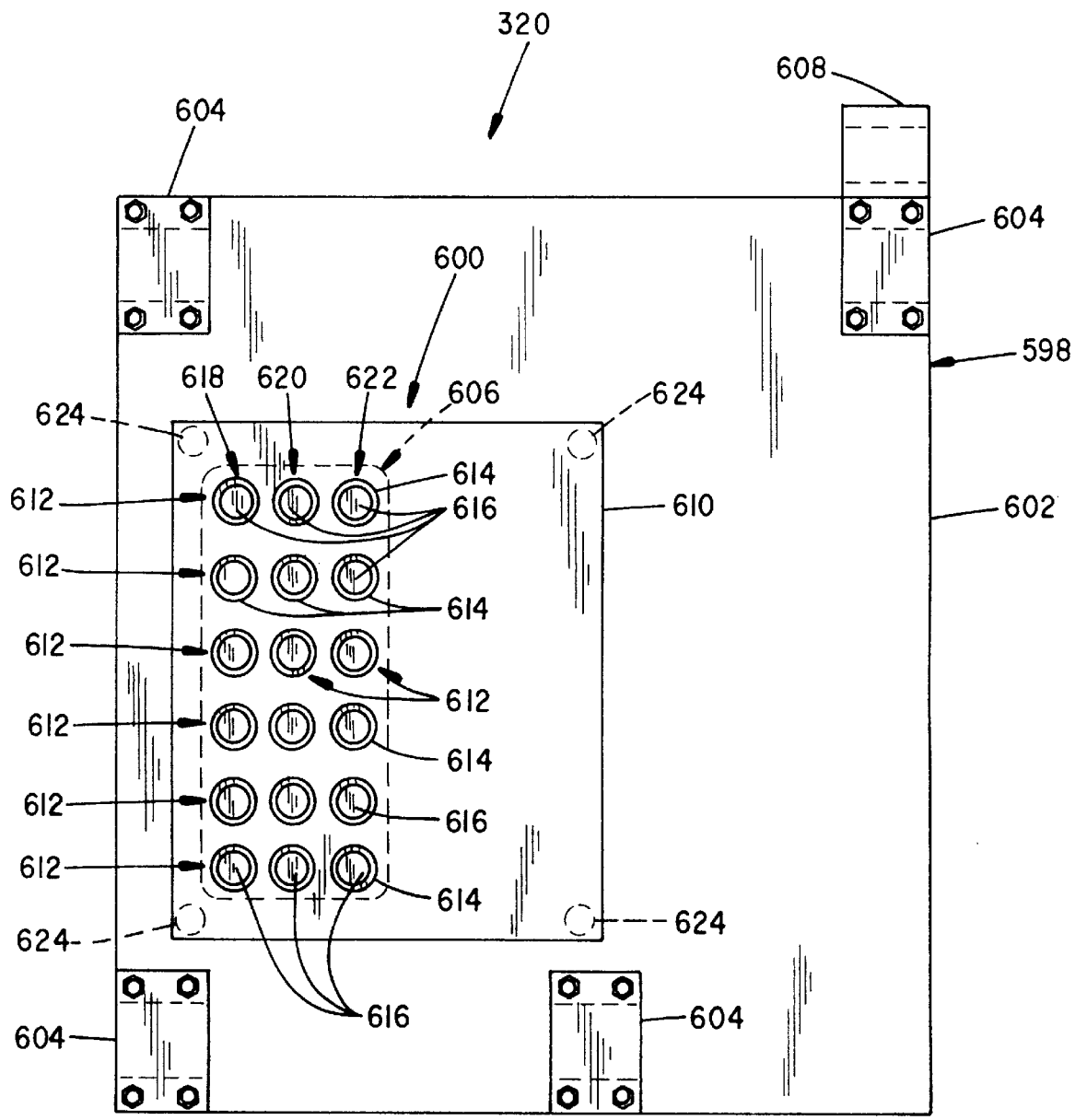
FIG. 24A is a top elevational view of the fourth projection assembly 320 within the lens deck 52 having an 18UP lens assembly 600 for generating eighteen individual photographs with the exposure of a single negative.
Figure 24B:
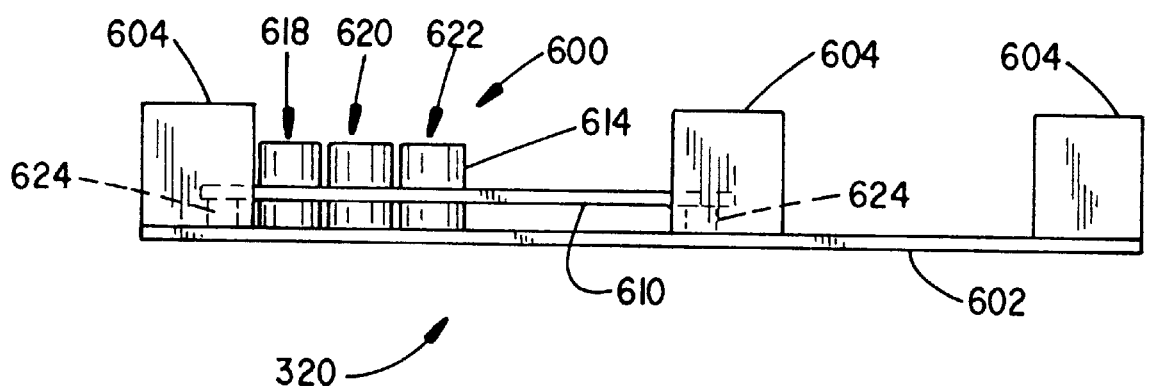
FIG. 24B is a side elevational view of the fourth projection assembly 320 shown in FIG. 24A.

Turning to FIGS. 24A and 24B, the fourth projection assembly 320 includes a carriage assembly 598 having an 18UP lens assembly 600 fixedly attached thereto. The carriage assembly 598 includes a generally planar carriage member 602 and a plurality of slide members 604. The carriage member 602 has an 18UP lens aperture 606 formed therein for allowing the image-bearing light to project upwardly into the 18UP lens assembly 600 for magnification. The slide members 604 are fixedly attached to the carriage member 602 so as to slidably receive the fourth pair of side rails 342 shown in FIG. 18. An attachment member 608 is provided for coupling the fourth motor 340 to the fourth projection assembly 320 so that the fourth projection assembly 320 may be selectively translated within the lens deck 52. The 18UP lens assembly 600 comprises a generally planar lens support member 610 having a bank of eighteen identically constructed lens units 612. The support member 610 is connected to the carriage member 602 via a plurality of stand-off members 624 such that the lens units 612 are disposed directly above the 18UP lens aperture 606. The eighteen lens units 612 are similar in structure to the aforementioned lens units, each including a tubular housing member 614 fixedly attached to the lens support member 610 having a lens assembly 616 disposed therein. In a preferred embodiment, the lens units 612 are arranged to form a first column 618, a second column 620, and a third column 622. All of the lens assemblies 616 have the same magnification ratio such that, in a preferred embodiment, eighteen individual photographic images, each having an approximate size of 1.20"×1.7", are projected upon the paper 22 within the exposure aperture 110. More particularly, the first column 618 of six lenses will project a column of six individual photographic images extending across approximately the entire 10 inch width of the paper 22 along the leading edge 126 of the exposure aperture 110. In similar fashion, the second column 620 of six lenses will project a corresponding column of six photographic images parallel to those generated by the first column 618 of six lenses, while the third column 622 of six lenses will generate a corresponding column of six photographic images proximate those generated by the second column 620 of six lenses.

Figure 25A:
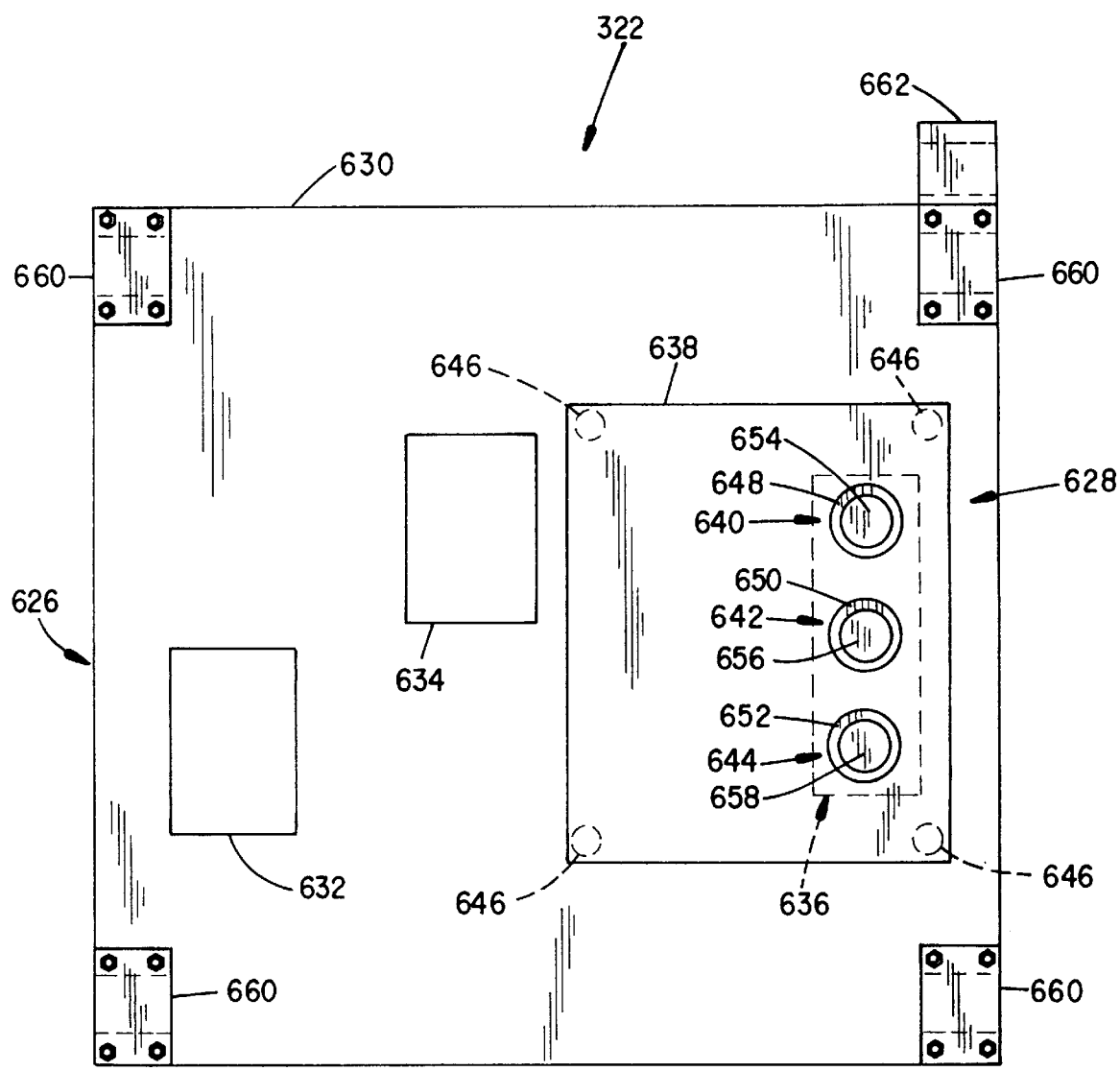
FIG. 25A is a top elevational view and FIG. 25B is a side view of a fifth projection assembly 322 within the lens deck 52 having charm lens assembly 628 for producing three identically sized charm photographs with the exposure of a single negative.
Figure 25B:
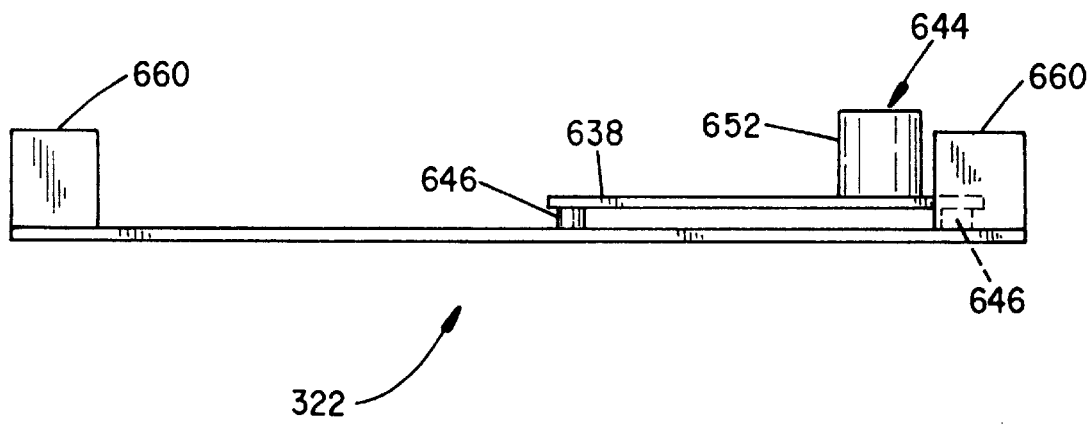
Figure 26A:
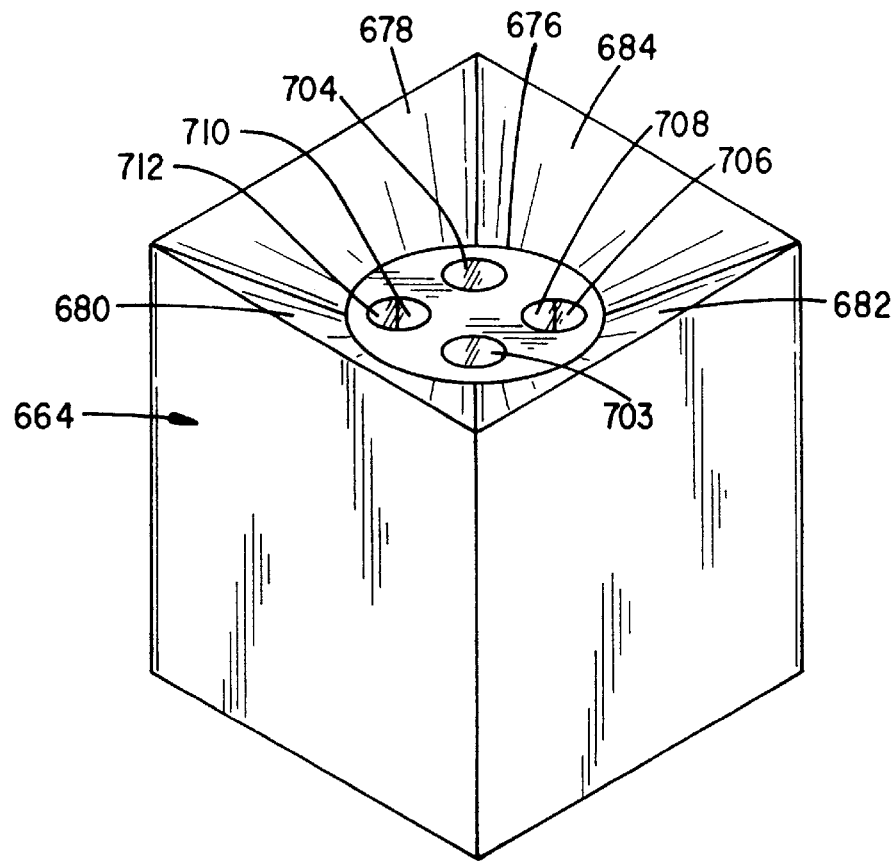
FIG. 26A is a perspective view of the lamphouse 51 shown generally in FIG. 1 illustrating an improved filtering arrangement in accordance with one aspect of the present invention.
Figure 26B:
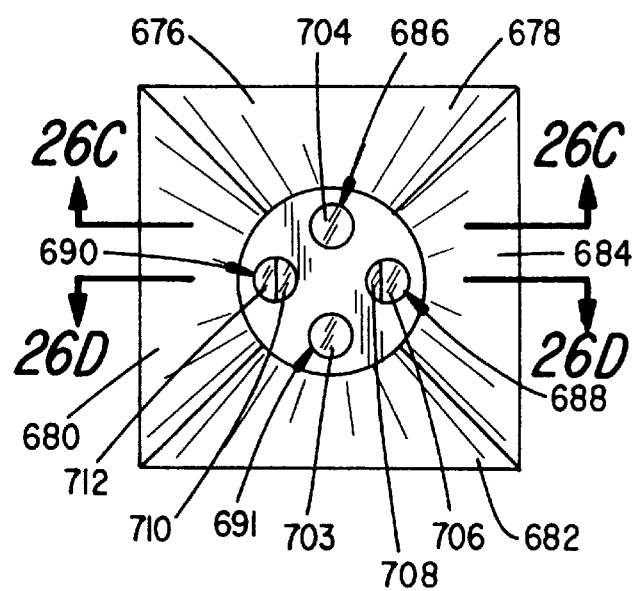
FIG. 26B is a top view of the lamphouse 51 shown in FIG. 26A.
Figure 26C:
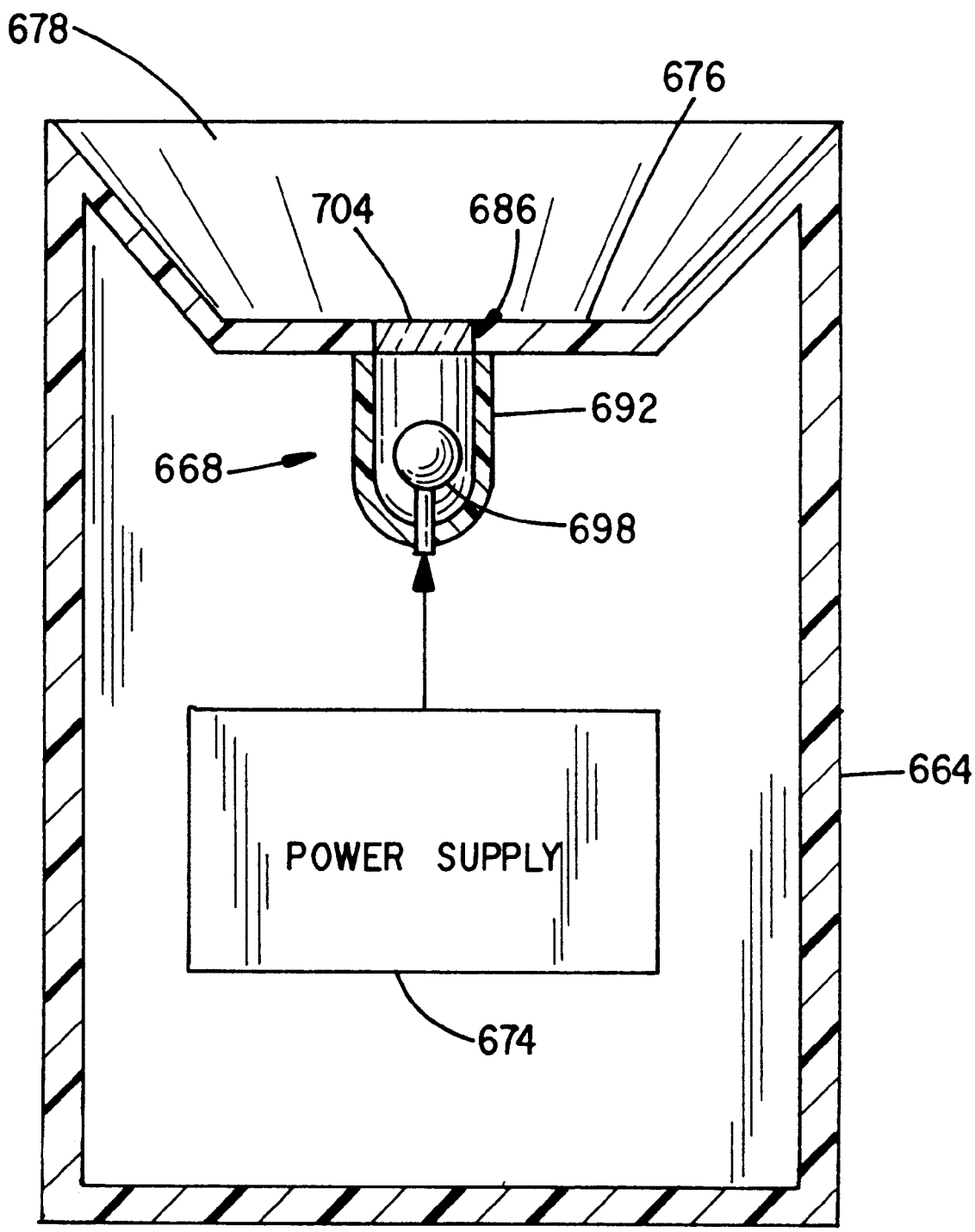
FIG. 26C is a cross-sectional view of the lamphouse 51 taken along lines 26C—26C in FIG. 26B.
Figure 26D:
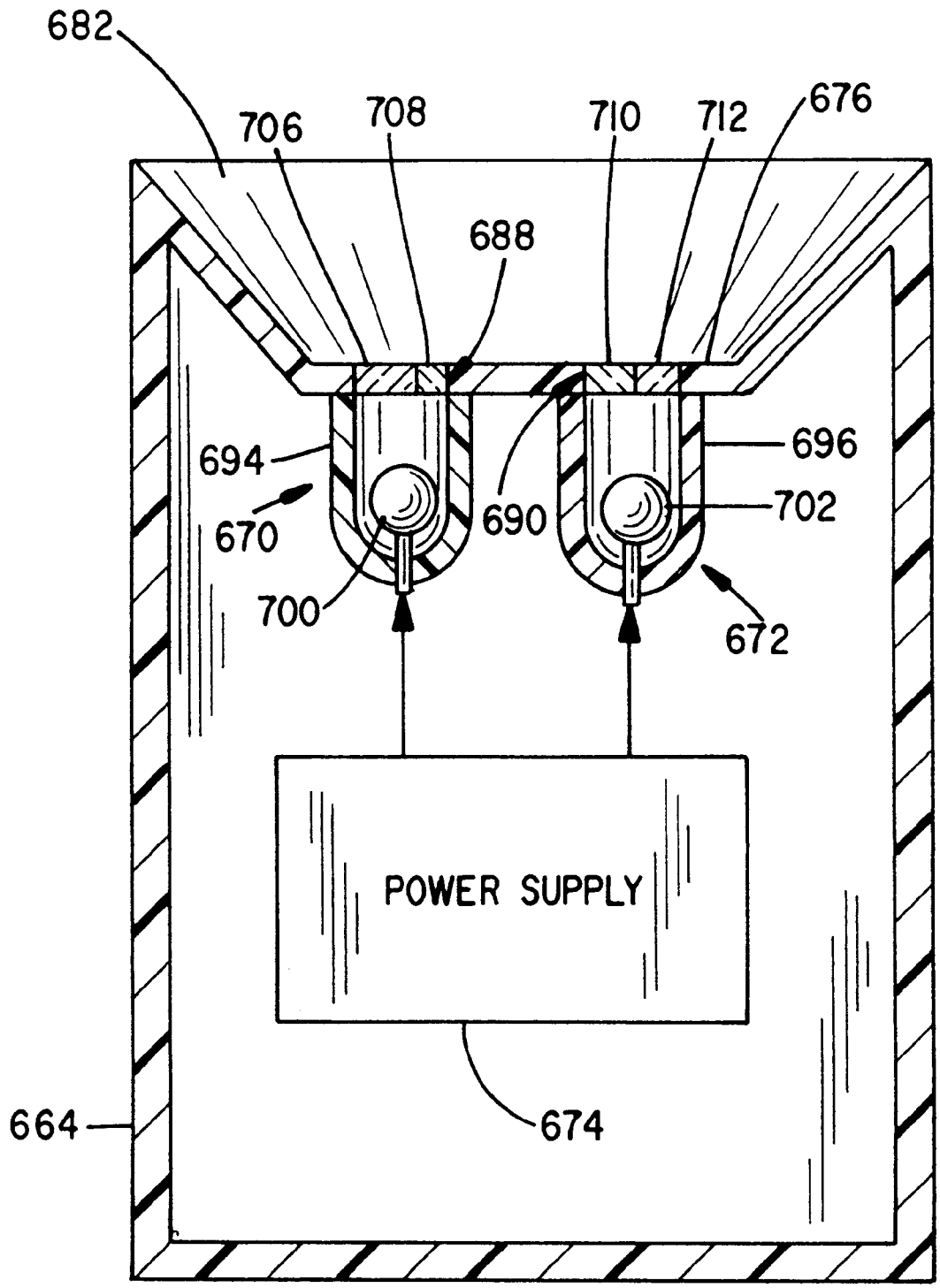
FIG. 26D is a cross-sectional view of the lamphouse 51 taken along lines 26D—26D in FIG. 26B.

With reference now to FIGS. 25A and 25B, the fifth projection assembly 322 includes a carriage assembly 626 and a charm lens assembly 628. The carriage assembly 626 includes a generally planar carriage member 630 having a plurality of slide members 660 disposed thereon for slidably receiving the fifth pair of side rails 346 shown in FIG. 18. An attachment member 662 is provided on one of the slide members 660 for coupling the fifth motor 344 to the carriage assembly 626 such that the fifth projection assembly 332 may be selectively positioned within the lens deck 52. The carriage member 630 includes a first quint masking aperture 632, a second quint masking aperture 634, and a charm aperture 636 formed therein. As will be described in greater detail below, the first and second quint masking apertures 632, 634 are provided to allow only two of the four magnified image-bearing light beams from the second, third, fourth, and fifth lens units 456–462 of the quint lens assembly 432 to pass upwardly toward the paper 22 within the exposure aperture 110. As will be explained below, the first and second quint masking apertures 632, 634 cooperate with the first and second masking assemblies 324, 326 so as to provide folio photographs comprising a plurality of different 3.5"×5" photographic images. The charm aperture 636 is provided such that image-bearing light may project upwardly into the charm lens assembly 628 for magnification. The charm lens assembly 628 includes a generally planar lens support member 638 having a first charm lens unit 640, a second charm lens unit 642, and a third charm lens unit 644 attached thereto. The lens support member 638 is fixedly attached to the carriage member 630 via a plurality of stand-off members 646. In a preferred embodiment, these charm lens units 640–644 are identical in construction and include tubular housing members 648, 650, 652 having internally disposed lens assemblies 654, 656, 658. Each lens assembly 654–658 has a magnification ratio for producing charm-sized (1"×1.25") photographic images on the paper 22 within the exposure aperture 110. More specifically, the photographic images are approximately 1"×1.25" in size and, in a preferred embodiment, are positioned parallel and immediately adjacent to the 8"×10" photographic image generated by the 8"×10" lens unit 358 of the first projection assembly 314.

Lamp Deck

With reference now to FIGS. 26A–26D, shown is the lamphouse 51 embodying yet another important feature of the present invention. The lamphouse 51 may comprise any number of commercially available lamphouses having a plurality of lamp assemblies for projecting light upwardly towards the film deck 48. In a preferred embodiment, the lamphouse 51 includes a housing member 664 equipped with a first lamp assembly 668, a second lamp assembly 670, a third lamp assembly 672, and an internally disposed power supply 674. The upper surface of the housing member 664 includes a circular portion 676 disposed centrally between angularly extending side wall portions 678, 680, 682, 684. The circular portion 676 includes a first filter aperture 686, a second filter aperture 688, and a third filter aperture 690. In a preferred embodiment, the first, second, and third filter apertures 686–690 are formed such that each aperture defines a circular area of approximately 2.41 square inches. The lamp assemblies 668–672 are identical in construction, each including a reflective bulb enclosure 692, 694, 696 coupled directly below the first, second, and third filter apertures 686, 688, 690, respectively, and an internally disposed light bulb 698, 700, 702. The power supply 674 is coupled to each light bulb 698–702 and configured such that each light bulb 698–702 may be selectively driven to vary the light energy being emitted therefrom.

In an important aspect of the present invention, an improved filtering arrangement is provided for balancing the color of the light being emitted by the light bulbs 698–702 such that each light bulb 698–702 may be powered at approximately the same level. As will become apparent, equalizing the level at which each of the light bulbs 698–702 are powered creates a condition where all the light bulbs 698–702 will have a substantially equal life span such that they can all be replaced at the same time, thereby minimizing system down time consumed for replacing the light bulbs 698–702. The improved filtering arrangement of the present invention includes a first dichroic filter 704 disposed within the first filter aperture 686, a second and a third dichroic filter 706, 708 disposed within the second filter aperture 688, and a fourth and a fifth dichroic filter 710, 712 disposed within the third filter aperture 690. In order to properly expose the paper 22 within the exposure aperture 110, the lamphouse 51 must combine red, green, and blue light in specific fashion to ensure proper color balance. To accomplish this, the first, third, and fourth dichroic filters 704, 708, 710 are provided as red in color, the second dichroic filter 706 is provided as green in color, and the fifth dichroic filter 712 is provided as blue in color. In terms of size, the first dichroic filter 704 has an area of approximately 2.41 square inches, the second dichroic filter 706 has an area of approximately 1.69 square inches, the third dichroic filter 708 has an area of approximately 0.72 square inches, the fourth dichroic filter 710 has an area of approximately 1.35 square inches, and the fifth dichroic filter 712 has an area of approximately 1.06 square inches.

In the foregoing arrangement, the first dichroic filter 704 filters the light emanating from the first lamp assembly 668, the second and third dichroic filters 706, 708 combine to filter the light emanating from the second lamp assembly 670, and the fourth and fifth dichroic filters 710, 712 combine to filter the light emanating from the third lamp assembly 672. Each of the filtered light beams is thereafter passed through the diffusion plate 286 prior to passing through the negative aperture 236 to further ensure proper color mixing for optimal exposure quality on the paper 22 within the exposure aperture 110. Moreover, by providing the second and third dichroic filters 706, 708 and the fourth and fifth dichroic filters 710, 712 in matched sets as set forth above, the resulting light beams are appropriately colored such that each of the light bulbs 698–702 may be operated at approximately the same power level. Operating the light bulbs 698–702 at equivalent power levels is advantageous in that the bulbs 698–702 will have approximately the same effective life span such that they may all be replaced at the same time, thereby minimizing the amount of system down time for such activities. This is in marked distinction to filtering arrangements of prior art lamphouses which, as noted above, involve positioning a single uni-color dichroic filter (i.e. red, green, blue, yellow) over each lamp assembly for creating the colored light. In that red is the predominant color required when creating exposures on photographic paper, the light bulb associated with the red filter are typically operated at a higher power than the other light bulbs, thereby causing it to burn out at an increased rate relative to the other light bulbs. This, once again, disadvantageously translates into increased system down time for replacing the burned out light bulbs. The improved filtering arrangement of the present invention solves this problem by equalizing the light energy which is emitted from the light bulbs 698–702. As noted above, this causes all the light bulbs 698–702 to have substantially the same life span such that they can all be replaced at the same time so as to effectively reduce the amount of system down time.

Mode of Operation

Figure 27:
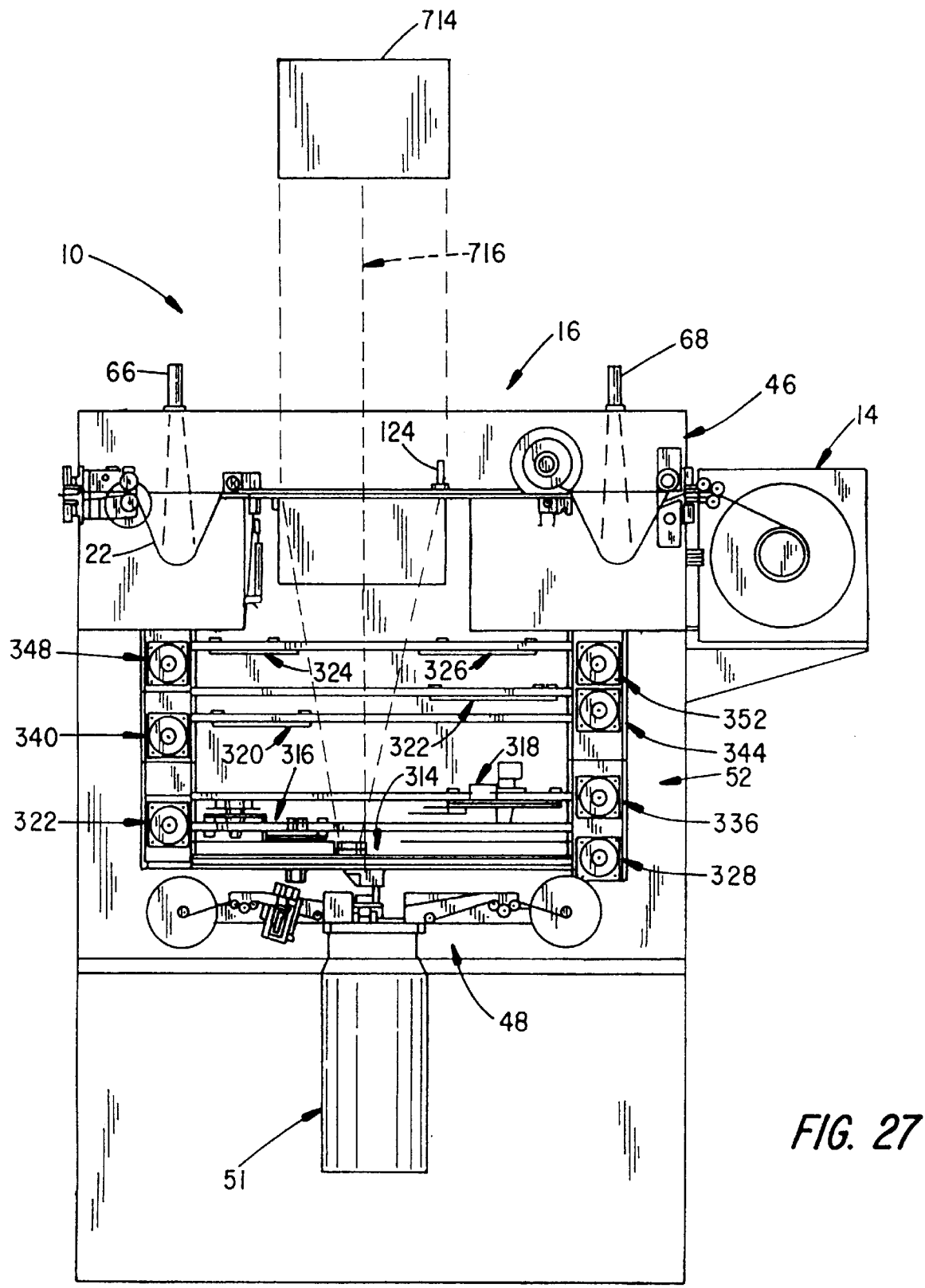
FIG. 27 is a side view of the high speed package printer 10 in operation while generating a 10"×13" photograph 714 via optical rotation.

FIG. 27 illustrates the high speed package printer 10 of the present invention configured to produce a 10"×13" photograph 714. With further reference to FIGS. 19A–20, the first projection assembly 314 is positioned within the lens deck 52 such that the first prism member 386 of the rotational prism assembly 356 is located directly above the image-bearing light which progresses upward from the film deck 48. The first prism member 386 cooperates with the second and third prism members 388, 390 and the lens assemblies 392–396 to rotate and magnify the image-bearing light from the film deck 48 to produce the 10"×13" photographic image 714 on the paper 22 within the exposure aperture 110 of the paper deck 46. The second, third, fourth, and fifth projection assemblies 316, 318, 320, 322 are moved off to either side of the lens deck 52 via motors 332, 336, 340, 344 so as not to interfere with the magnified image-bearing light projecting upwardly from the rotational prism assembly 356. In a preferred embodiment, the first and second masking assemblies 324, 326 may be selectively posiitoned within the penumbra of the magnified image-bearing light via motors 348, 352, respectively, to define sharp borders along the leading and trailing edges of the resulting 10"×13" image 714. It should be noted with particularity that the magnified image-bearing light projects off-center with respect to the negative within the negative holder assembly 192, as evidenced by the negative center line designated at 716.

Figure 28:
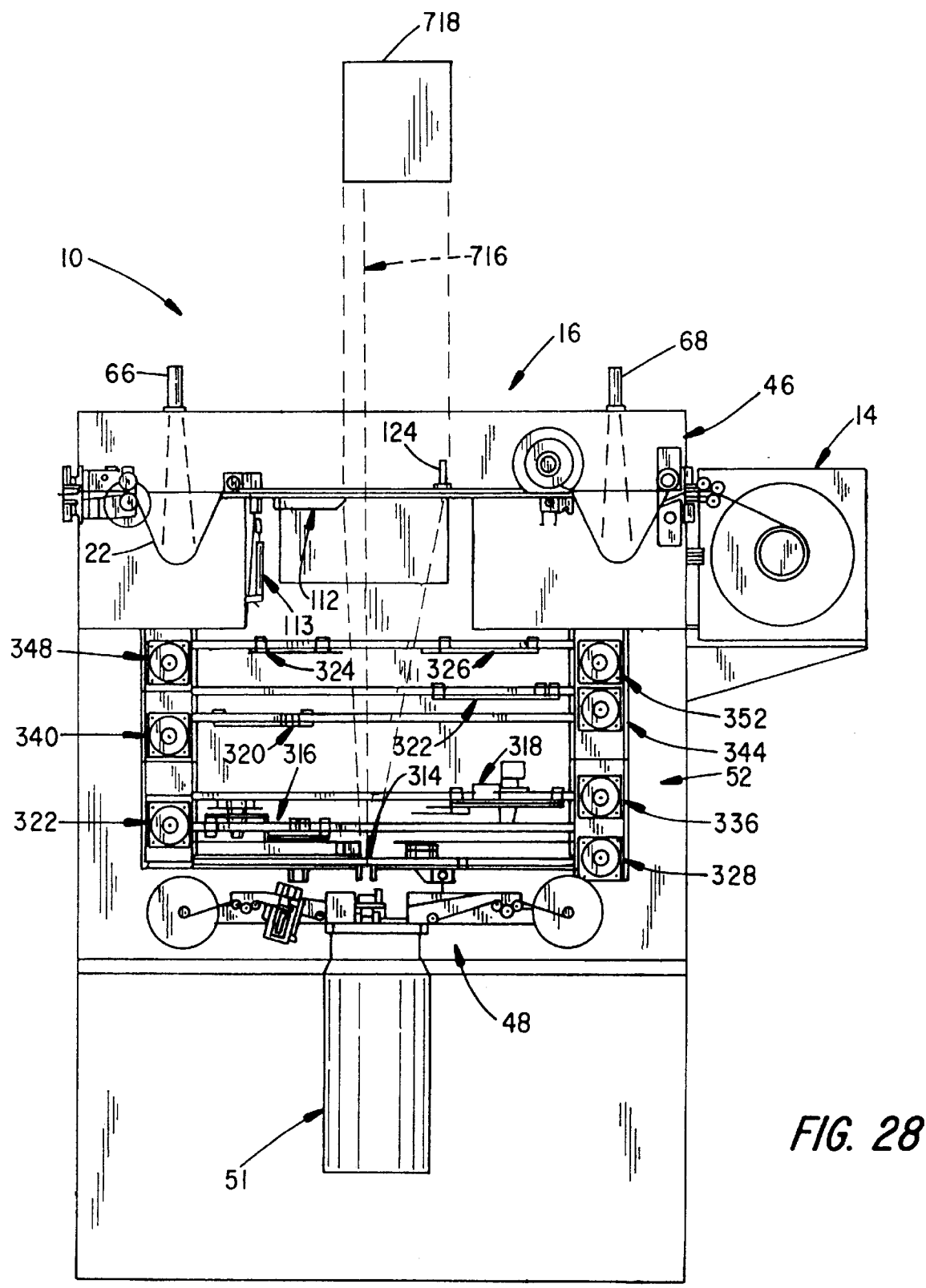
FIG. 28 is a side view of the high speed package printer 10 in operation while generating an 8"×10" photograph 718.

FIG. 28 illustrates the high speed package printer 10 of the present invention configured to produce an 8"×10" photograph 718. With further reference to FIGS. 19A–19C, the first projection assembly 314 is positioned within the lens deck 52 such that the 8"×10" lens unit 358 is positioned directly above the image-bearing light projecting upwardly from the film deck 48. The lens assembly 370 within the 8"×10" lens unit 358, in turn, magnifies the image-bearing light from the film deck 48 to project the 8"×10" photographic image 718 on the paper 22 within the exposure aperture 110 shown in FIG. 3. As above, the second, third, fourth, and fifth projection assemblies 316, 318, 320, 322 are moved off to either side of the lens deck 52 via motors 332, 336, 340, 344 so as not to interfere with the magnified image-bearing light projecting upwardly from the 8"×10" lens unit 358. In an important aspect, the hinged mask member 112 is selectively actuated via first actuator 113 to thereby shorten the length of the exposure aperture 110. In a preferred embodiment, the mask member 112 is specifically dimensioned so as to create a sharp border along the trailing edge of the resulting 8"×10" photographic image 718. The second mask member 326 may be selectively positioned within the penumbra of the magnified image-bearing light from the 8"×10" lens unit 358 via the motor 352 so as to define a sharp border along the leading edge of the resulting 8"×10" photographic image 718. It should once again be noted that the magnified image-bearing light projects upwardly from the 8"×10" lens unit 358 off-center in relation to the negative center line 716 such that the 8"×10" photographic image 718 abuts the leading edge 126 of the exposure aperture 110 as shown in FIG. 3.

Figure 29:
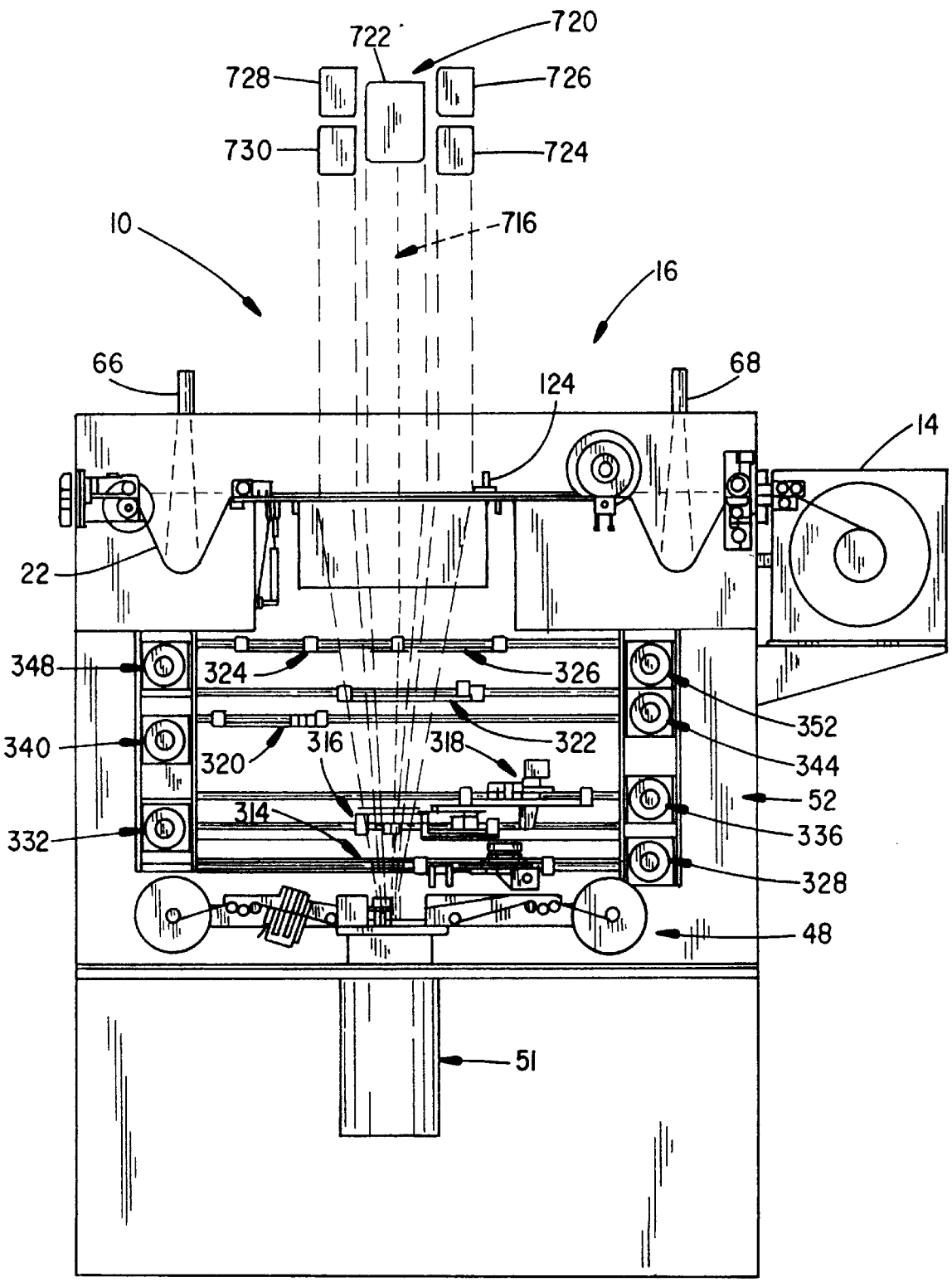
FIG. 29 is a side view of the high speed package printer 10 in operation while generating a composite photograph 720 comprising five individual photographic images.

FIG. 29 illustrates the high speed package printer 10 of the present invention configured to produce a quint photograph 720 comprising five separate photographic images 722–730. The first projection assembly 314 is positioned within the lens deck 52 such that the aperture 384 formed in the mask member 362 (FIG. 19A) is located directly above the negative within the film deck 48. Positioning the first projection 314 in this fashion restricts the image-bearing light which projects from the film deck 48 so as to reduce the incidence of reflections within the lens deck 52 when using the second, third, fourth, and fifth projection assemblies 316–322. The second projection assembly 316 is positioned within the lens deck 52 such that the quint assembly 432 shown in FIGS. 21A and 21B is centered within the image-bearing light which progresses upwardly through the aperture 384 of the first projection assembly 314. This upwardly projecting image-bearing light causes each lens unit 454–462 of the quint assembly 432 to project magnified image-bearing light upwardly such that, if unimpeded, the quint photograph 720 will result on the paper 22 within the exposure aperture 110 shown in FIG. 3. Specifically, the first lens unit 454 will produce the first photographic image 722 centered slightly to the left of the negative center line 716, while the second, third, fourth, and fifth lens units 456, 458, 460, 462 will produce the second, third, fourth, and fifth photographic images 724, 726, 728, 730, respectively, disposed in equi-distant fashion about the first photographic image 722.

In an important aspect of the present invention, the first and second quint masking apertures 632, 634 of the fifth projection assembly 322 (FIG. 25A) cooperate with the first and second masking assemblies 324, 326 to selectively block out one or more of the magnified image-bearing light beams from the quint lens assembly 432 so as to restrict the number of magnified image-bearing light beams which project onto the paper 22 at any given time. This selective masking feature, in conjunction with the bi-directional film movement of the present invention, provides the capability to generate the quint photograph 720 wherein each photographic image 722–730 is based on separate and distinct negative within the film 196. For example, the first photographic image 722 may be formed separately by masking out the magnified image-bearing light beams from the second, third, fourth, and fifth lens units 256–462 while allowing only the light from the first lens unit 454 to project unimpeded onto the paper 22 within the exposure aperture 110. In a preferred embodiment, this masking is accomplished by moving the third, fourth, and fifth projection assemblies 318–322 off to either side of the lens deck 52 while selectively positioning the first and second masking assemblies 324, 326 to block out the magnified image-bearing light beams from the second, third, fourth, and fifth lens units 256–462. Moreover, the first and second masking assemblies 324, 326 may be advantageously positioned within the penumbra of the image-bearing light from the first lens unit 454 so as to produce sharply defined borders on the trailing and leading edges, respectively, of the resulting photographic image 722.

Following each exposure the film 196 within the film deck 48 may thereafter be selectively advanced or reversed to position another preselected photographic negative within the negative aperture 236 of the negative holder assembly 192. In a preferred embodiment, the masking members 324, 326 and masking apertures 632, 634 are simultaneously re-positioned while the film deck 48 is locating the next preselected negative so as to reduce the overall amount of time between each exposure. For example, after the exposure which forms the first photographic image 722, the film 196 within the film deck 48 may be selectively advanced or reversed to locate another preselected negative while, at the same time, the masking members 324, 326 and masking apertures 632, 634 are re-positioned to produce the second, third, fourth, or fifth photographic images 724–730 based on the new negative. In order to create the second photographic image 724, the first masking assembly 324 will be positioned so as to block out the magnified image-bearing light from the first, fourth, and fifth lens units 454, 460, 462. The fifth projection assembly 322 will also be positioned such that the image-bearing light from the second lens unit 456 will project through the first quint masking aperture 632 to create the photographic image 724. In an important aspect, the staggered relation between the first and second quint masking apertures 632, 634 causes the carriage member 630 of the fifth projection assembly 322 to mask out the light projecting upwardly from the third lens unit 458 while the first quint masking aperture 632 allows the magnified image-bearing light from the second lens unit 456 to project onward to the paper 22. It is furthermore possible to position the second masking assembly 326 within the penumbra of the image-bearing light as it projects toward the paper 22 to define a sharp or crisp border on the leading edge of the second photographic image 724.

The third, fourth, and fifth photographic images 726–730 may be formed separately in the same fashion as set forth above. More specifically, the third photographic image 726 may be individually formed by selectively positioning the first masking assembly 324 to block out the magnified image-bearing light from the first, fourth, and fifth lens units 454, 460, 462, while simultaneously positioning the fifth projection assembly 322 such that the image-bearing light from the third lens unit 458 will project through the second quint masking aperture 634 to create the photographic image 726. As above, the second masking assembly 326 may be selectively positioned within the penumbra of the upwardly projecting light so as to produce a sharply defined border on the leading edge of the resulting photographic image 726. The fourth photographic image 728 may be individually formed by selectively positioning the second masking assembly 326 to block out the magnified image-bearing light from the first, second, and third lens units 454, 456, 458, while simultaneously positioning the fifth projection assembly 322 such that the image-bearing light from the fourth lens unit 460 will project through the second quint masking aperture 634 to create the photographic image 728. Finally, the fifth photographic image 730 may be individually formed by selectively positioning the second masking assembly 326 to block out the image-bearing light from the first, second, and third lens units 454, 456, 458, while simultaneously positioning the fifth projection assembly 322 such that the image-bearing light from the fifth lens unit 462 will project through the first quint masking aperture 632 to create the photographic image 730. In the latter two instances, the first masking assembly 324 may be selectively positioned within the penumbra of the upwardly projecting light so as to form sharply defined borders along the trailing edges of the resulting photographic images 728, 730.

Figure 30:
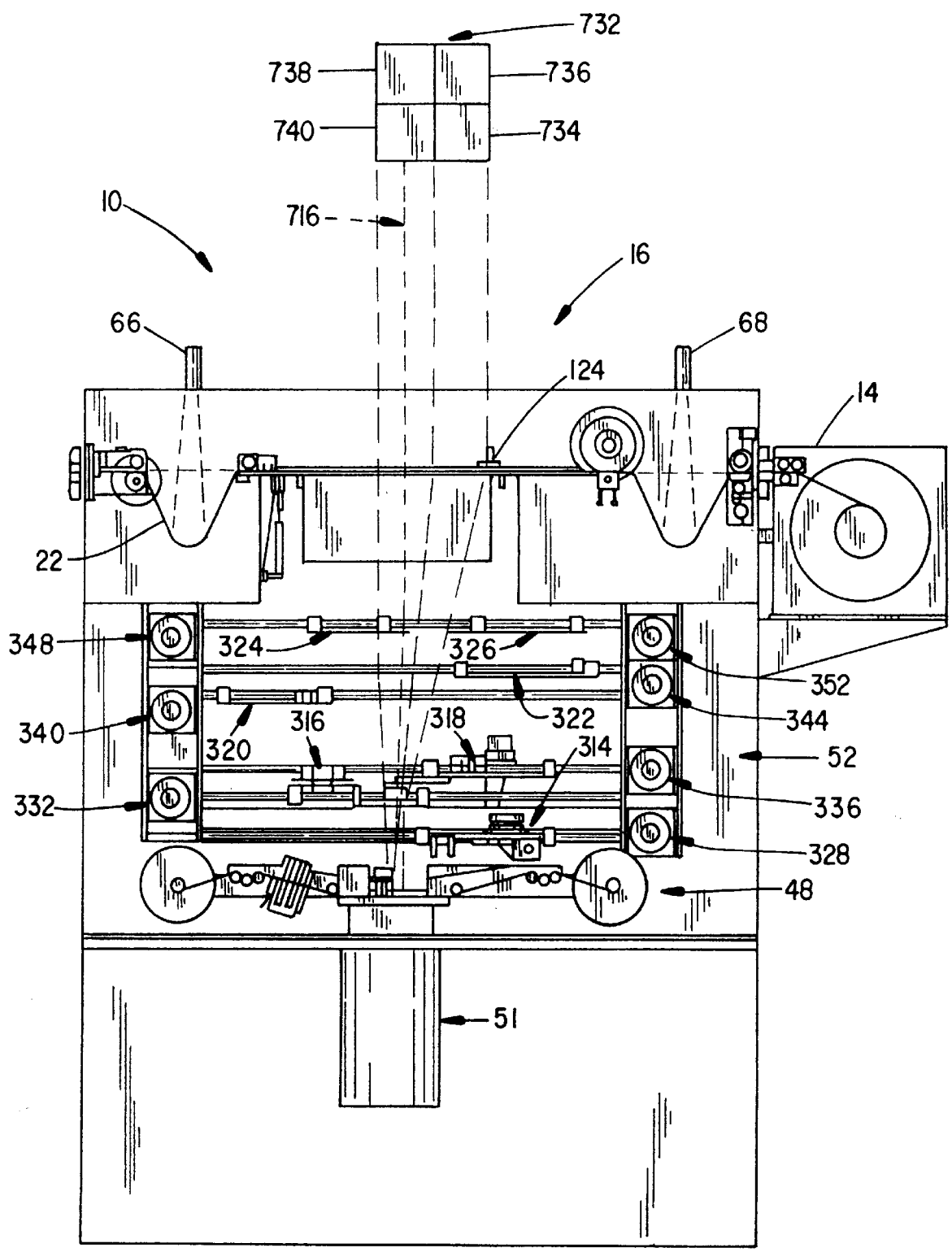
FIG. 30 is a side view of the high speed package printer 10 in operation while generating a folio-style photograph 732 comprising four individual photographic images.

FIG. 30 illustrates the high speed package printer 10 of the present invention configured to produce a folio-style composite 732 comprising four separate photographic images 734–740. The second projection assembly 316 is positioned within the lens deck 52 such that the quad lens assembly 434 shown in FIGS. 21A and 21B is centered within the image-bearing light which progresses upwardly through the aperture 384 of the first projection assembly 314 (FIG. 19A). Arranged as such, each lens unit 486–490 of the quad lens assembly 434 will project magnified image-bearing light upwardly toward the paper 22 within the exposure aperture (FIG. 3). In an important aspect of the present invention, each photographic image 734–740 of the folio-style photograph 732 can comprise a different photograph by selectively masking out the magnified image-bearing light beams which project upwardly from the lens units 486–490 in conjunction with the bi-directional film feature of the film deck 48. The selective masking is accomplished through the use of the masking member 516 of the third projection assembly 318 (FIGS. 22A–22C). More specifically, the first and second quad lens masking apertures 540, 542 of the third projection assembly 318 (FIG. 22A) are disposed in a spaced and staggered relation such that the masking member 516 will effectively block out three of the four magnified image-bearing light beams from the quad lens assembly 434 when one of the masking apertures 540, 542 is positioned above one of the lens units 484–490.

In order to create the first photographic image 734, the third projection assembly 318 is positioned such that the first quad lens masking aperture 540 is directly above the first lens unit 484. This allows the magnified image-bearing light from the first lens unit 484 to project upwardly toward the paper 22 while the masking member 516 effectively blocks out the image-bearing light from the second, third, and fourth lens units 486–490. The second photographic image 736 may be similarly formed by positioning the third projection assembly 318 such that the second quad lens masking aperture 542 is located directly above the second lens unit 486, thereby allowing the image-bearing light from the second lens unit 486 to project upwardly in an unimpeded fashion such that the masking member 516 blocks out the image-bearing light from the first, third, and fourth lens units 484, 488, 490. The third and fourth photographic images 738, 740 are formed in similar fashion by positioning the second quad lens masking aperture 542 over the third lens unit 488 and positioning the first quad lens masking aperture 540 over the fourth lens unit 490, respectively. In a preferred embodiment, the first and second masking assemblies 324, 326 may be employed to create sharply defined borders on the resulting photographic images 734–740. This is accomplished by selectively positioning the first and second masking members 324, 326 such that the first masking member 324 is disposed within the penumbra, or shadow, of the trailing edge of the image-bearing light projecting upwardly from each lens unit 484–490, while the second masking member 326 is likewise positioned within the penumbra, or shadow, of the leading edge of the image-bearing light projecting upwardly from each lens unit 484–490.

Figure 31:
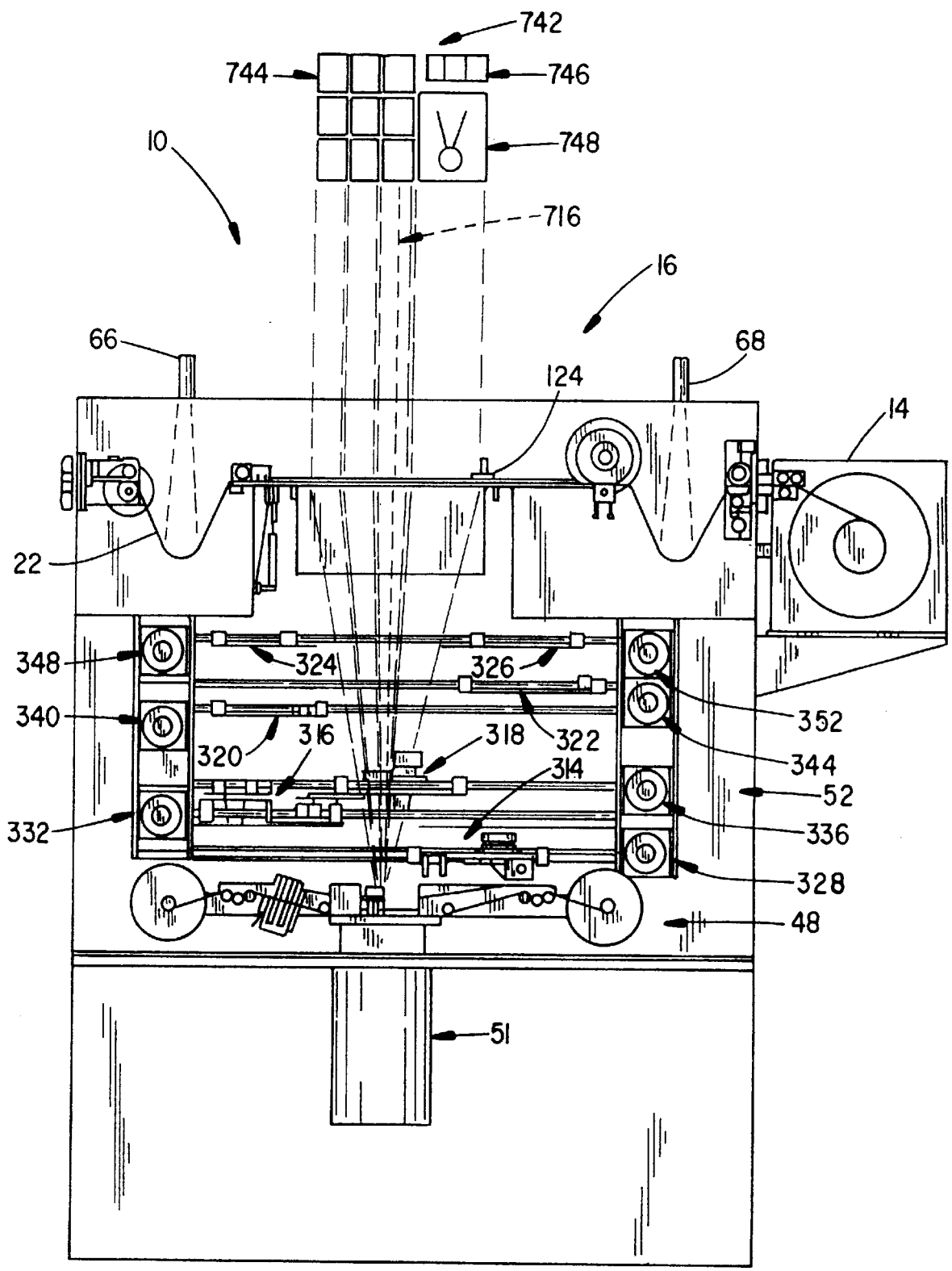
FIG. 31 is a side view of the high speed package printer 10 in operation while generating a 13UP photograph 742 comprising nine wallet sized photographic images, three sub-wallet sized photographic images, and a single 5"×7" photographic image.

FIG. 31 illustrates the high speed package printer 10 of the present invention configured to produce a 13UP photograph 742 comprising nine wallet-sized photographic images 744, three sub-wallet-sized photographic images 746, and one 5"×7" photographic image 748. The third projection assembly 318 (FIGS. 22A–22C) is positioned within the lens deck 52 such that the 13UP lens assembly 514 is centered within the image-bearing light which progresses upwardly through the aperture 384 of the first projection assembly 314 (FIG. 19A). In an important aspect of the present invention, the wallet lens module 530, the sub-wallet lens module 532, and the 5"×7" lens module 534 are configured so as to simultaneously magnify and project all of the photographic images 744–748 onto the paper 22 within the exposure aperture 110 (FIG. 3) for each exposure performed by the film deck 48. In this fashion, all of the photographic images 744–748 which comprise the 13UP photograph 742 are based on the same negative and therefore result in identical photographs of varying size. Producing the 13UP photograph 742 to comprise identical photographic images of varying size is particularly noteworthy in view of the prior art package printers which typically employ separate lens assemblies for producing each particular size of photograph. Such prior art systems therefore require the use of several different lens assemblies to generate photographs of varying size which, it will be appreciated, consumes a considerable amount of time to accomplish the selective positioning and exposure. The 13UP lens assembly 514 of the present invention, on the contrary, advantageously increases the number of photographs which may be generated during the exposure of a single negative, thereby maximizing the efficiency of the package printer 10 of the present invention.

Creating the 13UP photograph 742 presents a significant technical challenge in that the wide range of photograph sizes (i.e. wallet, sub-wallet, and 5"×7") necessarily requires lens assemblies having a wide range of focal lengths. More specifically, with combined reference to FIG. 31, the focal length of the 5"×7" lens assembly 514 is substantially larger than the focal length of the wallet and sub-wallet lens assemblies 530, 532, while the focal length of the sub-wallet lens assembly 532 is substantially shorter than the 5"×7" and wallet lens assemblies 514, 530 in order to create the photographic images 744–748. In an important aspect of the present invention, the 5"7" lens assembly 514 is constructed in a retro-focus arrangement and the sub-wallet lens assembly 532 is constructed with an internal mirror arrangement such that both lens assemblies are as close as possible to the center of gravity of the third projection assembly 318. Specifically, the retro-focus feature of the 5"×7" lens assembly 534 allows it to be disposed closer to the paper 22 than would ordinarily be possible, while the mirror arrangement of the sub-wallet lens assembly 532 allows it to be disposed farther away from the paper 22 than would ordinarily be possible. Constructing the 13UP lens assembly 514 in this fashion is beneficial in that it brings the moment of inertia of the third projection assembly 318 closer to its center of gravity so as to effectively eliminate any rocking or vibrations following the movement of the third projection assembly 318, thereby minimizing setting time and increasing the overall speed of operation of the package printer 10. The 13UP lens assembly 514 is furthermore advantageous in that effectively creates the photographic images 744–748 shown in FIG. 31 in close proximity to one another so as to minimize the amount of space between the adjacent photographic images. This, it will be appreciated, is beneficial in that it amounts to a more efficient use of the photographic paper 22.

Figure 23:
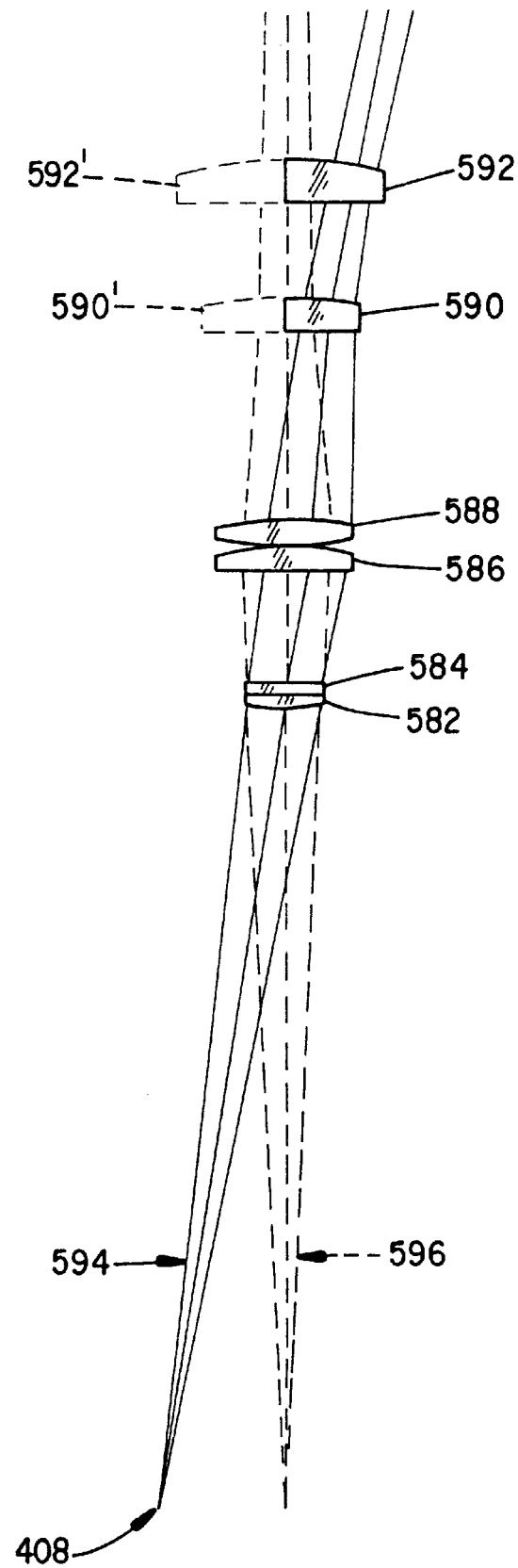
FIG. 23 is a side view of the various lens members disposed within the lens module 534 shown in FIGS. 22A–22C for producing 5"×7" photographs.

With reference to FIGS. 22A–23, space within the lens deck 52 is furthermore conserved by constructing the 5"×7" lens assembly such that the fifth and sixth lens members 590, 592 are each provided as half-lens in shape. As noted above, the 5"×7" lens module 534 is positioned within the lens deck 52 such that the first and second lens members 582, 584 are off-center with respect to the negative 408 within the film aperture 236. The image-bearing light rays 594 therefore pass angularly from the negative 408 into the first and second lens members 582, 584 and onward in an angular fashion to the third and fourth lens members 586, 588. The image-bearing light 594 thereafter exits the fourth lens member 588 and continues angularly to the right of center so as to project fully through the fifth and sixth lens members 590, 592. This is advantageous in that the fifth and sixth lens members 590, 592 do not need to be constructed as full lenses to include the left halves 590', 592' as shown in phantom. Rather, the fifth and sixth lens members 590, 592 may be formed in the half disc shape, thereby reducing the amount of space consumed by the 5"×7" lens module 534.

Although the fourth and fifth projection assemblies 320, 322 are not shown in operation, it is to be understood that the fourth and fifth projection assemblies 320, 322 are selectively positionable within the lens deck 52 via motors 340, 344, respectively, for producing a plurality of identical photographic images on the paper 22 within the exposure aperture 110 (FIG. 3). More specifically, the 18UP lens assembly 600 of the fourth projection assembly 320 may be selectively positioned within the image-bearing light projecting through the aperture 384 of the first projection assembly 314 (FIG. 19A) so as to project a bank of eighteen individual photographs as described above with reference to FIGS. 24A and 24B. The lens units 612 of the 18UP lens assembly 600 project upwardly in an off-center fashion such that the resulting bank of eighteen photographic images is disposed on the paper 22 proximate the leading edge 126 of the exposure aperture 110 (FIG. 3). In a preferred embodiment, each bank of eighteen photographs consumes approximately one third (⅓) length of the exposure aperture 110 such that 54 photographs can be generated on a single 10"×13" swath of unexposed paper 22 within the exposure aperture 110. This is easily accomplished by advancing the paper 22 such that the original bank of eighteen photographs is positioned slightly outside the exposure aperture 110, re-exposing the negative to form a second bank of eighteen photographs adjacent to the first bank, and repeating this process to form a third bank of eighteen photographs adjacent to the second bank. The fifth projection assembly 322 may be operated in a similar fashion to produce a bank of three individual charm-sized photographs on the paper 22 proximate the leading edge 126 of the exposure aperture 110 (FIG. 3). For example, the fifth projection assembly 322 may be employed to create a row of three charm photographs alongside an 8"×10" photograph.

It should be noted with particularity that each photographic image created by the projection assemblies 314–322 is projected off-center to the right of the negative, as designated by reference numeral 716, such that the resulting images are formed proximate the leading edge 126 of the exposure aperture 110 (FIG. 3). Such off-center printing is advantageous in that the paper 22 can be marked via paper punching actuators 122, 124 while the exposures are being carried out. This is in contra-distinction to the prior art printers which print on-center in that the paper 22 must be advanced in such systems following each exposure to appropriately mark the paper for processing. The additional step of advancing, it will be appreciated, consumes valuable time and therefore decreases the overall output of such prior art package printers over a given time. The off-center printing of the present invention, however, effectively eliminates any additional advancing steps for marking by printing off-center such that the marking can be conducted by the actuators 122, 124 while the exposures are being conducted. This advantageously increases the overall speed and hence output of the package printer 10.

In summary, the high speed package printer 10 advantageously includes an improved paper loading feature for automatically loading photographic paper without fear of having the paper buckling or becoming fouled up in the paper transportation path. The ultrasonic proximity sensors 66, 68 are provided for dynamically measuring the paper slack loops to ensure for the smooth and efficient operation of the paper drive motors which, as will be appreciated, enables high speed paper advancing. The diffusion plate cleaning assembly 284 sweeps the diffusion plate on a periodic basis to automatically remove any and all dust particles and/or "floaters" which may have settled on the diffusion plate during use, thereby reducing the need to repeat tainted sittings and reducing the overall amount of scrap and waste. The film cleaning assembly 182 automatically removes dust and related impurities from the passing film so as to improve overall print quality, reduce the amount of scrap, and reduce the need to manually touch-up the prints to remove blemishes caused by dust. The negative cropping assembly 268 is provided between the lamp deck 50 and the film deck 48 for selectively cropping the light which projects upwardly from the lamphouse 51 into one of several sharply delineated border shapes. Furthermore, the bi-directional film movement and selective masking capabilities advantageously provide the capability to generate composite photographs based on a plurality of different negatives so as to eliminate the need for separate composite printers. The rotational prism assembly 356 advantageously generates 10"×13" photographs via optical rotation so as to eliminate the need for a rotating turret. The 13UP lens assembly 514 is capable of creating nine wallet sized photographs, three sub-wallet sized photographs, and a single 5"×7" photograph with a single exposure. The filtering arrangement within the lamphouse 51 advantageously equalizes the operation level of each lamp assembly 668–672 such that each light bulb 698–702 will have the same approximate life span, thereby allowing all of the bulbs 698–702 to be replaced at the same time so as to minimize system down time.

The various embodiments of the present invention have been described herein in considerable detail in order to comply with the Patent Statutes and to provide those skilled in the art with the information needed to apply the novel principles and to construct and use such specialized components as are required. It is also to be understood that the invention can be carried out by specifically different means and that various modifications can be accomplished without departing from the scope of the invention itself. Moreover, the corresponding structures, materials, acts, and equivalents of all means or step plus function elements in the claims below are intended to include any structure, material, or acts for performing the functions in combination with other claimed elements as specifically claimed.

For example, although the paper take-up cartridge 16 is shown as being substantially smaller than the paper supply cartridge 14, it is to be fully understood that the paper take-up cartridge 16 may be constructed in essentially the same fashion as the paper supply cartridge 14 so as to receive a greater quantity of photographic paper therein.

What is claimed is:

1. An apparatus for optically rotating image-bearing light within a photographic printer approximately ninety degrees for projection onto photographic paper, comprising:

(a) first prism means positioned to receive the image-bearing light from a photographic negative;

(b) second prism means disposed proximate said first prism means and positioned to receive the image-bearing light from the first prism means;

(c) third prism means disposed proximate said second prism means and positioned to receive the image-bearing light from the second prism means; and (d) magnification means for magnifying said rotated image-bearing light from said first, second, and third prism means to produce a photographic image on said photographic paper having a predetermined size, whereby said first, second, and third prism means cooperate to optically rotate the image-bearing light approximately ninety degrees while maintaining the orientation of the image-bearing light.

2. The apparatus as set forth in claim 1 and further, said magnification means including first lens means disposed proximate a light outlet of said third prism means.

3. The apparatus as set forth in claim 2 and further, said magnification means including second lens means disposed between said first and second prism means and third lens means disposed between said second and third prism members.

4. The apparatus as set forth in claim 3 and further, said first lens means including a first lens member disposed proximate said light outlet of said third prism means and a second lens member disposed proximate said first lens member.

5. The apparatus as set forth in claim 4 and further, said first lens means including a third lens member disposed between said first and second lens members.

6. The apparatus as set forth in claim 3 and further, said third lens means including a first lens member disposed proximate to a light outlet of said second prism means and a second lens member disposed proximate to said first lens member.

7. The apparatus as set forth in claim 6 and further, said second lens means including a first lens member disposed in between a light exit of said first prism means and a light inlet of said second prism means.

8. The apparatus as set forth in claim 1 and further, said first, second, and third prism means and said magnification means being disposed within selectively positionable housing means for selectively positioning said first prism means within said image-bearing light within said photographic printer.

9. The apparatus as set forth in claim 8 and further, said first, second, and third prism means cooperating with said magnification means to produce a photographic image on said photographic paper having dimensions of approximately 10"×13".

10. The apparatus as set forth in claim 9 and further, wherein said first, second, and third prism members cooperate with said magnification means to project said rotated image-bearing light toward said photographic paper in an off-center fashion relative to said photographic negative.

11. A rotational prism assembly for use in a photographic printer, comprising:

(a) a first prism member having a light inlet surface, a light outlet surface disposed generally perpendicular to said light inlet surface, and an angular surface extending between said light inlet surface and said light outlet surface;

(b) a second prism member having a light inlet surface disposed generally parallel to said light outlet surface of said first prism member, a light outlet surface disposed generally perpendicular to said light inlet surface of said second prism member, and an angular surface extending between said light inlet and light outlet surfaces of said second prism member; and (c) a third prism member having a light inlet surface disposed generally parallel to said light outlet surface of said second prism member, a light outlet surface disposed generally perpendicular to said light inlet surface of said third prism member, and an angular surface extending between said light inlet and light outlet surfaces of said third prism member, whereby said first, second, and third prism members cooperate to optically rotate image-bearing light projecting from a photographic negative approximately ninety degrees so as to produce a photographic image on photographic paper which is rotated approximately ninety degrees from said photographic negative while in the same orientation of as on said photographic negative.

12. The rotational prism assembly as set forth in claim 11 and further, comprising:

(d) magnification means for magnifying image-bearing light rotated by said first, second, and third prism members to produce said photographic image on said photographic paper having a predetermined size.

13. The rotational prism assembly as set forth in claim 12 and further, said magnification means being configured such that said predetermined size is approximately 10"×13".

14. The rotational prism assembly as set forth in claim 13 and further, said magnification means including first lens means disposed generally parallel to said light outlet surface of said third prism member.

15. The rotational prism assembly as set forth in claim 14 and further, said magnification means including second lens means disposed between said outlet surface of said first prism member and said inlet surface of said third prism member.

16. The rotational prism assembly as set forth in claim 15 and further, said first lens means including a first lens member disposed generally parallel to said light outlet surface of said third prism member and a second lens member disposed generally parallel to said first lens member.

17. The rotational prism assembly as set forth in claim 16 and further, said first lens means including a third lens member disposed between said first and second lens members.

18. The rotational prism assembly as set forth in claim 15 and further, said magnification means including third lens means disposed in between said light outlet surface of said second prism member and said light inlet surface of said third prism member.

19. The rotational prism assembly as set forth in claim 18 and further, said third lens means including a first lens member disposed generally parallel to said light outlet surface of said second prism member and a second lens member disposed generally parallel to said light inlet surface of said third prism member.

20. The rotational prism assembly as set forth in claim 19 and further, said second lens means including a first lens member disposed in a generally parallel fashion between said light outlet surface of said first prism member and said light inlet surface of said second prism member.

21. The rotational prism assembly as set forth in claim 12 and further, including selectively positionable housing means for selectively transporting said first, second, and third prism members and said magnification means within said photographic printer.

22. The apparatus as set forth in claim 13 and further, wherein said first, second, and third prism members cooperate with said magnification means to project said rotated image-bearing light toward said photographic paper in an off-center fashion relative to said photographic negative.

23. A method of optically rotating image-bearing light within a photographic printer, comprising the steps of:

(a) providing first prism means, second prism means, and third prism means for optically rotating the image-bearing light from a photographic negative approximately ninety degrees;

(b) providing magnification means associated with said first, second, and third prism means for magnifying said image-bearing light to produce a photographic image on photographic paper having a predetermined size; and (c) positioning said first prism means within said image-bearing light such that said first prism means cooperates with said second and third prism means to optically rotate said image-bearing light approximately ninety degrees prior to projection on said photographic paper.

24. The method as set forth in claim 23 and further, step (a) including the further sub-step of providing said first prism means as a first prism member having a light inlet surface, a light outlet surface disposed generally perpendicular to said light inlet surface, and an angular surface extending between said light inlet surface and said light outlet surface.

25. The method as set forth in claim 24 and further, step (a) including the further sub-step of providing said second prism means as a second prism member having a light inlet surface disposed generally parallel to said light outlet surface of said first prism member, a light outlet surface disposed generally perpendicular to said light inlet surface of said second prism member, and an angular surface extending between said light inlet and light outlet surfaces of said second prism member.

26. The method as set forth in claim 25 and further, step (a) including the further sub-step of providing said third prism means as a third prism member having a light inlet surface disposed generally parallel to said light outlet surface of said second prism member, a light outlet surface disposed generally perpendicular to said light inlet surface of said third prism member, and an angular surface extending between said light inlet and light outlet surfaces of said third prism member.

27. The method as set forth in claim 23 and further, step (b) including the further sub-step of configuring said magnification means such that said predetermined size is approximately 10"×13".

* * * * *